United States Patent [19]
Egawa et al.

[11] Patent Number: 5,870,178
[45] Date of Patent: Feb. 9, 1999

[54] DISTANCE MEASURING APPARATUS

[75] Inventors: Akira Egawa, Kawasaki; Minoru Takasaki, Yokohama; Teruyuki Okado, Tokyo; Osamu Harada, Kawasaki; Satoshi Suzuki, Tokyo, all of Japan

[73] Assignee: Canon Kabushiki Kaisha, Tokyo, Japan

[21] Appl. No.: 802,274

[22] Filed: Feb. 19, 1997

[30] Foreign Application Priority Data

| Feb. 20, 1996 | [JP] | Japan | 8-032500 |
| Feb. 20, 1996 | [JP] | Japan | 8-032502 |
| Feb. 20, 1996 | [JP] | Japan | 8-032505 |
| Feb. 20, 1996 | [JP] | Japan | 8-032506 |
| Feb. 20, 1996 | [JP] | Japan | 8-032507 |

[51] Int. Cl.$^6$ .............. G01C 3/00; G01C 3/08; G02B 7/04; G03B 13/00
[52] U.S. Cl. .............. 356/3.03; 250/201.6; 250/201.7; 250/201.8; 356/3.08; 356/3.14; 396/106; 396/121
[58] Field of Search ............... 356/3.03, 3.04, 356/3.08, 3.14; 250/201.6, 201.7, 201.8; 396/106, 121

[56] References Cited

U.S. PATENT DOCUMENTS

| 4,522,492 | 6/1985 | Masunaga . |
| 4,748,469 | 5/1988 | Tamura . |
| 4,899,041 | 2/1990 | Fetzer et al. . |
| 4,943,157 | 7/1990 | Reding . |
| 4,958,180 | 9/1990 | Matsui et al. . |
| 5,293,194 | 3/1994 | Akashi . |
| 5,362,970 | 11/1994 | Pryor et al. . |
| 5,369,462 | 11/1994 | Miyazawa et al. . |
| 5,386,285 | 1/1995 | Asayama . |
| 5,512,997 | 4/1996 | Ogawa ................... 356/3.08 |
| 5,613,167 | 3/1997 | Suzuki ................... 396/106 |

Primary Examiner—Stephen C. Buczinski

[57] ABSTRACT

Disclosed is a distance measuring apparatus for measuring the distance to an object on the basis of reflected light obtained as a result of projecting light onto an object, in which different reliability or contrast discrimination values are set in active and passive distance measurements. When the distance to the object is calculated by performing a correlation calculation on the basis of two received-light images obtained by an active or passive distance measurement, the reliability of the calculated distance and contrast values of the two received-light images are discriminated using the discrimination value.

61 Claims, 48 Drawing Sheets

FIG. 37A
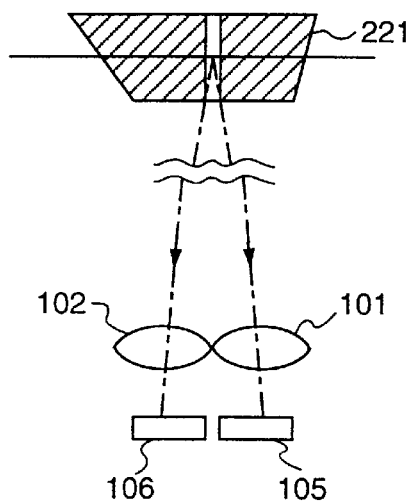
FIG. 37B
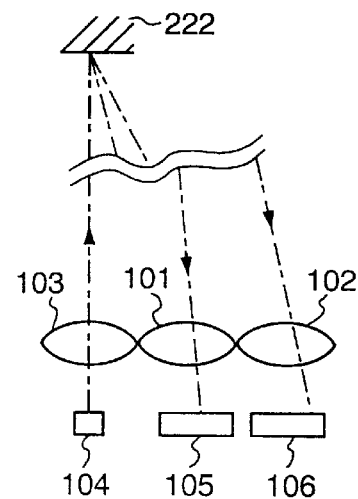
FIG. 38A
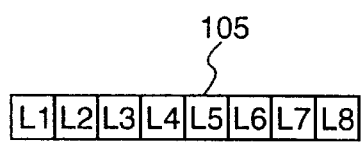
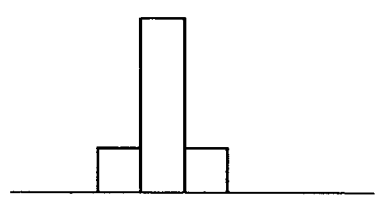
FIG. 38B
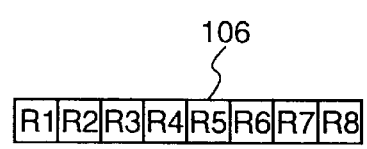
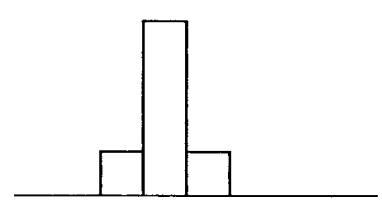

IN CASE OF OS1

IN CASE OF OS2

IN CASE OF OS1'

IN CASE OF OS2'

IN CASE OF OS1

IN CASE OF OS1'

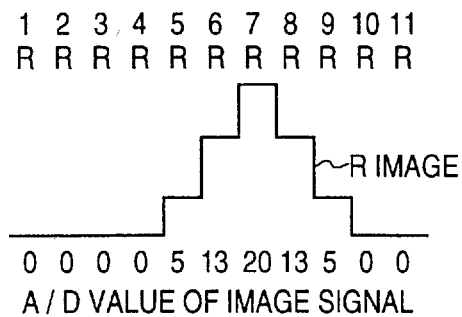
F I G. 50A
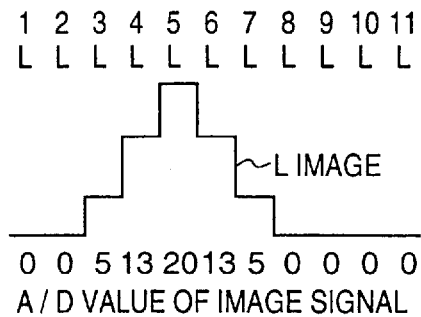
F I G. 50B
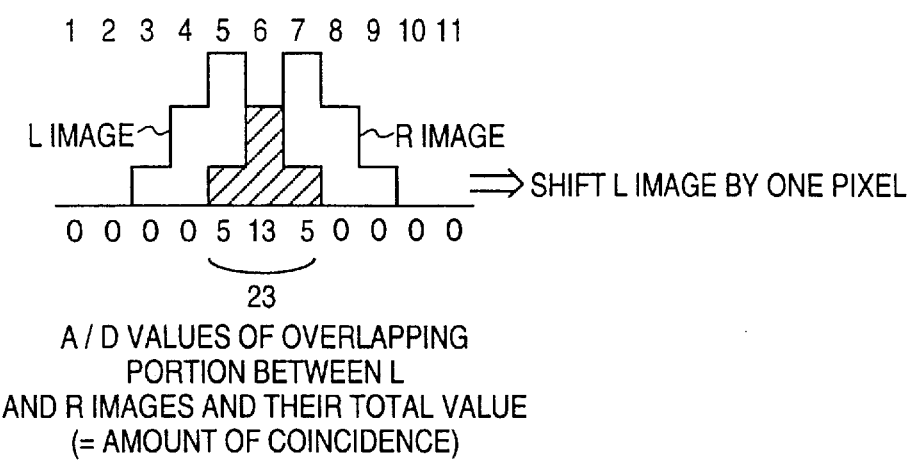
F I G. 50C

DISTANCE MEASURING APPARATUS

BACKGROUND OF THE INVENTION

The present invention relates to a distance measuring apparatus for measuring the distance to an object to be measured and, for example, a distance measuring apparatus suitably applied to an AF mechanism of a camera.

Japanese Patent Publication No. 5-22843 has proposed a distance measuring apparatus which integrates charges (electric charges) accumulated by photoelectric conversion elements by circulating them around a charge coupled device (to be referred to as CCD hereinafter) arranged in a ring pattern. The present applicant has also proposed Japanese Patent Application No. 7-263183 in association with the above patent publication. Each of these references has proposed a distance measuring apparatus which can attain by a single apparatus both a distance measurement mode using a light projection unit (active distance measurement mode) and a distance measurement mode without using any light projection unit.

FIG. 29 shows a distance measuring apparatus proposed by the above reference, to which the present invention can be applied.

Referring to FIG. 29, reference numeral 101 denotes a first light-receiving lens for forming a first optical path; 102, a second light-receiving lens for forming a second optical path; 103, a projection lens for projecting a beam spot onto the object to be measured; and 104, a light-emitting element (IRED) which is turned on/off to project beam spots. Reference numeral 105 denotes a first sensor array as a linear array of a plurality of photoelectric conversion elements; 106, a second sensor array having the same arrangement as that of the first sensor array 105; and 107, a first clear portion which provides an electronic shutter function of clearing charges photoelectrically converted by the respective sensors of the first sensor array 105. The first clear portion 107 clears charges in response to pulses ICG (Integration Clear Gate). Reference numeral 108 denotes a second clear potion which provides an electronic shutter function of clearing charges photoelectrically converted by the respective sensors of the second sensor array 106. The second clear portion 108 clears charges in response to pulses ICG as in the first electronic shutter (clear) portion 107.

Reference numeral 109 denotes a first accumulation portion which includes ON and OFF accumulation portions (not shown) and accumulates electric charges obtained from the first sensor array 105 in units of pixels in accordance with pulses ST (storage) 1 and ST2 synchronous with the ON and OFF periods of the light-emitting element 104. Reference numeral 110 denotes a second charge accumulation portion which accumulates charges obtained from the second sensor array 106 in units of pixels in accordance with pulses ST1 and ST2 synchronous with the ON and OFF periods of the light-emitting element 104, as in the first electric charge accumulation portion 109. Reference numeral 111 denotes a first charge transfer gate for parallelly transferring electric charges accumulated in the first electric charge accumulation portion 109 to a charge transfer unit (e.g., a CCD; to be described below) in response to pulses SH. Reference numeral 113 denotes a first charge transfer unit, which is locally or entirely constituted by a ring-shaped arrangement, and sums up charges respectively accumulated by the first electric charge accumulation portion 109 during the ON and OFF periods by circulating charges. The circulating portion will be referred to as a ring CCD 113b hereinafter, and a portion that does not constitute the circulating portion will be referred to as a linear CCD 113a hereinafter. Reference numeral 112 denotes a second transfer gate, which has the same arrangement as that of the first charge transfer gate 111. Reference numeral 114 denotes a second charge transfer unit, which has the same arrangement as that of the first charge transfer unit 113.

Reference numeral 115 denotes a first initialization unit, which performs initialization by resetting charges in the first charge transfer unit 113 in response to pulses CCDCLR. Reference numeral 117 denotes a first skim unit for resetting (discharging) a predetermined amount of charges. Reference numeral 118 denotes a second skim unit having the same function as that of the first skim unit 117. Reference numeral 119 denotes a first output unit for outputting a signal SKOS1 which is used for discriminating whether or not a predetermined amount of charges is to be reset. The first output unit 119 reads out the charge amount present in the first charge transfer unit 113 in a non-destructive manner while leaving them as charges. Reference numeral 120 denotes a second output unit for outputting a signal SKOS2 as in the first output unit 119. Reference numeral 121 denotes an output unit for sequentially reading out charges in the first charge transfer unit 113 and outputting a signal OS1. Reference numeral 122 denotes an output unit for outputting a signal OS2 in accordance with charges from the second charge transfer unit 114 as in the output unit 121. Reference numeral 123 denotes a first comparator for discriminating based on the signal SKOS1 if skimming is to be performed. Reference numeral 124 denotes a second comparator for performing the same discrimination as in the first comparator 123 on the basis of the signal SKOS2. Reference numeral 125 denotes a control unit including a CPU for making the overall control and calculations required for distance measurements.

As described above, the components 105, 107, 109, 111, and 113 constitute a first skim CCD sensor serving as a light-receiving unit, and the components 106, 110, 112, and 114 constitute a second skim CCD sensor serving as a light-receiving unit.

With the above-mentioned arrangement, the distance to the object to be measured can be calculated using the principle of so-called trigonometric measurements on the basis of the relative values of the positions on the first and second sensor arrays 105 and 106 using the signals OS1 and OS2.

In the above description, a apparatus for the active distance measurement mode using a light projection unit has been explained. In this apparatus, when the output corresponding to one of the ON and OFF periods is used without operating the skim units and without calculating any difference between charges corresponding to the ON and OFF periods of emission in the reading mode, the apparatus can serve as a distance measuring apparatus based on the phase difference using a normal line CCD. The active distance measurement mode using a light projection unit and the passive distance measurement mode without using any light projection unit in the above-mentioned apparatus will be explained, and their problems will be presented.

<Description of First Problem>

The first problem of the proposed hybrid type distance measuring apparatus will be described below with reference to FIGS. 30 to 33.

Referring to FIG. 30, reference numeral 1 denotes an object to be measured; 2, an IRED serving as a light-emitting element for projecting a beam spot; 3, a projection lens for transmitting light emitted by the IRED 2 and projecting it onto the object 1 to be measured; 4 and 5, light-receiving lenses for transmitting through light reflected by the object 1 to be measured; and 6 and 7, first and second sensor arrays for receiving the reflected light via the light-receiving lenses 4 and 5. On the output side of these first and second sensor arrays 6 and 7, electric charge accumulation portions for temporarily accumulating charges from the sensor arrays 6 and 7, charge transfer portions such as CCDs, charge reset portions for performing skimming, and the like are arranged, as in FIG. 29 above, and constitute skim CCD sensors together with these sensor arrays 6 and 7.

FIG. 31 is-a flow chart showing the outline of the operation when the distance measuring apparatus with the above arrangement performs distance measurements in the active mode.

In step S5001, the IRED 2 is turned on/off to project beam spots. In step S5002, the difference outputs between the received-light signals of the skim CCD sensors during the ON and OFF periods of the IRED 2 are calculated. Subsequently, in step S5003, charges from the sensor arrays 6 and 7 are integrated by circulating and adding the charges in synchronism with the ON and OFF periods of the IRED 2, and skimming for resetting (removing) external light components other than light components projected by the IRED 2 is performed during the integration.

The signal outputs are monitored, and when the difference outputs have exceeded a predetermined amount, light projection by the IRED 2 is stopped in step S5004. In step S5005, a correlation calculation is performed on the basis of the right and left difference outputs of signals of received-light images obtained by beam spots projected by the IRED 2. More specifically, the distance to the object to be measured is calculated using the principle of trigonometric measurements on the basis of the correlation values of the positions on the two sensor arrays of the difference outputs.

FIG. 32 is a flow chart showing the operation when the distance measuring apparatus with the above arrangement in FIG. 30 performs distance measurements in the passive mode.

In step S5101, the IRED 2 is turned off and set a normal output mode for outputting a received-light signal. Thereafter, in step S5102, resetting (skimming) of charges is inhibited. In step S5103, the received-light signals corresponding to the time required for one cycle of the operation of the light projection unit are obtained. In step S5104, a correlation calculation of the received-light signals obtained in step S5103 is performed. More specifically, the distance to the object to be measured is calculated using the principle of trigonometric measurements on the basis of the correlation values of the positions on the two sensor arrays.

FIG. 33 is a flow chart for explaining the outline of the distance measurement operation in the hybrid type distance measuring apparatus using the skim CCD sensors.

When distance measurements start, it is checked in step S5201 if skimming is allowed. If YES in step S5201, the flow advances to step S5203; otherwise, the flow advances to step S5204.

In step S5202, active distance measurements using signals obtained during the ON and OFF periods of the IRED 2 are performed. The operation in the active distance measurements is as described above with reference to FIG. 31. In step S5203, it is checked if a distance measurement value is obtained in step S5202. If a signal of the reflected beam spot cannot be obtained since the object to be measured is present at a far-distance position or has a low reflectance, it is determined that distance measurements are impossible to perform, and the flow advances to step S5204. If distance measurements are possible to perform, the distance measurements end. In step S5204, projection of the beam spot is inhibited, and passive distance measurements are performed. The operation in the passive distance measurements is as has been described above with reference to FIG. 32. After the distance measurement value is obtained, the distance measurement operation ends.

The above-mentioned distance measuring apparatus shown in FIG. 29 can perform an active distance measurement using a light projection unit and a passive distance measurement without any light projection unit using basically a common algorithm since distance measurements are performed using a single apparatus and a single optical system and by calculating the correlation between two image signals.

However, in practice, different noise components are generated in the active and passive distance measurements, and have the influence on the distance measurement performance.

More specifically, in the active distance measurement, the distance measurement performance deteriorates when the object to be measured is located at a far-distance position, and the image signal based on projected light becomes weak or shot noise due to external light components increases. Other words, in the active distance measurement, external light components are removed by calculating the difference between signals obtained during the ON and OFF periods of the light projection unit, so as to extract only an image signal obtained by the light projection unit. However, shot noise caused by external light remains even after the difference processing, thus impairing the S/N ratio. For this reason, for example, even when an active distance measurement is performed since skimming is allowed, the distance measurements become impossible to perform and it is determined that the object to be measured is located at infinity position. In such case, when the distance measurement precision lowers due to shot noise of external light, the lens is driven to infinity position even when the object to be measured is located at a middle-distance position, and as a consequence, an out-of-focus picture is taken.

Furthermore, when the electronic shutter function is activated, if the overall time remains the same, the actual signal accumulation time decreases, and the distance measurement performance deteriorates.

Furthermore, in the active distance measurement, in order to skim external light components, charges must circulate the ring CCD several times, and noise is generated depending on the number of rounds on the ring CCD.

In contrast to this, in the passive distance measurement, since external light is directly converted into an image signal, shot noise is suppressed to negligible level. In this mode, since an operation equivalent to that of a normal CCD is performed, no noise is generated irrespective of the number of rounds of the ring CCD.

As described above, the active and passive distance measurement methods suffer different noise problems. For this reason, upon discriminating the reliability of the distance measurement results obtained by these two distance measurement methods, if distance measurement errors are to be eliminated by increasing the discrimination level, distance measurements in the passive distance measurement method are often hampered, and the performance deteriorates. On the other hand, if the performance is to be improved by lowering the discrimination level, noise correlation is generated in the active distance measurement method, thus generating distance measurement errors.

As another criterion of the reliability, the overlapping ratio between two image signals is used. When the two image signals perfectly overlap and match each other, the highest reliability is obtained. However, in the conventional method, the distance measurement results of the two distance measurement methods often have low reliability. Furthermore, in the case of an AF camera that adopts the conventional distance measurement system, release time lags are generated due to delays of the distance measurement processing.

<Description of Second Problem>

The second problem in the distance measuring apparatus in FIG. 29 will be described with reference to FIGS. 34 to 43.

FIG. 34 is a diagram showing a distance calculation unit in the control unit 125 of the above distance measuring apparatus. Referring to FIG. 34, reference numeral 201 denotes an A/D converter for A/D-converting outputs OS1 and OS2 from the skim CCD sensors in synchronism with sampling pulses SP, and outputting the A/D-converted outputs to a CPU 204 (to be described below); 202, a reference voltage generator for supplying a reference voltage to the A/D converter 201; 203, an IRED driving unit for driving the IRED 104 serving as the light-emitting element in FIG. 29; and 204, a CPU for performing correlation calculations on the basis of the outputs from the A/D converter 201 to calculate the distance to the object to be measured, and controlling the overall distance measuring apparatus. Note that the sampling pulses SP are generated inside the skim CCD sensors.

FIG. 35 is a flow chart for explaining the operation in the passive distance measurements in the distance measuring apparatus along FIG. 34. In step S5301, a communication output mode for directly outputting received-light signals at the ON and OFF timings of the light projection unit is selected while the IRED 104 is kept OFF. In step S5302, resetting (skimming) of charges is inhibited. In step S5303, two image signals corresponding to the time required for one cycle of the operation of the light projection unit are supplied from the sensor arrays 105 and 106 to the A/D converter 201. In step S5304, the image signals are A/D-converted with reference to a reference voltage $V_C$, and the converted signals are supplied to the CPU 204. In step S5304, a distance measurement value is obtained by calculating the correlation between the image signals obtained in step S5304. More specifically, the distance to the object to be measured can be calculated using the principle of so-called trigonometric measurements on the basis of the relative values of the positions, on the two sensor arrays 105 and 106, of the signals from these sensor arrays.

FIG. 36 is a flow chart for explaining the operation in the active distance measurements in the distance measuring apparatus along FIG. 34. In step S5401, the ON/OFF operation of the light projection unit is started. In step S5402, a mode for extracting the difference signal between received-light signals obtained during the ON and OFF periods of the light projection unit is selected. In step S5403, charges are added in synchronism with the ON and OFF periods of the light projection unit, and external light components are reset by skimming. When the difference signal has exceeded a predetermined amount while monitoring the signal output, the light projection unit is turned off in step S5404, and two image signals are supplied to the A/D converter 201. In step S5405, the image signals are A/D-converted with reference to the reference voltage $V_C$, and the converted signals are supplied to the CPU 204. In step S5406, a distance measurement value is obtained by calculating the correlation between the difference signals of two received-light images. More specifically, the distance to the object to be measured can be calculated using the principle of so-called trigonometric measurements on the basis of the relative values of the positions of the difference signals on the two sensor arrays.

FIGS. 37A and 37B show actual distance measurements in the distance measuring apparatus. FIG. 37A shows passive distance measurements, and FIG. 37B shows active distance measurements.

Referring to FIGS. 37A and 37B, reference numeral 221 denotes an object to be measured in the passive distance measurement mode; and 222, an object to be measured in the active distance measurement mode. Reference numerals 101 and 102 denote first and second light-receiving lenses. Reference numeral 103 denotes a projection lens; 104, an IRED for projecting a beam spot; and 105 and 106, first and second sensor arrays each comprising a sensor block consisting of a plurality of photoelectric conversion elements. Light coming from the object 221 to be measured (FIG. 37A) or light projected by the IRED 104 and reflected by the object 222 to be measured (FIG. 37B) is incident on the first and second sensor arrays 105 and 106.

FIGS. 38A and 38B show image signals on the sensor arrays 105 and 106 in the passive distance measurement mode. The sensor array 105 comprises photoelectric conversion elements L1 to L8, and the sensor array 106 comprises photoelectric conversion elements R1 to R8. FIG. 38A shows the image signal on the sensor array 105, and FIG. 38B shows the image signal on the sensor array 106. In FIG. 38A, a received-light image is formed. across the elements L3 to L5, and in FIG. 38B, a received-light image is formed across the elements R3 to R5.

FIGS. 39A and 39B show the timings at which these signals shown in FIGS. 38A and 38B are accumulated and fetched in practice, and also show the output waveforms of image signal outputs OS1 and OS2 in FIG. 29. Upper image signal output waveforms OS1 and OS2 in FIGS. 39A and 39B are ideal ones, and waveforms OS1' and OS2' are the ones obtained when charges gradually flow into the transfer CCDs (such as ring CCDs or the like) due to dark current or external light components. In this case, as the A/D-conversion timing becomes later, the amount of unwanted electric charges accumulated increases. The reason why the waveforms OS1' and OS2' have different patterns is that charges corresponding to dark current or external light components flow into the transfer CCDs of the first and second sensor arrays 105 and 106 in different ways for some reason.

The outputs OS1 and OS2 (OS1' and OS2') shown in FIGS. 39A and 39B are obtained with reference to the reference voltage $V_C$, and are expressed by downward convex signal output characteristics, as shown in FIGS. 39A and 39B. In FIGS. 39A and 39B, SP indicates the timing pulses used upon A/D-converting the outputs OS1 and OS2, 0 and 0' indicate the A/D-conversion timings of empty transfer portions (transfer portions including no signals) of the transfer CCDs in FIG. 29, and 1 to 8 indicate the A/D-conversion timings of the accumulated signals in the transfer CCDs in FIG. 29 of the respective photoelectric conversion elements outputs of the two sensor arrays. In FIGS. 39A and 39B, points A to D in the waveforms OS1' and OS2' should be noted. The levels at these points change as compared to those in the waveforms OS1 and OS2 since charges gradually flow into the transfer CCDs (ring CCDs or the like) due to dark current or external light components although these points correspond to the timings of empty transfer portions of the transfer CCDs. Note that A/D conversion is performed with reference to the reference voltage V, from the reference voltage generator 202 in synchronism with the above-mentioned pulses SP, and the sign of the A/D-converted output is inverted.

FIGS. 40A to 40D show the A/D conversion results of the outputs OS1 and OS2. FIGS. 40A to 40D respectively show the A/D-converted waveforms corresponding to the waveforms OS1, OS2, OS1', and OS2' in FIGS. 39A and 39B. Ideally output two image signals shown in FIGS. 40A and 40B are nearly similar to each other, and accurate information can be obtained by performing correlation calculations for calculating the distance to the object to be measured. On the other hand, image signals shown in FIGS. 40C and 40D obtained when charges gradually flow into the transfer CCDs (ring CODs or the like) due to dark current or external light components are distorted, and accurate information cannot be obtained even when correlation calculations for calculating the distance to the object to be measured are performed. In the actual use state, especially, in the case of the distance measuring apparatus equipped in, e.g., a camera, the amount of charges corresponding to external light components flowing into the transfer CCDs (ring CCDs or the like) increases very much outdoors, and distance measurement errors occur with high possibility.

Active distance measurements performed when charges gradually flow into the transfer CCDs (ring CCDs or the like) due to dark current or external light components are as follows. Note that a description will be made for only one of a pair of sensor arrays for the sake of simplicity.

FIG. 41 shows the image signal on the sensor array 105 in the active distance measurement mode. The sensor array 105 comprises photoelectric conversion elements L1 to L8. In FIG. 41, a received-light image obtained upon receiving projected light reflected by the object to be measured is formed across the elements L3 to L5.

FIG. 42 shows the timings at which the signals shown in FIG. 41 are actually accumulated and fetched, and the output waveforms OS1 and OS1' of the image signal output portion in FIG. 29. In the active distance measurement mode, since signals are accumulated during both the ON and OFF periods of the light projection unit, the outputs OS1 appear in correspondence with both the ON and OFF periods of the light projection unit. The image signal output waveform OS1 in FIG. 42 is an ideal one, and the waveform OS1∝ is obtained when charges gradually flow into the transfer CCD (e.g., a ring CCD) due to dark current or external light components. In this case, as the A/D conversion timing becomes later, the amount of unwanted electric charges accumulated becomes larger.

The output OS1 shown in FIG. 42 is obtained with reference to the reference voltage $V_C$, and has downward convex signal output characteristics in FIG. 42 when a signal is present. Also, in FIG. 42, SP indicates the timing pulses upon AID-converting the output OS1, and 0$a$, 0$b$, 0$a'$, and 0$b'$ indicate the A/D conversion timings corresponding to empty transfer portions (i.e., transfer portions including no signals) of the transfer CCD in FIG. 29. Furthermore, 1$a$ to 8$a$ indicate the A/D conversion timings of the accumulated signals of the respective photoelectric conversion element outputs of the sensor array in the transfer CCD during the OFF period of the light projection unit, and 1$b$ to 8$b$ indicate the A/D conversion timings of the accumulated signals of the respective photoelectric conversion element outputs of the sensor array in the transfer CCD during the ON period of the light projection unit.

Note A/D conversion is performed with reference to the reference voltage $V_C$ from the reference voltage generator 202 in synchronism with the above-mentioned pulses SP, and the sign of the A/D-converted output is inverted.

FIGS. 43A and 43B show the outputs obtained by A/D-converting the outputs OS and calculating the differences between the signals obtained during the ON and OFF periods of the light projection unit. FIGS. 43A and 43B respectively show the A/D-converted waveforms corresponding to the waveforms OS1 and OS1' in FIG. 42. The ideal output image signal in FIG. 43A has a regularly shaped waveform, and can provide accurate information when this output is subjected to correlation calculations for calculating the distance to the object to be measured together with another output OS2 (not shown). On the other hand, even the output shown in FIG. 43B obtained when charges gradually flow into the transfer CCD (e.g., a ring CCD) due to dark current or external light components is free from any distortion although a difference from the charges in the neighboring transfer portions (signals during the ON and OFF periods of the light projection units) appears as an offset, and can provide accurate information when this output is subjected to correlation calculations for calculating the distance to the object to be measured together with another output OS2 (not shown). This is because signals obtained during the ON and OFF periods of the light projection unit are alternately transferred and output. In this fashion, the second problem need only be considered in the passive distance measurement mode alone.

<Description of Third Problem>

Not only in the distance measuring apparatus in FIG. 29 but in general, when the distance to a distant object is to be measured by the passive distance measurement method through a glass window using a camera, a good distance measurement result can be obtained without causing any distance measurement errors. However, in the active distance measurement method, a good distance measurement result cannot always be obtained. The active distance measurement method measures distance by receiving the reflected light of the light it projects. For this reason, when the distance to a distant object is to be measured through a window glass, light slightly reflected by the glass window adversely influences the distance measurement result.

In order to eliminate the adverse influence of the active distance measurement method, the present applicant has proposed a technique that can obtain an appropriate distance measurement result by detecting light reflected by the glass window surface using a dedicated light-receiving sensor even when the distance to a far object is measured through the glass window.

However, since the above-mentioned technique receives light using a dedicated sensor, the dedicated sensor is required in addition to normal sensors for distance measurements. For example, when the distance between the glass window and the distance measuring apparatus is slightly large (e.g., about 0.4 m), there is almost no reflected light between the glass window and the camera main body (or the distance measuring apparatus) and the dedicated sensor cannot receive the reflected light. As a consequence, the glass window cannot be normally detected, and the distance to the glass window is measured based on light regularly reflected by the glass window. When the distance measurement result (e.g., 0.4 m) falls outside the photographing interlocking range (e.g., within the closest-distance range) of the camera, a normal camera displays closest warning or inhibits photographing. For this reason, the picture of a distant object cannot be taken through the window glass, and the camera is not easy to operate.

Furthermore, in the above-mentioned technique, since the distance measurement result (or a photographing lens) is merely set at a predetermined distance suitable for photographing a distant object, the distance measurement result does not always have high precision.

<Description of Fourth Problem>

Not only in the distance measuring apparatus in FIG. 29 but in general, when distance measurements are performed using a hybrid type distance measuring apparatus, signals are accumulated in the active distance measurement mode, and signal charges are accumulated again in the passive distance measurement mode. In this case, the maximum total accumulation time that limits the respective total accumulation times of these modes uses an identical value for both the active and passive distance measurement modes in the conventional apparatus. However, an optimal value of the maximum total accumulation time in the active distance measurement mode does not always coincide with that in the passive distance measurement mode. The reason for such non-coincidence will be explained below.

FIG. 44 shows the relationship between the accumulation time and signal components and the relationship between the accumulation time and noise generated during charge transfer and charge accumulation in the active distance measurement mode. Assuming that the charge amount per accumulation is substantially constant, the accumulation time can be considered as the number of times of accumulation. A curve S1' represents the relationship between the signal level obtained when the distance to the object to be measured located at a relatively near-distance position is measured, and the number of times of accumulation, and a curve S1 represents the relationship between the signal level obtained when the distance to the object to be measured located at a far-distance position is measured, and the number of times of accumulation. It is considered that the signal level is proportional to the number of times of accumulation. A curve N1 represents the relationship between the level of noise generated by, e.g., charge transfer, and the number of times of accumulation. The noise is generated due to shot noise, the transfer efficiency of the charge transfer portion, and the like, and is assumed to be the sum of components proportional to the square root of the number of times of accumulation, components proportional to the number of times of accumulation, and residual components independent of the number of times of accumulation. Therefore, in the case of the active distance measurement mode, the S/N ratio is improved as the number of times of accumulation increases. However, since the accumulation time of signals is prolonged accordingly, the upper limit (Tmax) of the accumulation time is limited in association with the allowable distance measurement time.

FIG. 45 shows the relationship between the signal level and the noise level in the passive distance measurement mode in association with the brightness of the object to be measured. The accumulation time in the passive distance measurement mode is optimized, as indicated by a straight line R, in correspondence with the brightness of the object to be measured. More specifically, since the accumulation is repeated until the signal level reaches a predetermined value (S2), the number of times of electric charge accumulation is small (C1) when the object to be measured is bright (B1); the number of times of electric charge accumulation increases (C2) when the object to be measured is dark. However, since the noise increases in correspondence with the accumulation time, as described above, the S/N ratio is impaired as the number of times of accumulation increases. That is, in the passive distance measurement mode, when the object to be measured is bright, a high S/N ratio can be assured, but when the object to be measured is dark, the S/N ratio lowers. At the brightness of a point B3 in FIG. 45, the S/N ratio=1 is obtained, and even when the distance to the object to be measured with a brightness lower than that at the point B3 is measured, no reliable distance measurement result is obtained due to too low an S/N ratio. Accordingly, even when the electric charge accumulation is repeated beyond the number C3 of times of accumulation at that time, only the distance measurement time is prolonged, and the distance measurement performance cannot be improved. In the case of a camera, release time lags become larger.

<Description of Fifth Problem>

Not only in the distance measuring apparatus shown in FIG. 29 but in active type distance measuring apparatus, light projected by a light-emitting element and reflected by the object to be measured is received by a semiconductor position sensing device (to be referred to as a PSD hereinafter), and the reflected light position (the barycentric position of the reflected light) on the PSD is detected based on the output signal from the PSD, thereby calculating the distance to the object to be measured.

Since the barycentric position detection method is liable to cause distance measurement errors for a low-contrast object, a distance measuring apparatus in which a pair of parallel sensor arrays such as CCDs are arranged to receive the reflected light of the projected light, and the distance to the object to be measured is calculated based on the phase difference between the output signals from the pair of light-receiving elements, is known. FIGS. 46 and 47 are views for explaining the arrangement and operation of the distance measuring apparatus.

Referring to FIG. 46, reference numeral 251 denotes a light-emitting element for projecting a light beam toward the object to be measured. The light-emitting element 251 comprises an infrared light-emitting element (to be referred to as an IRED hereinafter), a light-emitting diode (LED) or the like (in the following description, the element 251 is assumed to be an IRED). Reference numeral 252 denotes a light projection driving unit for ON/OFF-controlling the IRED 251 in accordance with a signal from a microcomputer 264 (to be described later); 253, a projection lens for condensing the light beam projected by the IRED 251; and 254, an object to be measured. Reference numeral 255 denotes a first CCD serving as a light-receiving element array; 256, a second CCD serving as a light-receiving element array; and 257 and 258, light-receiving lenses for imaging the light projected by the IRED 251 toward the object to be measured and reflected by the object to be measured on sensor arrays of the first and second CCDs 255 and 256. Reference numeral 259 denotes an amplifier unit for amplifying a plurality of pieces of image information obtained by the CCDs 255 and 256; and 260, an A/D converter for quantizing the plurality of pieces of amplified image information (the quantized image information obtained by the A/D converter will be referred to as an image signal hereinafter). Reference numeral 261 denotes a storage unit (to be referred to as a RAM hereinafter) for temporarily storing the image signals quantized by the A/D converter 260.

Reference numeral 264A denotes a phase difference detection unit for detecting the phase difference between the image signals obtained by the CCDs 255 and 256 and stored in the RAM 261. The phase difference detection unit 264A detects a shift position corresponding to the peak value of the correlation amount, and calculates the phase difference between the image signals from the CCDs 255 and 256 by interpolation on the basis of the detected value. The calculation result is converted into the distance to the object to be measured using the principle of trigonometric measurements. Reference numeral 264B denotes a contrast discrimination unit for discriminating the presence/absence of distance measurement reliability by performing predetermined calculations of the image signals from the CCDs 255 and 256 and comparing the calculation results with a predetermined level; and 264, a microcomputer for controlling the distance measuring apparatus and performing distance measurement calculations.

The distance measurement operation of the distance measuring apparatus in FIG. 46 will be explained below with reference to the flow chart in FIG. 47.

Referring to FIG. 47, any residual charges in the CCDs 255 and 256 are reset in step S5501 before beginning electric charge accumulation. In step S5502, a timer (not shown) for measuring the electric charge accumulation time of each CCD by down-counting is started. The IRED 251 is turned on in step S5503, and electric charge accumulation of the CCDs 255 and 256 is started in step S5504. In step S5505, the levels of electric charges accumulated in the CCDs 255 and 256 are checked to prevent saturation. If the electric charge accumulation amount of one of the pair of CCDs 255 and 256 exceeds a predetermined level, the accumulation operation ends, and the flow advances to step S5507 to turn off the IRED 251. On the other hand, if the electric charge accumulation levels of the pair of CCDs 255 and 256 have not reached the predetermined level, the flow advances to step S5506.

In step S5506, the value of the timer (not shown) is monitored. If the value of the timer is not 0, the flow returns to step S5504 to continue the accumulation operation. If the value of the timer is 0, the accumulation operation ends, and the IRED 251 is turned off in step S5507. The accumulated electric charges are processed as image information, and are amplified by the amplifier unit 259. A plurality of pieces of image information are quantized by the A/D converter 260 in step S5508, and the quantized image signals of the CCDs 255 and 256 are stored in the RAM 261. In step S5509, a shift position corresponding to the peak value of the correlation amount is detected, and the phase difference between the image signals obtained by the CCDs 255 and 256 and stored in the RAM 261 is calculated by interpolation on the basis of the detected value. In step S5510, the contrast discrimination unit 264B performs contrast discrimination. In this contrast discrimination, the unit 264B performs the following calculation using each of the image signals of the CCDs 255 and 256:

$$CONT = \sum_{i=1}^{N-1} \{(IM_i - IM_{i+1}) - A\}^2 \quad (1)$$

where $IM_i$ is the image signal of the i-th pixel, $IM_{i+i}$ is the image signal of the (i+1)-th pixel, N is the total number of pixels of the CCD, and A is a discrimination constant set in advance by experiments. The calculation results CONT obtained using equation (1) above are compared with a contrast discrimination value which is set in advance by experiments. If one of the values calculated using equation (1) above is smaller than the discrimination value, since the amount of changes in image signals of the CCDs is small (low contrast), it is determined that the distance measurement result is "NG". If the discrimination result is "OK", the calculation result upon detecting the phase difference is converted into a distance to the object to be measured using the principle of trigonometric measurements in step S5512. Thereafter, the distance measurement ends. However, if the discrimination result is "NG", since the calculation result upon detecting the phase difference in step S5509 has low reliability, it is determined that the distance measurement result is "NG", and the distance measurement information is set to be a predetermined fixed value in step S5511.

In the above-mentioned distance measuring apparatus, the contrast discrimination result "NG" is obtained under the conditions that the object to be measured is located, with very high possibility, at a far-distance or infinity position the light beam projected by the IRED 251 cannot reach. For this reason, the fixed value is set to be a predetermined value corresponding to the far distance or an intermediate value that does not increase the defocus amount independently of the distance to the object to be measured within the distance range that generates the contrast discrimination result "NG".

As a modification of the above-mentioned distance measuring apparatus, in order to improve the distance measurement performance for a far-distance object, a distance measuring apparatus that performs a passive distance measurement when an active distance measurement provides a discrimination result of "NG" has been proposed. The block arrangement of this distance measuring apparatus is the same as that shown in FIG. 46, and its distance measurement operation is performed in accordance with the flow chart in FIG. 48. In FIG. 48, electric charge accumulation of the CCDs 255 and 256, A/D conversion, phase difference detection, and contrast discrimination are performed in steps S5501 to S5510 as in FIG. 46, and if the contrast discrimination result is "OK", the phase difference detected value is converted into distance information in step S5512. However, if the contrast discrimination result is "NG", passive distance measurements are performed in step S5511B, and thereafter, the distance measurement ends.

The operation in the passive distance measurements is performed in accordance with the flow chart in FIG. 49. Referring to FIG. 49, the residual charges in the CCDs 255 and 256 are reset in step S5601 before beginning electric charge accumulation. In step S5602, a timer (not shown) for measuring the electric charge accumulation time of each CCD by down-counting is started. In step S5603, accumulation of electric charges in the CCDs 255 and 256 is started. In step S5604, the levels of the electric charges accumulated in the CCDs 255 and 256 are checked to prevent saturation. If the amount of electric charges accumulated in one of the pair of CCDs 255 and 256 exceeds a predetermined level, the accumulation operation ends, and the flow advances to step S5606. On the other hand, if the levels of electric charges accumulated in the pair of CCDs 255 and 256 have not reached the predetermined level, the flow advances to step S5605. In step S5605, the value of the timer (not shown) is monitored. If the value of the timer is not 0, the flow returns to step S5603 to continue the accumulation operation. If the value of the timer is 0, the accumulation operation ends, and the flow advances to step S5606.

The accumulated electric charges are processed as image information, and are amplified by the amplifier unit 259. A plurality of pieces of image information are quantized by the A/D converter 260 in step S5606, and the quantized image signals of the CCDs 255 and 256 are stored in the RAM 261. In step S5607, a shift position corresponding to the peak value of the correlation amount is detected, and the phase difference between the image signals obtained by the CCDs 255 and 256 and stored in the RAM 261 is calculated by interpolation on the basis of the detected value. In step S5608, the contrast discrimination unit 264B performs contrast discrimination. In this contrast discrimination, the unit 264B calculates equation (1) above for the image signals of the CCDs 255 and 256, and compares the calculation results with a contrast discrimination value which is set in advance by experiments. If the discrimination result is "OK", the calculation result upon detecting the phase difference is converted into a distance to the object to be measured using the principle of trigonometric measurements in step S5610. Thereafter, the passive distance measurement operation ends. On the other hand, if the discrimination result is "NG", it is determined that the distance measurement result is "NG", and the distance measurement information is set to be a predetermined fixed value in step S5609. Thereafter, the passive distance measurement operation ends.

In the distance measuring apparatus that operates, as shown in FIG. 48, a passive distance measurement is executed under the conditions that the contrast discrimination result in the active distance measurement mode is NG, i.e., the object to be-measured is located, with very high possibility, at a far-distance or infinity position the light beam projected by the IRED 251 cannot reach. For this reason, the fixed value is set to be a predetermined value corresponding to the far distance or an intermediate value that does not increase the defocus amount independently of the distance to the object to be measured within the distance range that generates the contrast discrimination result "NG".

However, in the conventional distance measuring apparatus, the processing of the phase difference detection unit 264A is performed prior to the contrast discrimination processing. More specifically, phase difference detection is executed independently of the contrast discrimination result. Since the time required for the phase difference detection in the total distance measurement time is not negligibly short, the execution time of the phase difference detection when the contrast discrimination result is "NG" is very wasteful. In particular, in the distance measurement operation shown in FIG. 48, when the active distance measurement result is "NG", since the phase difference detection is performed twice in the active and passive modes, the distance measurement time is prolonged very much.

SUMMARY OF THE INVENTION

The present invention has been made in consideration of the above-mentioned problems, and has the following object. That is, it is an object of the present invention to appropriately selectively use the two distance measurement methods in consideration of the reliability that may be impaired by, e.g., noise, and to improve distance measurement precision in a distance measuring apparatus which performs both active and passive distance measurements.

It is another object of the present invention to provide a distance measuring apparatus which can .minimize decreases in distance measurement precision due to dark current or external light components.

It is still another object of the present invention to provide a distance measuring apparatus which can attain high-precision distance measurements without using any dedicated sensor when distance measurements are performed through a glass window.

It is still another object of the present invention to shorten the distance measurement time.

In order to achieve the above objects, the distance measuring apparatus of the present invention comprises the following features.

That is, a distance measuring apparatus which comprises light projection means for projecting signal light onto an object, and measures a distance to the object on the basis of reflected light obtained by projecting the signal light toward the object, comprises:

first and second light-receiving means for respectively outputting signals in accordance with an amount of the reflected light received from the object;

first distance measuring means for calculating the distance to the object by performing a correlation calculation on the basis of two signals output from the first and second light-receiving means when the light projection means is used;

second distance measuring means for calculating the distance to the object by performing a correlation calculation on the basis of two signals output from the first and second light-receiving means when the light projection means is not used;

first reliability discrimination means for discriminating reliability of the distance calculated by the first distance measuring means on the basis of a first reliability discrimination value; and second reliability discrimination means for discriminating reliability of the distance calculated by the second distance measuring means on the basis of a second reliability discrimination value.

For example, each of the first and second reliability discrimination values is preferably a value indicating a degree of coincidence between the two signals output from the first and second light-receiving means.

The first and second distance measuring means preferably include first and second filter means for respectively performing filter processing for the signals obtained by the first and second light-receiving means.

Preferably, the first filter means performs processing for attenuating a spatial frequency in a high-frequency region of the signals obtained by the first and second light-receiving means, and the second filter means performs processing for attenuating a spatial frequency in a low-frequency region of the signals obtained by the first and second light-receiving means.

For example, the apparatus preferably further comprises changing means for changing the reliability discrimination value used in the reliability discrimination means.

More specifically, a distance measuring apparatus which comprises light projection means for projecting signal light onto an object, and measures a distance to the object on the basis of reflected light obtained by projecting the signal light toward the object, comprises:

first and second light-receiving means for respectively outputting signals in accordance with an amount of the reflected light received from the object;

first distance measuring means for calculating the distance to the object by performing a correlation calculation on the basis of two signals output from the first and second light-receiving means when the light projection means is used;

second distance measuring means for calculating the distance to the object by performing a correlation calculation on the basis of two signals output from the first and second light-receiving means when the light projection means is not used;

contrast calculation means for calculating contrast values of the signals obtained by the first and second light-receiving means;

first contrast discrimination means for discriminating the contrast values calculated by the contrast calculation means on the basis of a first contrast discrimination value; and second contrast discrimination means for discriminating the contrast values calculated by the contrast calculation means on the basis of a second contrast discrimination value.

Preferably, the contrast calculation means includes attenuation means for attenuating high-frequency noise of the signals, and calculates the contrast values on the basis of the signals, noise of which is attenuated by the attenuation means.

More specifically, a distance measuring apparatus which comprises light projection means for projecting signal light onto an object, and measures a distance to the object on the basis of reflected light obtained by projecting the signal light toward the object, comprises:

first and second light-receiving means for respectively outputting signals in accordance with an amount of the reflected light received from the object;

electric charge accumulation means for accumulating signal charges output from the first and second light-receiving means;

first distance measuring means for calculating the distance to the object by performing a correlation calculation on the basis of the signal electric charges accumulated in the electric charge accumulation means when the light projection means is used;

second distance measuring means for calculating the distance to the object by performing a correlation calculation on the basis of the signal electric charges accumulated in the electric charge accumulation means when the light projection means is not used;

setting means for independently setting a maximum accumulation time of the electric charges accumulated in the electric charge accumulation means in correspondence with the first and second distance measuring means; and control means for controlling the electric charge accumulation means in accordance with the maximum accumulation time set by the setting means.

More specifically, a distance measuring apparatus for measuring a distance to an object on the basis of reflected light from the object, comprises:

light-receiving means including a plurality of photoelectric conversion elements for receiving the reflected light;

A/D conversion means for A/D-converting signals from the light-receiving means;

correction means for detecting a level variation in signal A/D-converted by the A/D conversion means, and correcting the A/D-converted signals on the basis of a detection result; and distance calculation means for calculating the distance to the object on the basis of the signals corrected by the correction means.

More preferably, the apparatus further comprises light projection means for projecting signal light onto the object, and the distance calculation means includes:

first distance measuring means for calculating the distance to the object by performing a correlation calculation on the basis of the signals output from the light-receiving means when the light projection means is used; and second distance measuring means for calculating the distance to the object by performing a correlation calculation on the basis of the signals output from the light-receiving means when the light projection means is not used.

More specifically, a distance measuring apparatus which comprises light projection means for projecting signal light onto an object, and measures a distance to the object on the basis of reflected light obtained by projecting the signal light toward the object, comprises:

first and second light-receiving means for respectively outputting signals in accordance with an amount of the reflected light received from the object; and distance measuring means for calculating the distance to the object on the basis of two signals output from the first and second light-receiving means, the distance measuring means including:

discrimination means for discriminating, on the basis of the signals obtained by the first and second light-receiving means, whether or not a distance measurement performed by the distance measuring means is successful; and phase difference detection means for detecting a phase difference between the signals obtained by the first and second light-receiving means in accordance with a discrimination result of the discrimination means.

Preferably, the discrimination means discriminates contrast by performing a predetermined calculation for each of the signals, and comparing a calculation result with a predetermined value.

More specifically, a distance measuring apparatus which comprises light projection means for projecting signal light onto an object, and measures a distance to the object on the basis of reflected light obtained by projecting the signal light toward the object, comprises:

light-receiving means for outputting signals in accordance with an amount of the reflected light received from the object;

distance measuring means for calculating the distance to the object on the basis of the signals output from the light-receiving means;

first comparison means for comparing the distance calculated by the distance measuring means with a predetermined distance;

second comparison means for, when the first comparison means determines that the calculated distance is smaller than the predetermined distance, comparing the received-light amount of the light-receiving means with a predetermined light amount; and correction means for, when the second comparison means determines that the received-light amount is smaller than the predetermined light amount, correcting the calculated distance to be a predetermined value.

More specifically, a distance measuring apparatus which comprises light projection means for projecting signal light onto an object, and measures a distance to the object on the basis of reflected light obtained by projecting the signal light toward the object, comprises:

light-receiving means for outputting signals in accordance with an amount of the reflected light received from the object;

distance measuring means for calculating the distance to the object on the basis of the signals output from the light-receiving means;

first comparison means for comparing the distance calculated by the distance measuring means with a predetermined distance; and second comparison means for, when the first comparison means determines that the calculated distance is smaller than the predetermined distance, comparing the received-light amount of the light-receiving means with a predetermined light amount, wherein when the second comparison means determines that the received-light amount is smaller than the predetermined light amount, the distance measuring means performs a distance measurement by receiving the reflected light from the object without using the light projection means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 37A and 37B are views for explaining the actual distance measurement state in the present invention and prior art;

FIGS. 38A and 38B are views showing image signals on sensor arrays in the passive distance measurement mode;

FIGS. 50A to 5OF illustrate a method of reliability discrimination according to the fourth embodiment of the present invention.

DESCRIPTION OF THE PREFERRED EMBODIMENTS

<First Embodiment>

Figure 29:
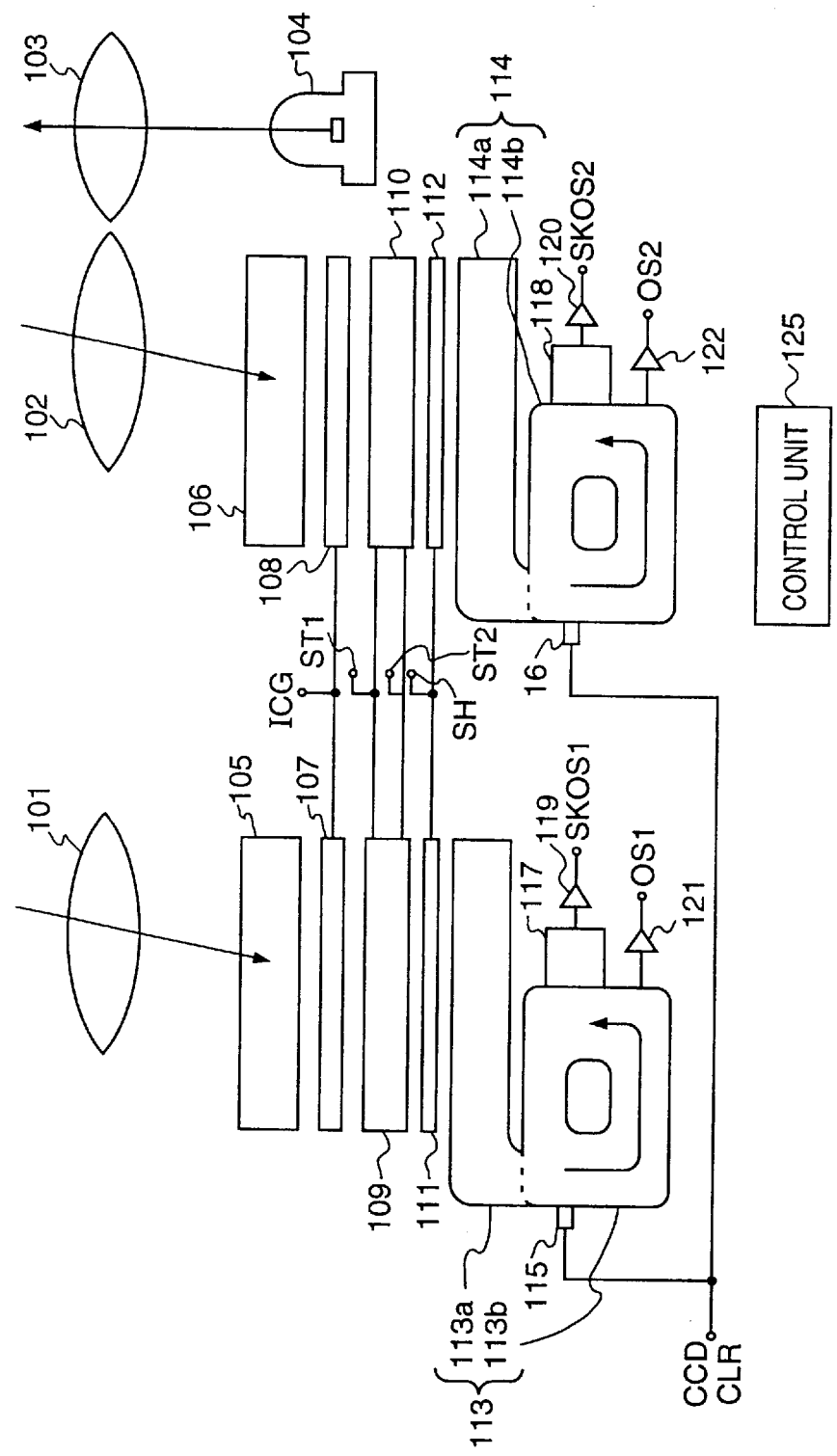
FIG. 29 is a block diagram showing the arrangement of a conventional distance measuring apparatus to which the present invention can also be applied.

An embodiment of a distance measuring apparatus to which the present invention can be applied and which method without using any light projection unit adopts the arrangement shown in FIG. 29.

In this case, assume that the processing operations based on the flow charts in the embodiments to be described later are executed by a control unit 125.

Note that a detailed description of the arrangement and operation of the distance measuring apparatus in FIG. 29 will be given later in the fourth embodiment.

The first embodiment will be described below with reference to FIGS. 1 to 3.

Figure 1:
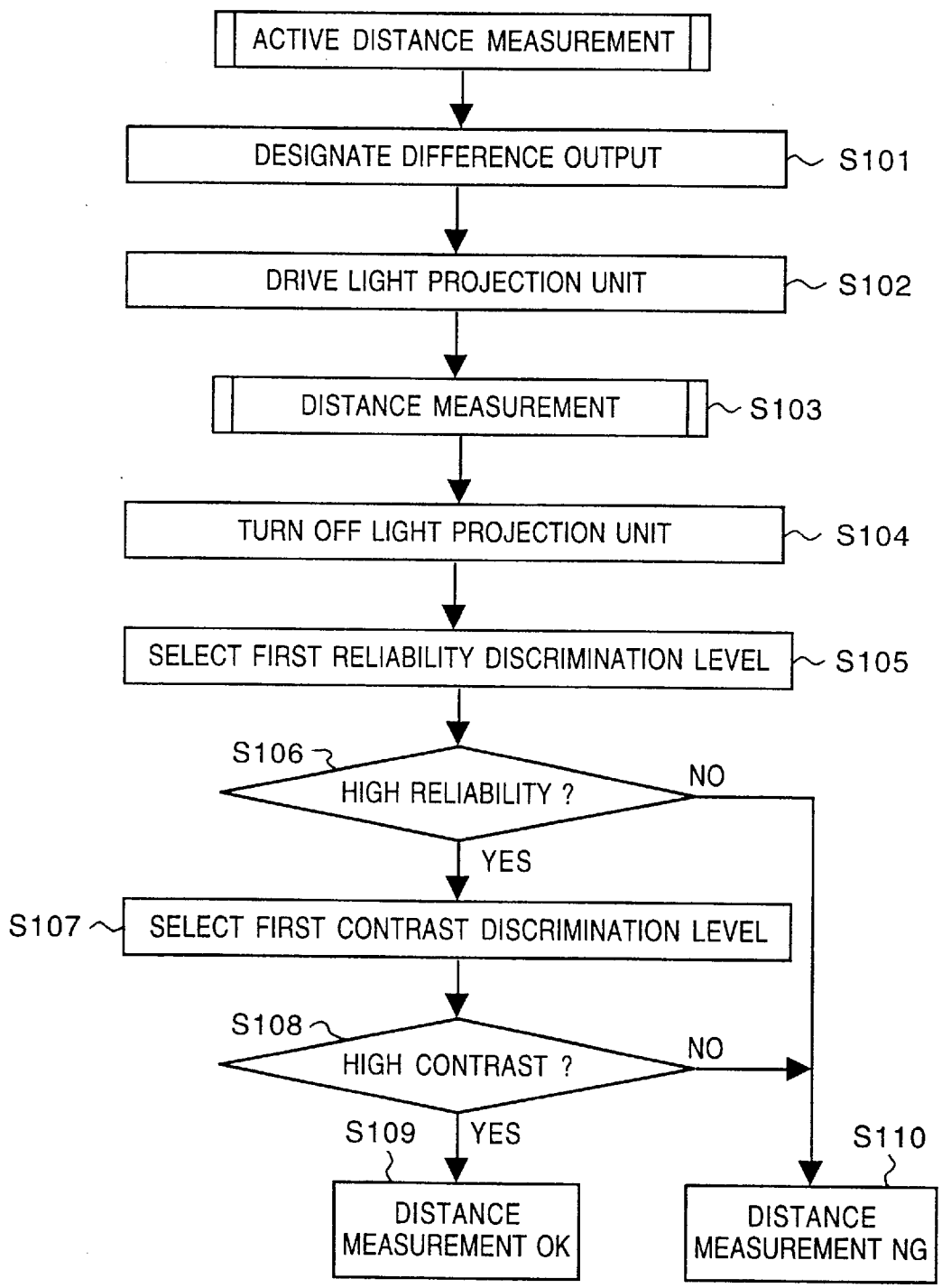
FIG. 1 is a flow chart showing the active distance measurement operation according to the first embodiment of the present invention.

FIG. 1 is a flow chart showing the operation of the active distance measurement method.

Referring to FIG. 1, in step S101 ("step" will be omitted hereinafter), the apparatus is set so that the difference output obtained by subtracting a signal obtained during the OFF period of the light projection unit from a signal obtained during the ON period of the light projection unit is obtained as the output of each sensor array, and the flow then advances to S102. In S102, ON/OFF light projection of the light projection unit is started, and the flow advances to S103. In S103, distance measurement processing is performed. The contents of this processing are shown in FIG. 3. Upon completion of the distance measurement processing, the flow advances to S104. In S104, the driving of the light projection unit is stopped, and the flow advances to S105. In S105, the first reliability discrimination level of the active distance measurement method is selected, and the flow advances to S106. In S106, it is checked if the distance measurement value obtained in S103 has reliability higher than the first reliability discrimination level. If YES in S106, the flow advances to S107; otherwise, the flow advances to S110. In S107, the first contrast discrimination level of the active distance measurement method is selected, and the flow advances to S108. In S108, it is checked if the contrast value of image data obtained in S103 is higher than the first contrast discrimination level. If YES in S108, the flow advances to S109; otherwise, the flow advances to S110. In S109, it is determined that the distance measurement value obtained in S103 has both high reliability and contrast and the distance measurement is successful, thus selecting the distance measurement value. In S110, it is determined that either reliability or contrast is low and the distance measurement is not successful.

Figure 2:
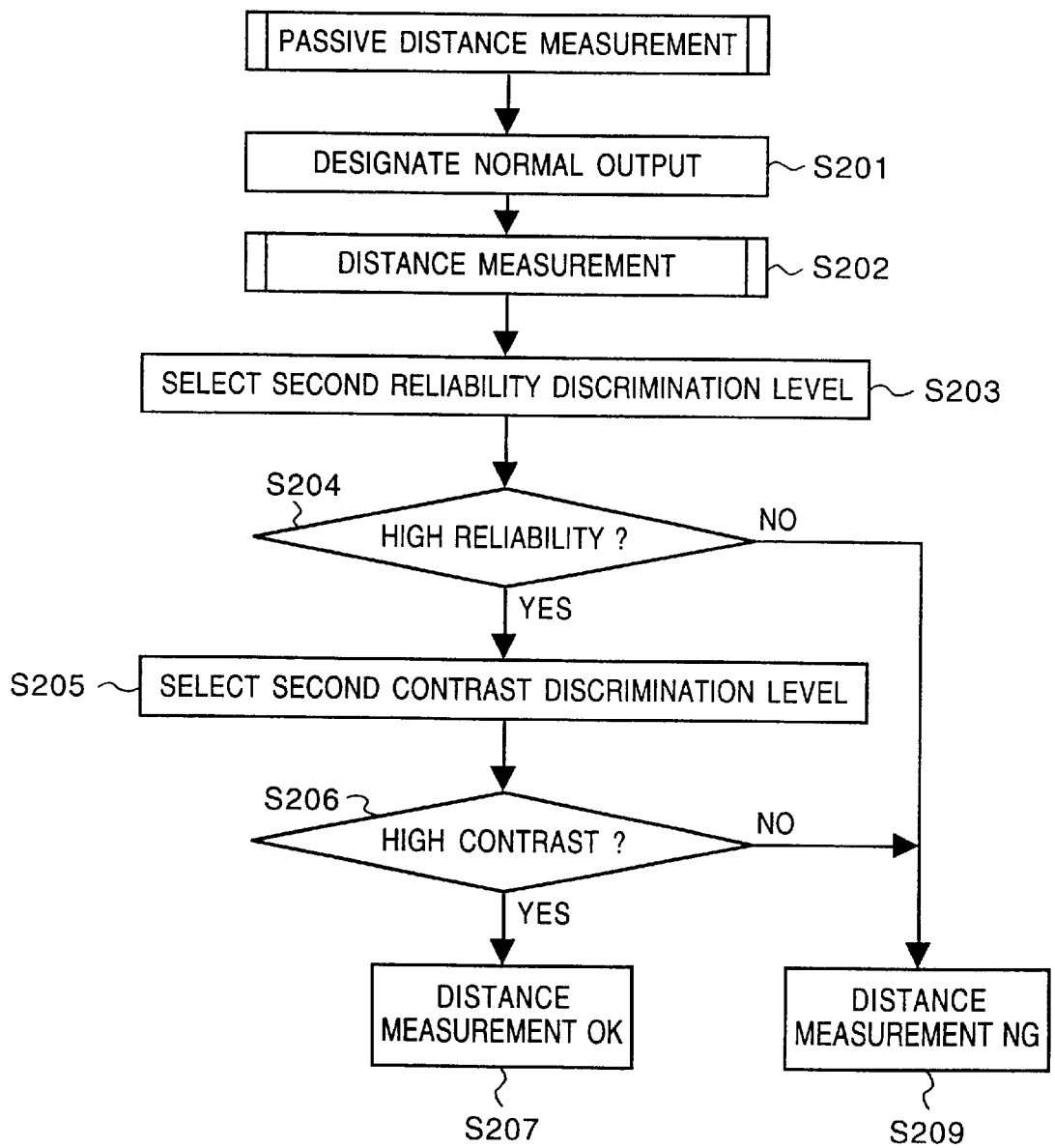
FIG. 2 is a flow chart showing the passive distance measurement operation according to the first embodiment of the present invention.

FIG. 2 is a flow chart for explaining the operation of the passive distance measurement method. In S201, the apparatus is directed, so that pixel signals are obtained as the individual outputs from the sensor arrays, and the flow advances to S202. In S202, distance measurement processing is performed. The contents of this processing are shown in FIG. 3. Upon completion of the distance measurement processing, the flow advances to S203. In S203, the second reliability discrimination level of the passive distance measurement method is selected, and the flow advances to S204. In S204, it is checked if the distance measurement value obtained in S202 has reliability higher than the second reliability discrimination level. If YES in S204, the flow advances to S205; otherwise, the flow advances to S209. In S205, the second contrast discrimination level of the passive distance measurement method is selected, and the flow advances to S206. In S206, it is checked if the contrast value of image data obtained in S202 is higher than the second contrast discrimination level. If YES in S206, in S207 it is determined that the distance measurement value obtained in S202 has both high reliability and contrast and the distance measurement is successful, thus selecting the distance measurement value. In S209, it is determined that either reliability or contrast is low and the distance measurement is not successful.

Figure 3:
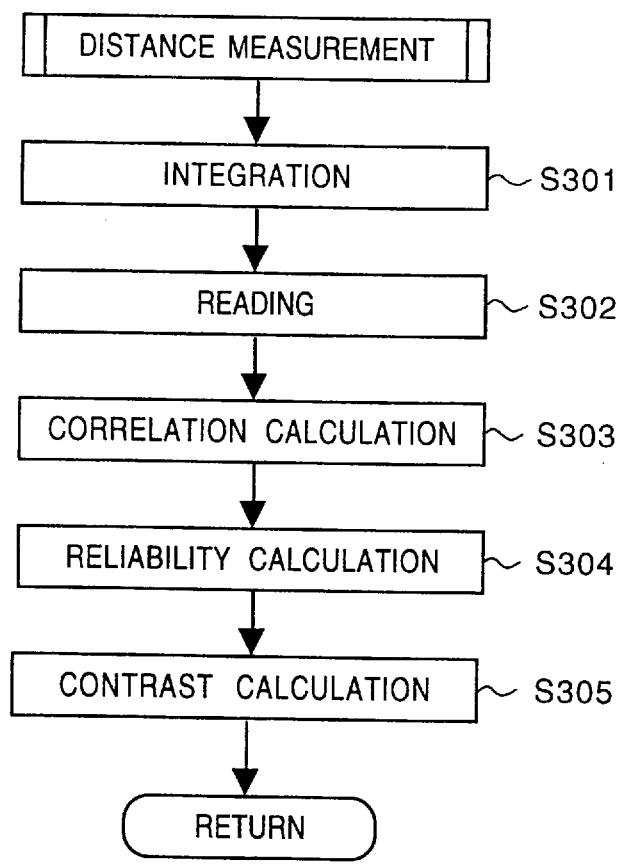
FIG. 3 is a flow chart showing the overall distance measurement operation according to the first embodiment of the present invention

FIG. 3 is a flow chart common to S103 in FIG. 1 and S202 in FIG. 2 and showing the contents of the distance measurement processing. In S301, charges generated by the respective sensor arrays are integrated, and the integration ends after a predetermined amount of charges are obtained or an elapse of a predetermined period of time. The flow then advances to S302. In S302, the integrated charges are read out in units of pixels. In this case, one of the difference output or normal output is designated in correspondence with the active or passive distance measurement mode. If the difference output is selected, the difference output between signals obtained during the ON and OFF periods of the light projection unit is read out from each pixel; if the normal output is selected, the output corresponding to one of the ON and OFF periods of the light projection unit is read out from each pixel. Thereafter, the flow advances to S303. In S303, correlation calculations of image signals obtained in S302 are performed to obtain the distance measurement value, and the flow advances to S304. In S304, a reliability value that indicates the degree of coincidence between two received-light images on the basis of which the distance measurement value is obtained is calculated, and the flow advances to S305. As the factors that impair reliability, perspective conflict or the like is known in the passive distance measurement method, and shot noise, addition of noise upon circulating charges in a skim unit or ring CCD, and the like are known in the active distance measurement method. In S305, a contrast value indicating the contrast of the image signal obtained in S302, e.g., the sum total of differential values, is calculated.

As the above-mentioned reliability discrimination levels and contrast discrimination levels, appropriate values are stored in advance in a ROM (not shown) in the control unit 125.

According to this embodiment, since the active and passive distance measurement methods respectively have the reliability or contrast discrimination levels, an optimal distance measuring system which can use identical calculation processing without complicating a system such as software or the like and is free from any deterioration of performance in the respective distance measurement methods can be provided.

Figure 4:
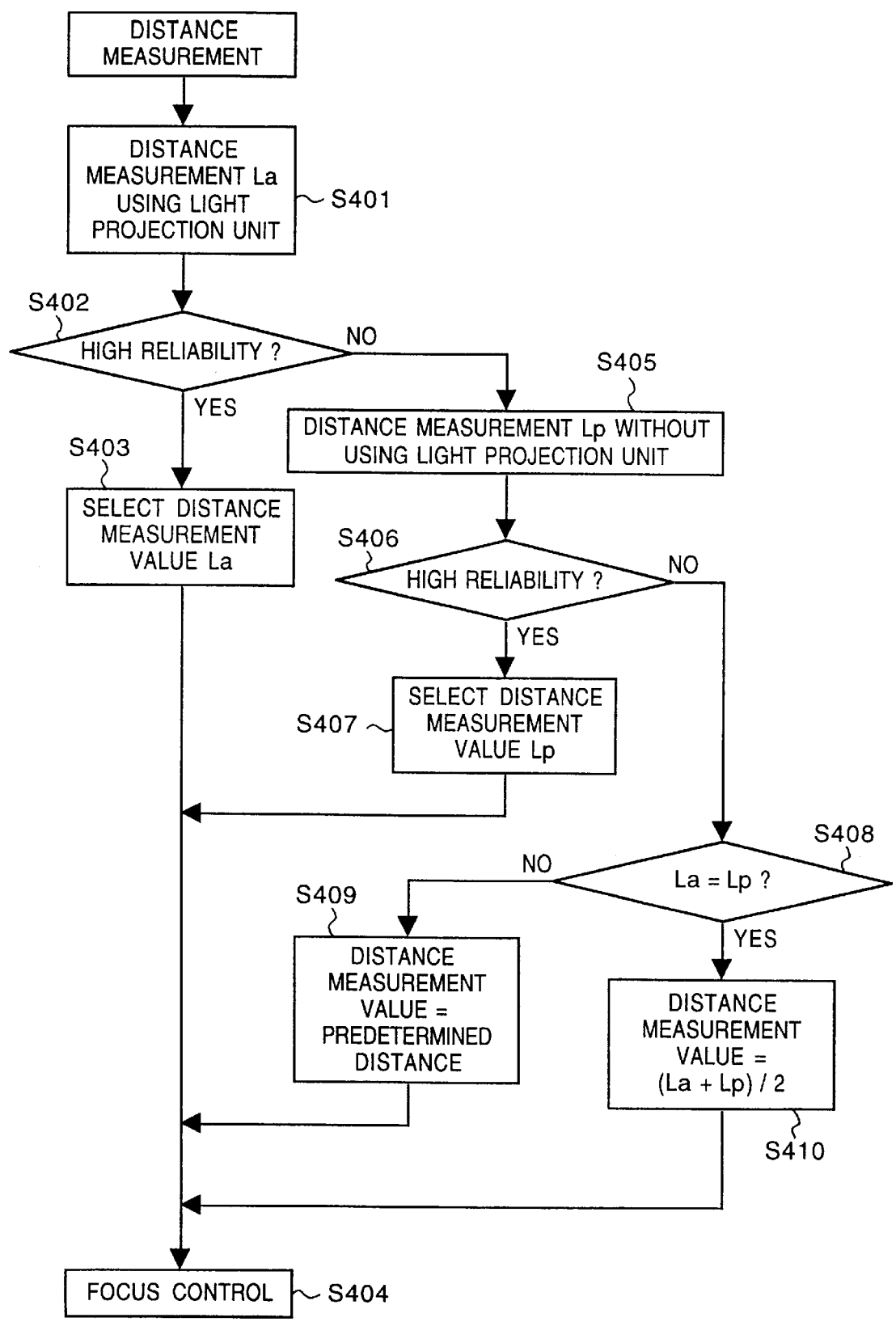
FIG. 4 is a flow chart showing the distance measurement operation according to the first modification of the first embodiment of the present invention.

FIG. 4 is a flow chart for explaining the operation according to the first modification of the first embodiment.

In S401, a distance measurement result La is obtained by the active distance measurement method, and the flow advances to S402. In S402, it is checked if the result La has high reliability. If YES in S402, the flow advances to S403; otherwise, the flow advances to S405. In S403, the result La is selected as a distance measurement result, and the flow advances to S404. In S405, a distance measurement result Lp is obtained by the passive distance measurement method, and the flow advances to S406. In S406, it is checked if the result Lp has high reliability. If YES in S406, the flow advances to S407; otherwise, the flow advances to S408. In S407, the result Lp is selected as a distance measurement result, and the flow advances to S404. In S408, it is checked if the value of the result La is nearly equal to that of the result Lp, i.e., if the distance falls within the field depth. If YES in S408, the flow advances to S410; otherwise, the flow advances to S409. In S410, (La+Lp)/2 is calculated as the distance measurement result, and the flow advances to S404. In S409, it is determined that none of distance measurement results have high reliability, and a predetermined distance is selected as the distance measurement result. Thereafter, the flow advances to S404. Note that the predetermined distance is, e.g., infinity. In S404, a photographing lens of the camera is focus-controlled based on the selected distance measurement value.

Figure 5:
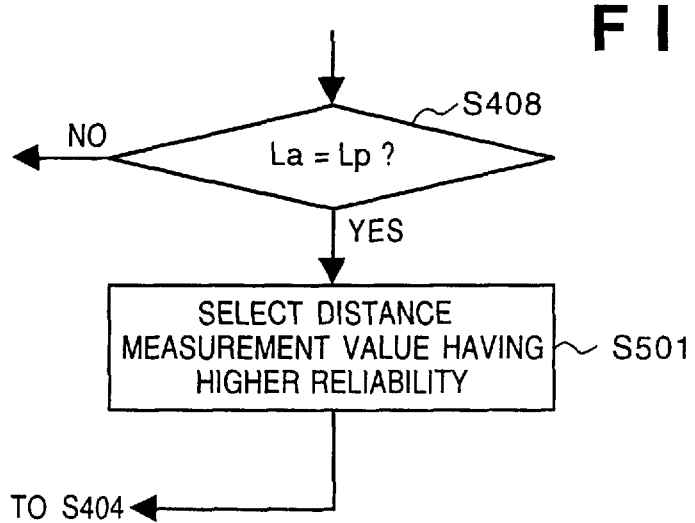
FIG. 5 is a flow chart showing some steps of the distance measurement operation according to the second modification of the first embodiment of the present invention.

FIG. 5 is a flow chart showing some steps of the second modification of the first embodiment, and shows only steps different from FIG. 4. S501 is inserted in place of S410 in FIG. 4. In S501, when La and Lp are nearly equal to each other, the two results are compared with each other, and a distance measurement value whose reliability is higher than the other is selected as the distance measurement result.

Figure 6:
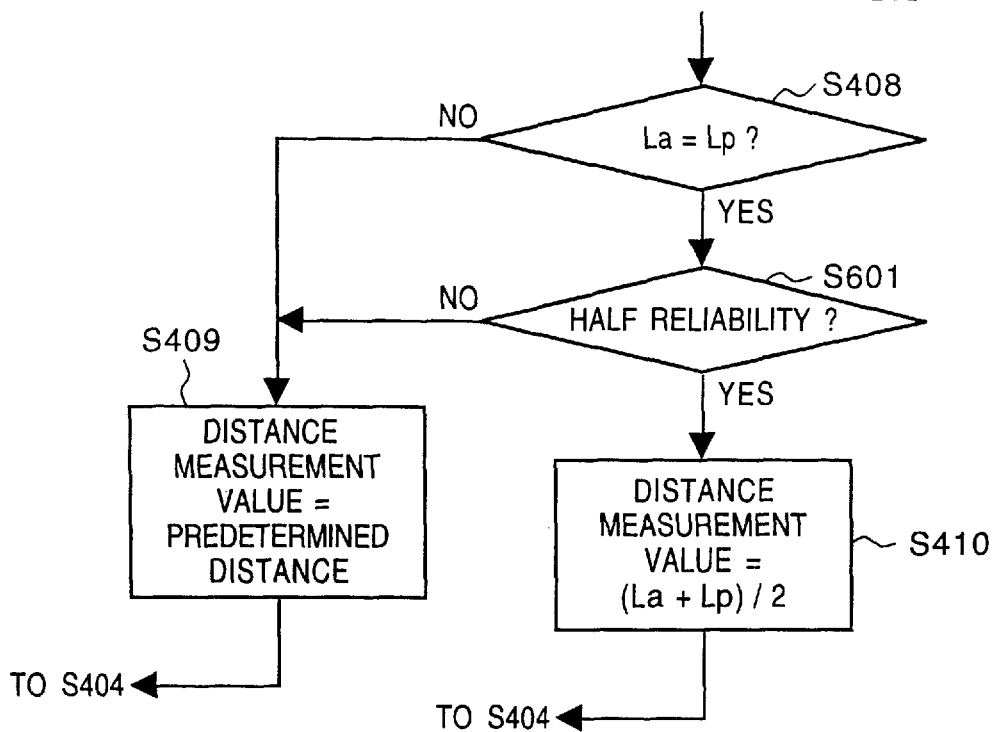
FIG. 6 is a flow chart showing some steps of the distance measurement operation according to the third modification of the first embodiment of the present invention.

FIG. 6 is a flow chart showing some steps of the third modification of the first embodiment, and similarly shows only steps different from FIG. 4.

S601 is inserted between S408 and S410 in FIG. 4. In S601, when La and Lp are nearly equal to each other, and when one of them is half of the reliability discrimination level, the flow advances to S410. If neither of the results have reliability, the flow advances to S409.

According to the first to third modifications above, the active distance measurement method is preferentially executed in consideration of its merits, i.e., that the active distance measurement method is free from any distance measurement errors caused by a repetitive pattern or perspective conflict, and has very high performance in the near-distance range. Only when the distance measurement result has low reliability, the passive distance measurement method is executed, thus obtaining a distance measurement value with higher precision.

Also, when the active distance measurement result has sufficiently high reliability, passive distance measurements can be inhibited to prevent release time lags from being unnecessarily prolonged.

Furthermore, when the two distance measurement values have low reliability and are nearly equal to each other, their average value is adopted, thus attaining a relatively satisfactory AF operation.

The fourth modification of the first embodiment will be described below.

Figure 7:
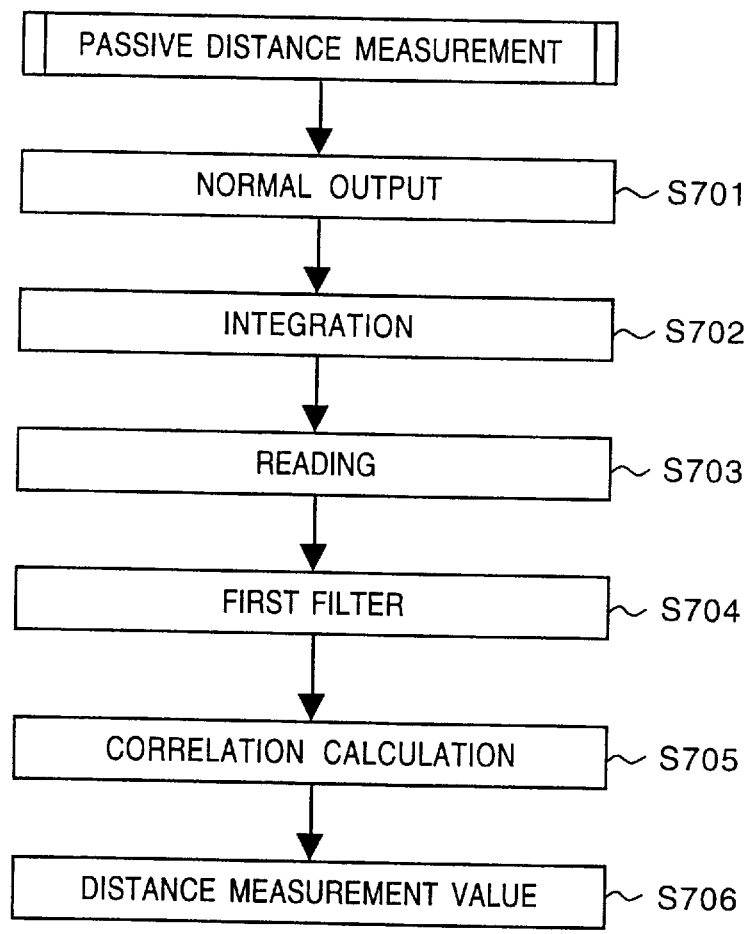
FIG. 7 is a flow chart showing the active distance measurement operation according to the fourth modification of the first embodiment of the present invention.

FIG. 7 is a flow chart for explaining the operation of the passive distance measurement method. In S701, the outputs from the sensor arrays are set to be normal outputs, and the flow advances to S702. In S702, integration is started. The integration ends after a predetermined signal level is reached or after an elapse of a predetermined period of time, and the flow advances to S703. In S703, image signals are read out, and the flow advances to S704. In S704, the first filter processing is performed for the image signals obtained in S703, and the flow then advances to S705. In this filter processing, spatial frequency components in a low-frequency region are reduced. In S705, correlation calculations are performed using the image signals subjected to the filter processing in S704, and the flow advances to S706. In S706, the result obtained in S705 is adopted as the distance measurement value.

Figure 8:
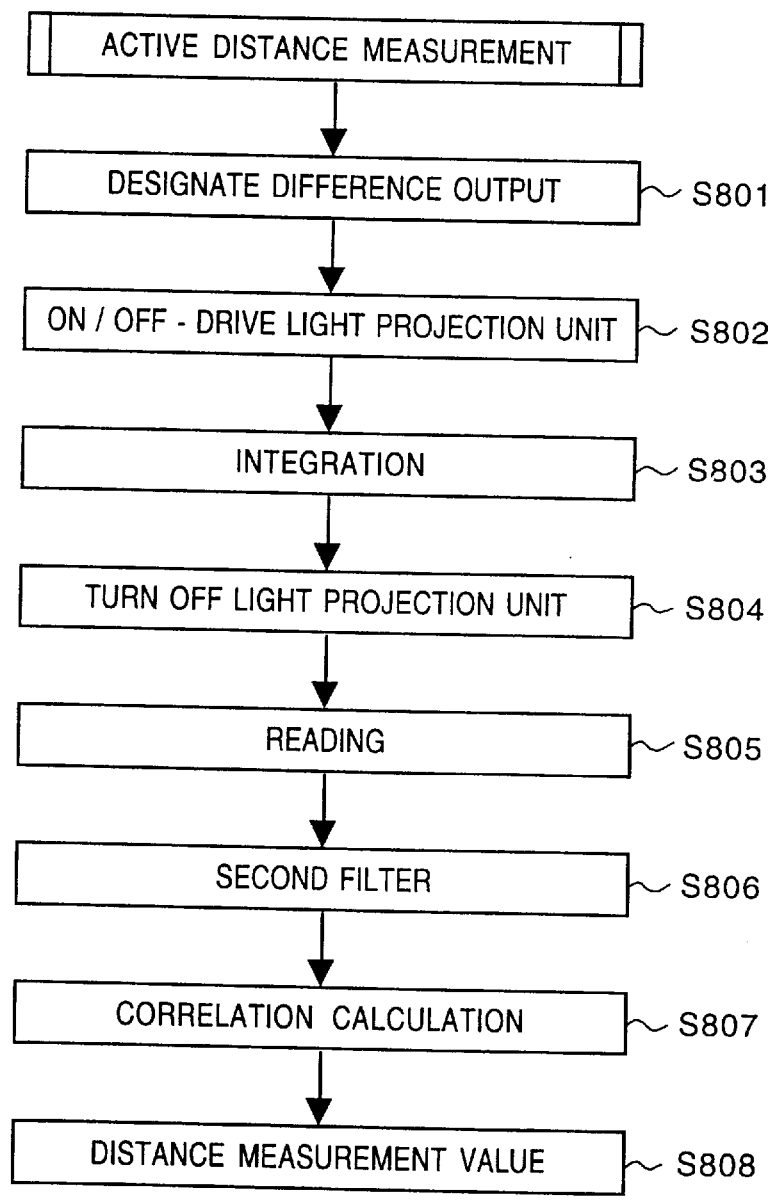
FIG. 8 is a flow chart showing the passive distance measurement operation according to the fourth modification of the first embodiment of the present invention.

FIG. 8 is a flow chart for explaining the operation of the active distance measurement method. In S801, the outputs from the sensor arrays are set to be difference outputs, and the flow advances to S802. In S802, ON/OFF driving of the light projection unit is started, and the flow advances to S803. In S803, integration is performed as in S702, and the flow advances to S804. In S804, the driving of the light projection unit is stopped, and the flow advances to S805. In S805, image signal are read out as in S703, and the flow advances to S806. In S806, the second filter processing is performed for the image signals obtained in S805, and the flow then advances to S807. In the second filter processing, spatial frequency components in a high-frequency region are attenuated. In S807, correlation calculations are performed as in S705, and the flow advances to S808. In S808, the correlation result obtained in S807 is adopted as the distance measurement value.

According to this modification, by performing different filter processing operations for the obtained image signals in the active and passive distance measurement methods, optimal distance measurements can be attained in these two methods. More specifically, in the active distance measurement mode, shot noise is generated due to external light to have no correlation among pixels, and has a high spatial frequency. Also, an image signal obtained by subtracting external light components corresponds to a received-light image formed based on light projected by the light projection unit, and does not have any high spatial frequency. Accordingly, by attenuating a high-frequency region, noise alone can be removed without influencing image signals. In the passive distance measurement method, various image signals are obtained, but shot noise need not be taken into consideration. However, when an offset of the entire image is generated, reliability of an image is impaired. Especially, in the apparatus used in the present invention, when charges are circulated around the ring CCD, the offset varies depending on the number of rounds on the ring CCD. For this reason, in the passive distance measurement method, the distance measurement performance can be improved by attenuating a low-frequency region.

Figure 9:
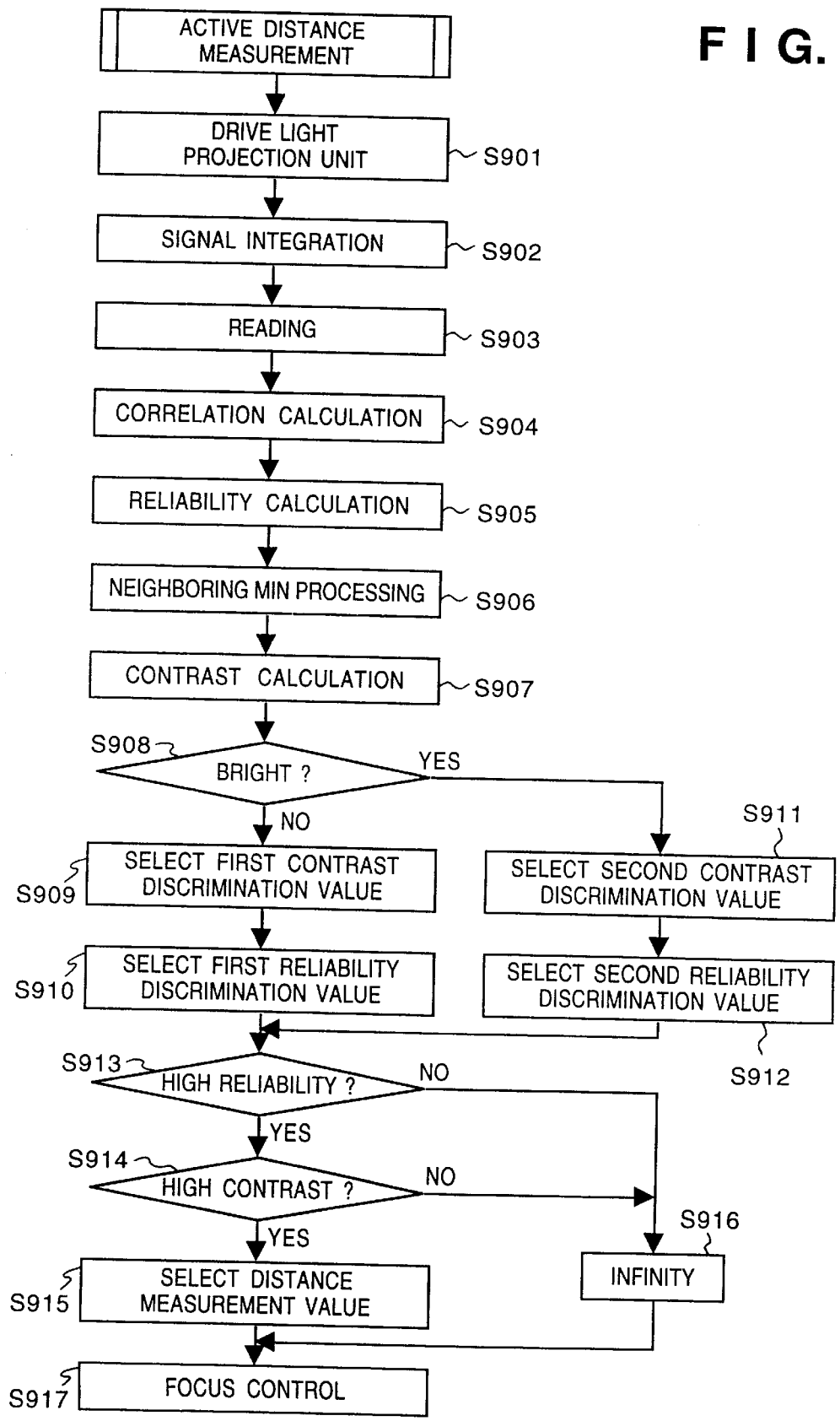
FIG. 9 is a flow chart showing the active distance measurement operation according to the fifth modification of the first embodiment of the present invention.

FIG. 9 is a flow chart for explaining the operation according to the fifth modification of the first embodiment.

In S901, ON/OFF light projection of the light projection unit is started, and the flow advances to S902. In S902, charges generated by the sensor arrays are integrated, and the integration ends after a predetermined amount of charges are obtained or after an elapse of a predetermined period of time. Thereafter, the flow advances to S903. In S903, the integrated charges are read out in units of pixels. In this case, difference outputs between the ON and OFF periods of the light projection unit are read out in units of pixels, and the flow advances to S904. In S904, correlation calculations are performed using image signals obtained in S903 to obtain a distance measurement value, and the flow advances to S905. In S905, a reliability value that indicates the degree of coincidence between two images on the basis of which the distance measurement value is obtained is calculated, and the flow advances to S906. As the factors that impair reliability, shot noise, addition of noise upon circulating charges in a skim unit or ring CCD, and the like are known in the active distance measurement method.

Figure 11A:
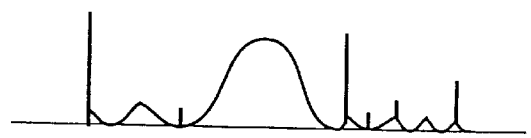
FIGS. 11A and 11B are signal waveform charts showing the distance measurement operation according to the fifth and sixth modifications of the first embodiment of the present invention.
Figure 11B:
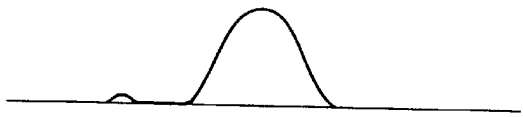

In S906, a new image signal is obtained by selecting a smaller value of two neighboring pixels obtained in S902 while shifting the pixel position one by one, and the flow advances to S907. FIGS. 11A and 11B show changes in actual image signal upon executing this processing. FIG. 11A shows an image signal obtained in S903. A round image of the light projection unit is present at the center in FIG. 11A, and shot noise components due to external light or noise components generated due to circulation around the ring are present. When the processing in S906 is performed, an image signal shown in FIG. 11B is obtained. Although some noise components remain depending on their ways of generation, sharp noise components with large peak values are removed in FIG. 11B. For this reason, discrimination errors of high contrast due to the presence of sharp peaks even though no image signal is obtained can be prevented.

In S907, a contrast value indicating the contrast of the image signal obtained in S906, e.g., the sum total of differential values, is calculated, and the flow then advances to S908. In S908, the amount of external light components is checked. That is, the amount of light components reset by skimming is checked. As the checking method, the degree of skimming may be checked, or another photometry unit may be used. If the amount of light components reset by skimming is large, i.e., if it is bright, the flow advances to S911; otherwise, the flow advances to S909. In S911, the second contrast discrimination value is selected, and the flow advances to S912. In S912, the second reliability discrimination value is selected, and the flow advances to S913. If it is determined in S908 that the amount of light components reset by skimming is small, i.e., if it is dark, the flow advances to S909, and the first contrast discrimination value is selected. Then, the flow advances to S910.

In S910, the first reliability discrimination value is selected, and the flow advances to S913. In S913, the reliability value calculated in S905 is compared with the reliability discrimination value selected in S910 or S912 to check if reliability is high. If YES in S913, the flow advances to S914; otherwise, the flow advances to S916. In S914, the contrast value obtained in S907 is compared with the contrast discrimination value selected in S909 or S911, and if contrast is high, the flow advances to S915; otherwise, the flow advances to S916. In S915, since it is determined that both the reliability and contrast are high, the distance measurement value obtained in S904 is selected, and the flow advances to S917. In S916, since it is determined that either reliability or contrast is low, the distance measurement result is set to be infinity, and the flow advances to S917. In S917, the photographing lens or the like of the camera is driven to execute focusing control.

Figure 10:
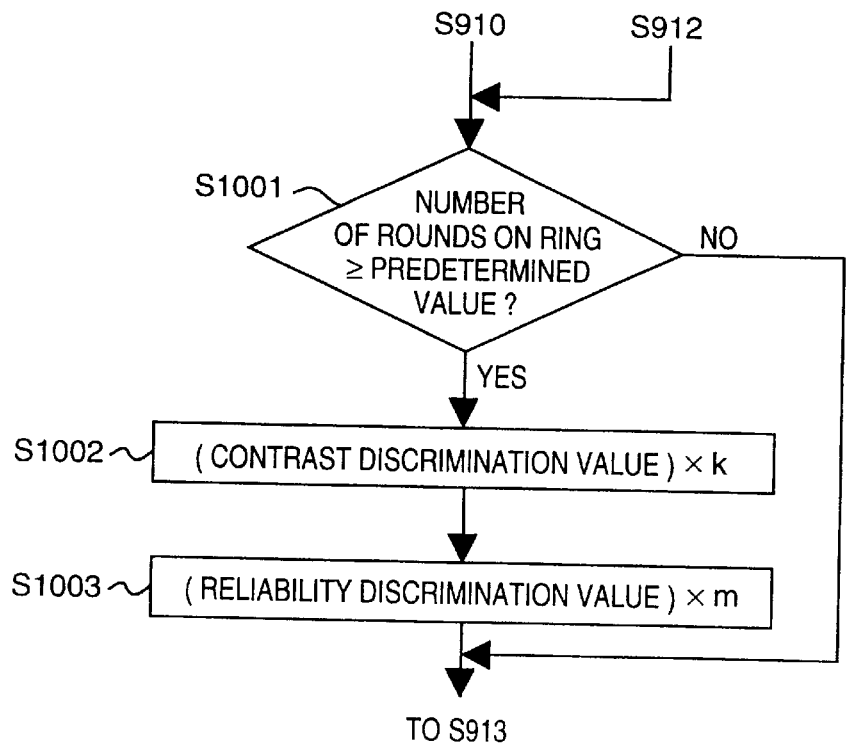
FIG. 10 is a flow chart showing some steps of the active distance measurement operation according to the sixth modification of the first embodiment of the present invention.

FIG. 10 is a flow chart for explaining the operation according to the sixth modification of the first embodiment. In this flow chart, S1001 to S1003 are inserted between S910 and S913 in FIG. 9. In S1001, it is checked if the number of rounds on the ring CCD exceeds a predetermined value. When the number of rounds on the ring CCD exceeds the predetermined value, this means that the integration time is long and the integrated amount of external light components to be reset is also large. In addition, nonuniformity of the respective portions of each sensor array is amplified due to skim noise and circulation. If YES in S1001, the flow advances to S1002; otherwise, the flow advances to S913. In S1002, the contrast discrimination value selected in S906 or S911 is multiplied by k to prevent discrimination errors against noise, and the flow advances to S1003. In S1003, the reliability discrimination value obtained in S910 or S912 is similarly multiplied by m, and the flow advances to S913.

In the fifth and sixth modifications, two different discrimination values and the like are selected. However, the discrimination values and the like may be determined using a function or the like.

According to the fifth and sixth modifications, since a unit for changing the reliability or contrast discrimination level of the active distance measurement method in correspondence with the luminance or the number of rounds on the ring is used, an optimal distance measuring system free from any deterioration of performance can be provided.

Paying attention to the absence of correlations of noise among pixels in calculating the contrast value, an image signal is formed by selecting smaller values of neighboring pixels, and contrast discrimination is made based on the formed image signal, thus preventing discrimination errors of high contrast due to noise. The reason why smaller values are selected is that noise components on the minus side are limited upon calculating differences in terms of the principle of skimming described as one apparatus used in the present invention.

As described above, according to this embodiment, since the active and passive distance measurement methods respectively have certain reliability or contrast discrimination levels, an optimal distance measuring system which can use identical calculation processing without complicating a system such as software or the like and is free from any deterioration of performance in the respective distance measurement methods can be provided.

According to this embodiment, the active distance measurement method is preferentially executed in consideration of its merits, i.e., that the active distance measurement method is free from any distance measurement errors caused by a repetitive pattern or perspective conflict, and has very high performance in the near-distance range, thus obtaining a distance measurement value with higher precision. Also, when the active distance measurement result has sufficiently high reliability, passive distance measurements can be inhibited to prevent release time lags from being nonsensically prolonged.

Furthermore, when the two distance measurement values have low reliability and are nearly equal to each other, their average value is adopted to minimize the defocus amount.

According to this embodiment, appropriate noise reduction is performed in each of the active and passive distance measurement methods, and the distance measurement precision can be improved.

Moreover, according to this embodiment, since the reliability or contrast discrimination level of the active distance measurement method is changed in correspondence with the luminance or the number of rounds on the ring, an optimal distance measuring system free from any deterioration of performance can be provided.

Paying attention to the absence of correlations of noise among pixels in calculating the contrast value, contrast discrimination is made based on an image signal formed by selecting smaller values of neighboring pixels, thus preventing discrimination errors of high contrast due to noise.

<Second Embodiment>

Figure 12:
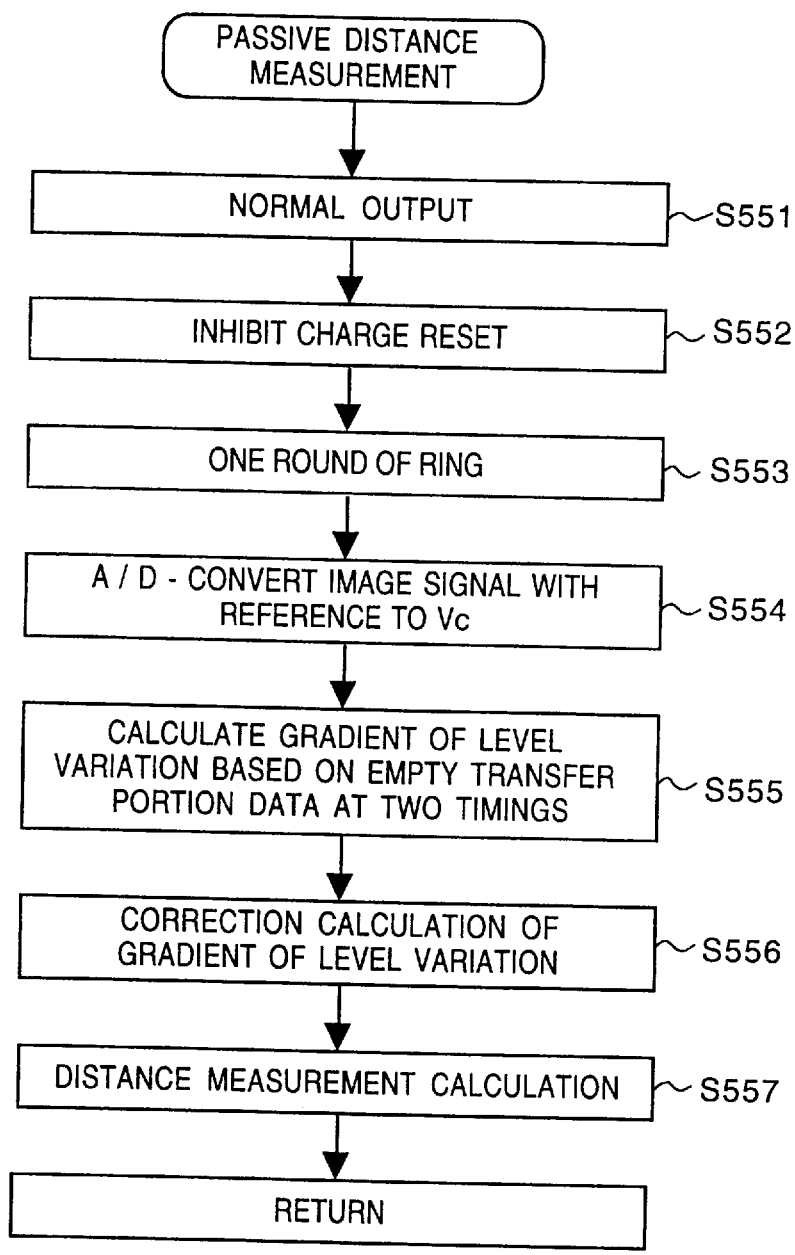
FIG. 12 is a flow chart for explaining the distance measurement operation according to the second embodiment of the present invention.

The second embodiment of the present invention will be described below with reference to FIG. 12.

Originally, in a distance measuring apparatus using skim CCD sensors and the like, the levels of the above-mentioned empty transfer portions including no signals never vary independently of their timings. However, when charges gradually flow into a transfer CCD (e.g., a ring CCD) due to dark current or external light components, the levels of even the empty transfer portions irregularly vary.

In view of this problem, in this embodiment, in a distance measuring apparatus which uses a light-receiving unit including a sensor array consisting of a plurality of photo-electric conversion elements, when signals from the sensor array are accumulated, transferred, and output, irregular changes in output signal are detected using a plurality of empty transfer portion outputs including no signals and are corrected from signals obtained by the sensor array, and thereafter, correlation calculations are performed, thus eliminating distance measurement errors.

The above-mentioned correction is performed in only the passive distance measurement mode in a hybrid distance measuring apparatus that performs both active and passive distance measurements, thereby shortening the distance measurement time without any undue calculations.

This embodiment will be described below with reference to FIGS. 39A and 39B. Note that an explanation of FIGS. 39A and 39B has already been given, and a repetitive description thereof will be avoided.

Figure 39B:
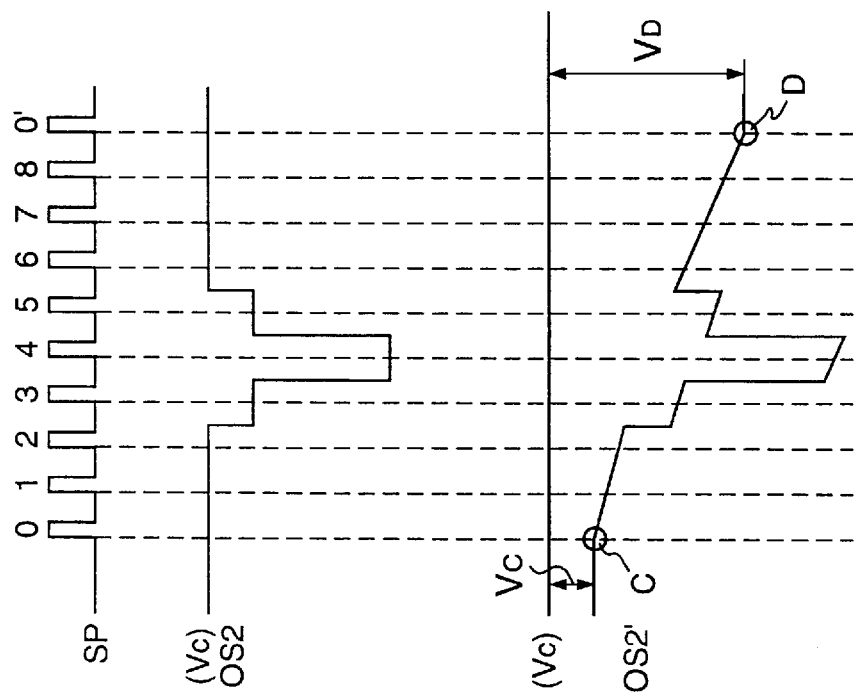
FIGS. 39A and 39B are timing charts upon fetching the image signals in the passive mode and output waveform charts of an image signal output unit.
Figure 39A:
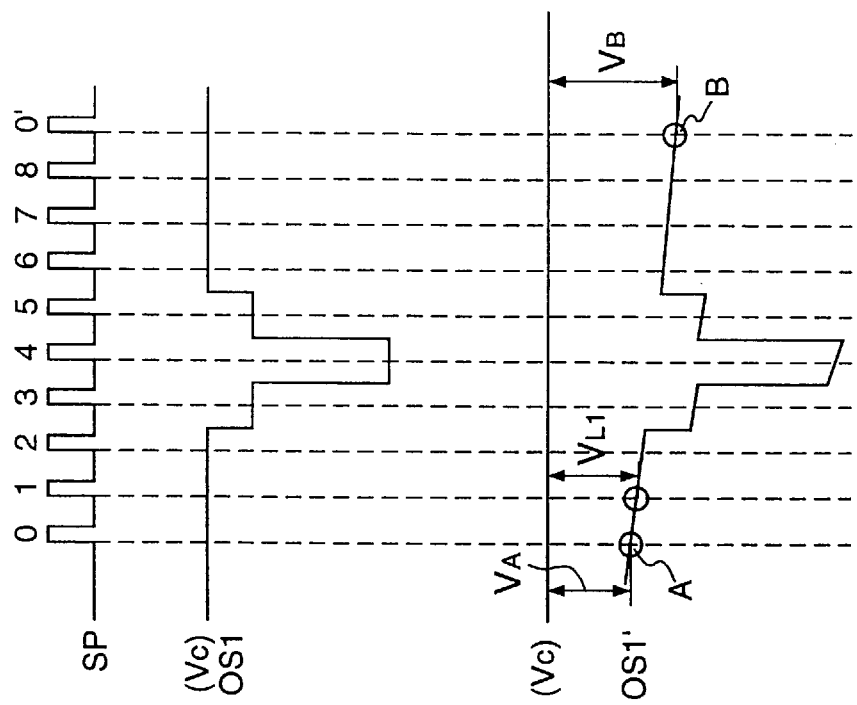

The waveforms OS1' and OS2' in FIGS. 39A and 39B are obtained when charges gradually flow into transfer CCDs (e.g., ring CCDs) due to dark current or external light components. In this case, as the A/D-conversion timing becomes later, the amount of unwanted electric charges accumulated increases, as has already been described above. In the waveform OS1', irregular changes in signal output from the sensor array correspond to the difference between empty transfer portions B and A, i.e., $(V_B-V_A)$ in nine transfer portions {(L1 to L8)+one empty transfer portion}, while in the waveform OS2', irregular changes correspond to the difference between the empty transfer portions D and C, i.e., $(V_D-V_C)$ in nine transfer portions {(R1 to R8)+one empty transfer portion}.

The respective sensor signal outputs (e.g., $V_{L1}, \ldots, V_{L8}$, $V_{R1}, \ldots, V_{R8}$) are corrected by the following calculations:

$$V_{L1} = V_{L1} - V_A + \{(V_B - V_A)/9\} \quad (2)$$

.
.
.

$$V_{L8} = V_{L8} - V_A + \{(V_B - V_A)/9\} \quad (3)$$

$$V_{R1} = V_{R1} - V_C + \{(V_D - V_C)/9\} \quad (4)$$

.
.
.

$$V_{R8} = V_{R8} - V_C + \{(V_D - V_C)/9\} \quad (5)$$

Figure 40A:
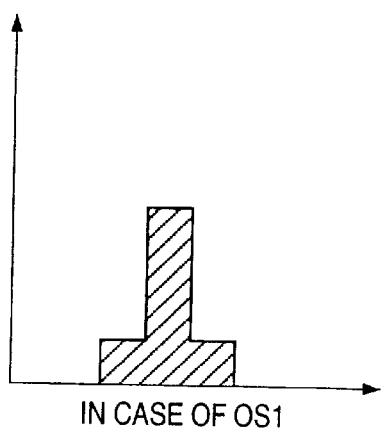
FIGS. 40A to 40D are signal waveform charts showing the signal waveforms obtained by A/D-converting image signal outputs in the passive mode.
Figure 40B:
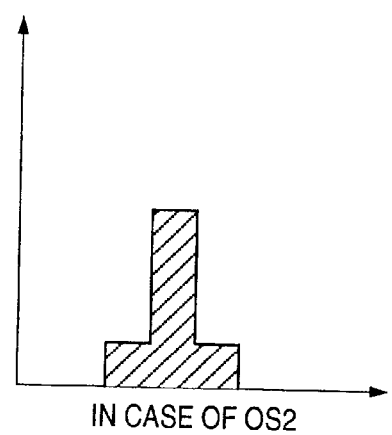
Figure 40C:
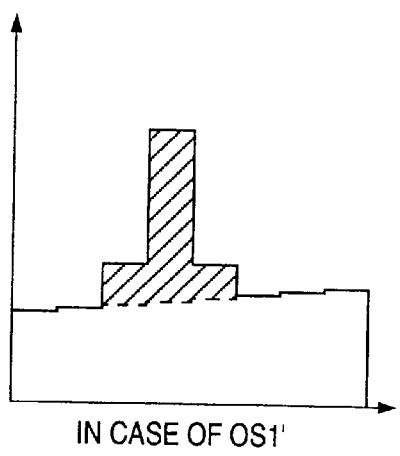
Figure 40D:
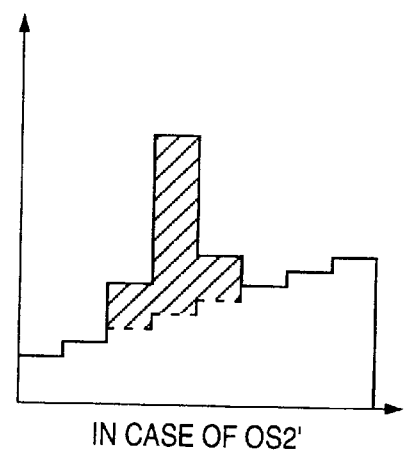
Figure 41:
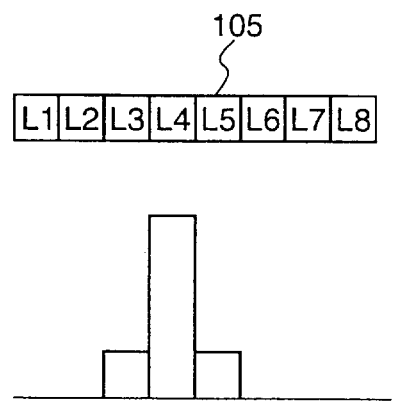
FIG. 41 is a view showing an image signal on a sensor array in the active distance measurement mode.
Figure 42:
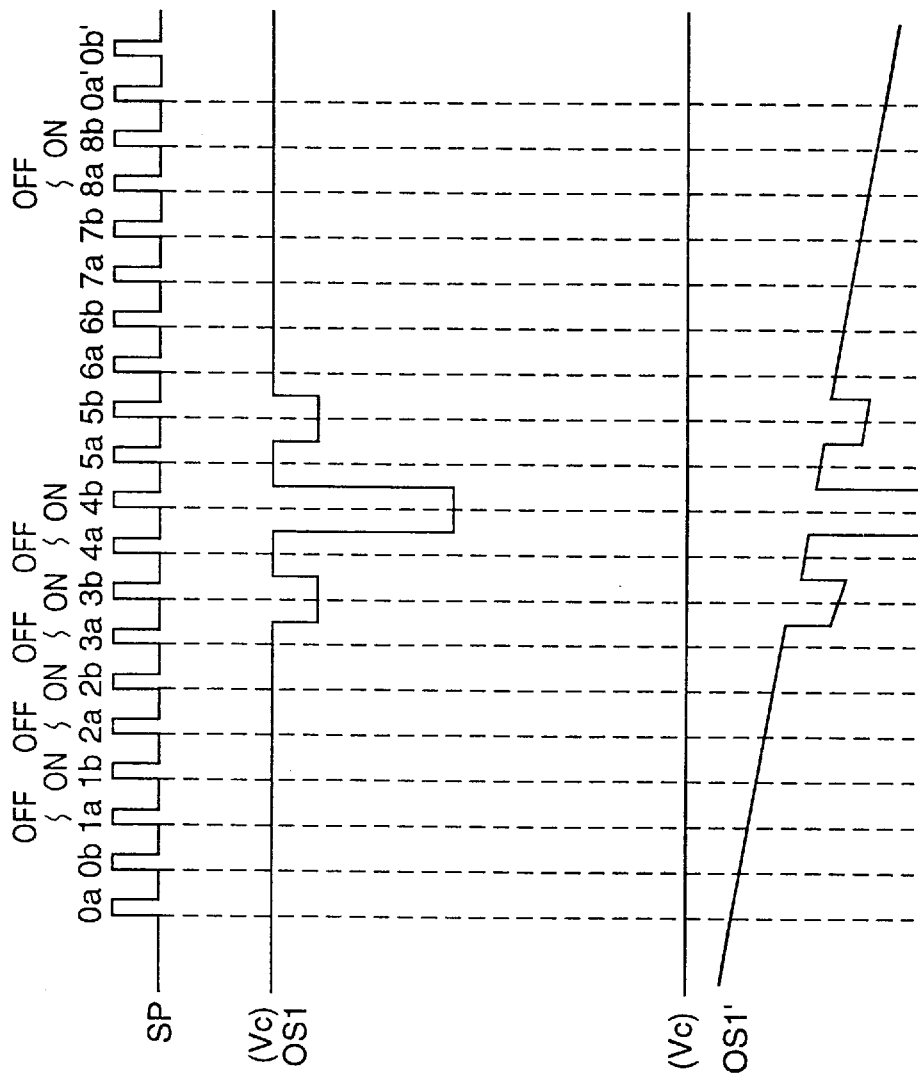
FIG. 42 is a timing chart upon fetching the image signal in the active mode and an output waveform chart of the image signal output unit.
Figure 43A:
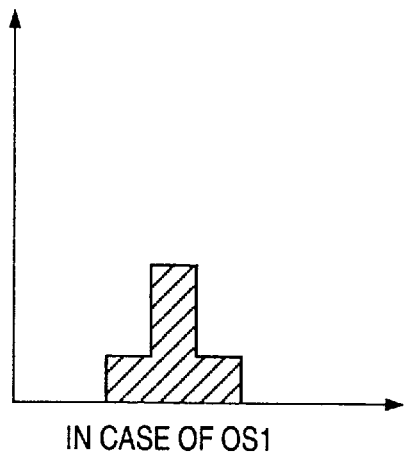
FIGS. 43A and 43B are signal waveform charts showing the signal waveforms obtained by A/D-converting image signal outputs in the active mode.
Figure 43B:
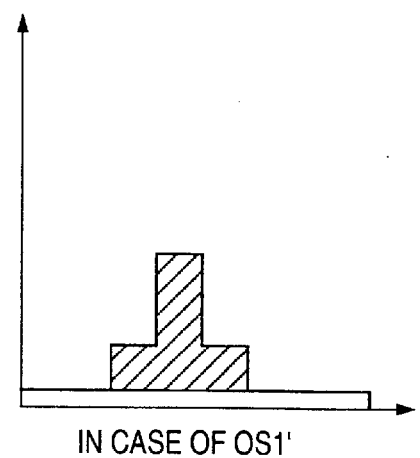
Figure 44:
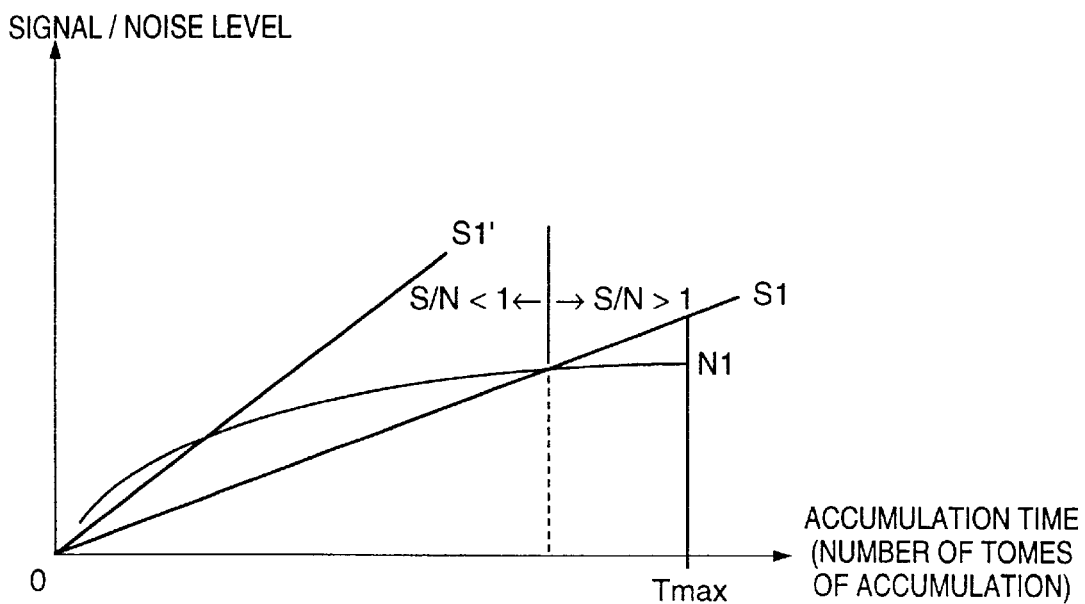
FIG. 44 is a graph showing the relationship among the accumulation time, signal components, and noise generated during charge transfer and electric charge accumulation in the active distance measurement mode.
Figure 45:
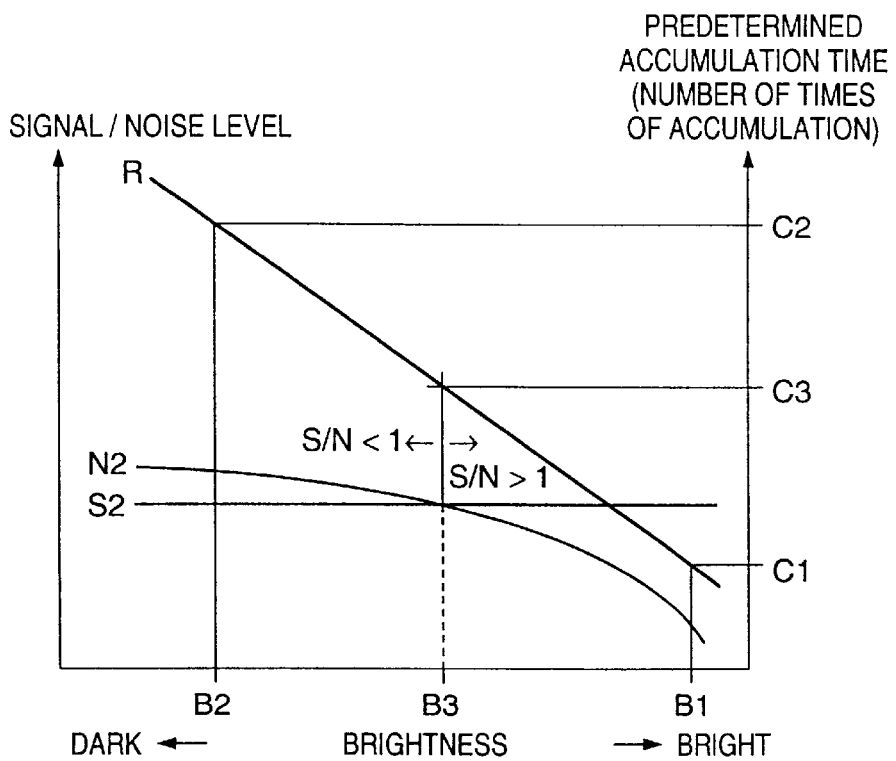
FIG. 45 is a graph showing the relationship between the signal level and noise level in association with the brightness of the object to be measured in the passive distance measurement mode.

With these calculations, only signal components indicated by hatching in FIGS. 40C and 40D remain, and other portions can be removed. As a consequence, as can be seen from these figures, the calculation results are equivalent to those in FIGS. 40A and 40B. Note that $(V_C)$ FIG. 39B is different from $V_C$.

The actual distance measurement operation will be explained below using the above results with reference to the flow chart shown in FIG. 12. In step S551, the normal output mode for directly outputting received-light signals at the ON and OFF timings of the IRED is selected while the IRED 104 is kept OFF. In step S552, resetting (skimming) of charges is inhibited. In step S553, image signals corresponding to one light projection time are sent from the sensor arrays 105 and 106 to the A/D converter 201. In step S554, the image signals are A/D-converted with reference to the reference voltage $V_C$, and the digital image signals are supplied to the CPU 204. In step S555, irregular level variations are calculated based on signal data of the empty transfer portions at two timings of the sensor signals obtained in step S554. In step S556, the sensor signals are subjected to corrections given by equations (2) to (5) or equivalent. In step S557, a distance measurement value is obtained by calculating the correlation between the image signals corrected in step S556. More specifically, the distance to the object to be measured is calculated using the principle of trigonometric measurements on the basis of the relative values of the positions, on the sensor arrays, of the signals from the two sensor arrays.

Note that passive distance measurements using skim CCD sensors have been described. However, the present invention may be applied to a distance measuring apparatus without using any skim CCD sensor, or when the same problem has occurred in an active distance measuring apparatus, the same correction may be made.

On the other hand, in a hybrid distance measuring apparatus that performs both active and passive distance measurements, the above-mentioned correction may be performed in one of the active and passive distance measurement modes so as to shorten the distance measurement time.

Furthermore, in a hybrid distance measuring apparatus that uses skim CCD sensors and performs both active and passive distance measurements, the above-mentioned correction may be performed in only the passive distance measurement mode.

The correction calculations are not limited to those given by equations in this embodiment, but any other corrections may be performed as long as the same effect can be provided.

As described above, according to this embodiment, in a distance measuring apparatus using a light-receiving unit including a plurality of photoelectric conversion elements, even when the level of an image signal irregularly varies due to charges that gradually flow into a transfer CCD (e.g., a ring CCD) due to dark current or external light components, irregular changes in output signal are detected using, e.g., a plurality of empty transfer portion outputs including no signals upon accumulating, transferring, and outputting signals from the light-receiving unit and are corrected from the signals from the light-receiving unit, and thereafter, correlation calculations are performed. With this processing, for example, even when irregular level variations have taken place in a high-luminance environment such as outdoors, distance measurement errors can be eliminated.

<Third Embodiment>

The principle of the present invention will be explained prior to the description of the third embodiment.

When the distance to a distant object is to be measured by an active distance measuring apparatus through a glass window 0.4 m ahead of the distance measuring apparatus, even when the distance to the glass window is erroneously measured based on projected light reflected by the glass window, the reflected light has a very small light amount as long as it is not light regularly reflected by the glass window surface. On the other hand, when the distance to a normal object to be measured located 0.4 m ahead of the apparatus is measured, light reflected by the object to be measured has a very large light amount.

In consideration of these facts, this embodiment adopts the following arrangement.

(1) When the active distance measurement result indicates a distance closer than a predetermined distance (e.g., 0.6 m) and the received-light signal amount is smaller than a predetermined value, it is determined that the distance to a distant view is to be measured through the glass window, and the distance measurement result is set to be a far distance (infinity), thereby obtaining an appropriate distance measurement result even when the distance to a distant view is to be measured through the glass window.

(2) In a hybrid distance measuring apparatus that can perform distance measurements using both the active and passive distance measurement methods, when the active distance measurement result indicates a distance closer than a predetermined distance (e.g., 0.6 m) and the received-light signal amount is smaller than a predetermined value, it is determined that the distance to a distant view is to be measured through the glass window, and the passive distance measurement result is adopted, thus measuring the distance to a distant view through the glass window with high precision.

Figure 13:
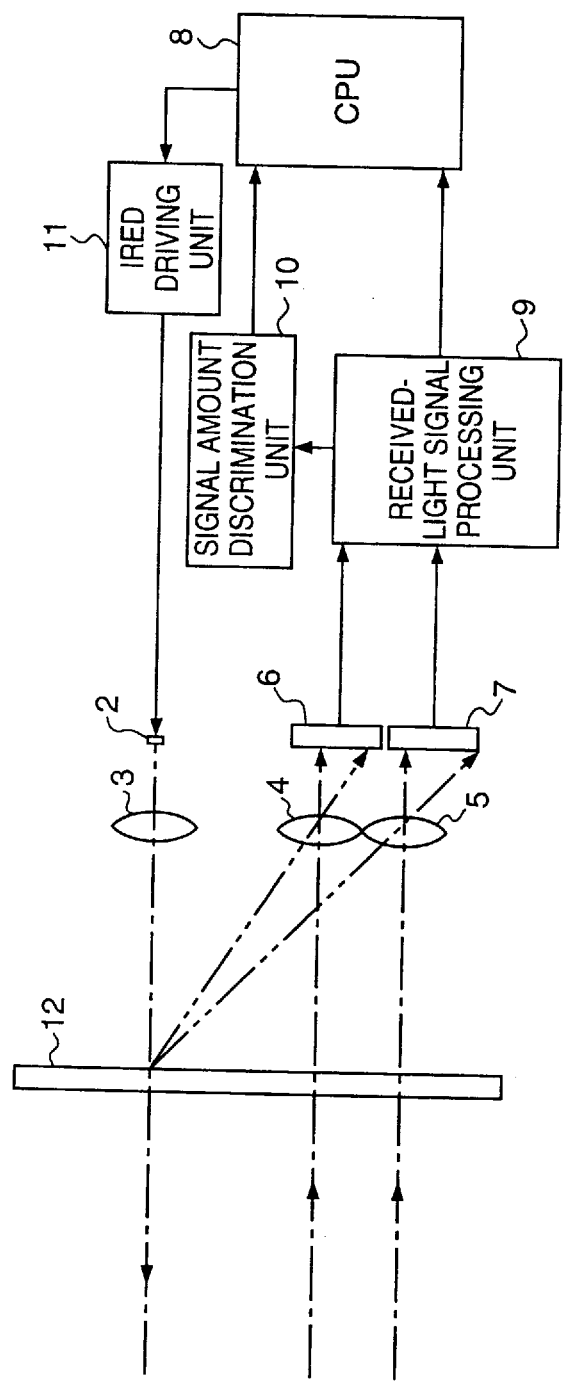
FIG. 13 is a diagram showing the arrangement according to the third embodiment of the present invention.

FIG. 13 is a block diagram showing the distance measuring apparatus according to the third embodiment based on the above-mentioned principle.

Figure 30:
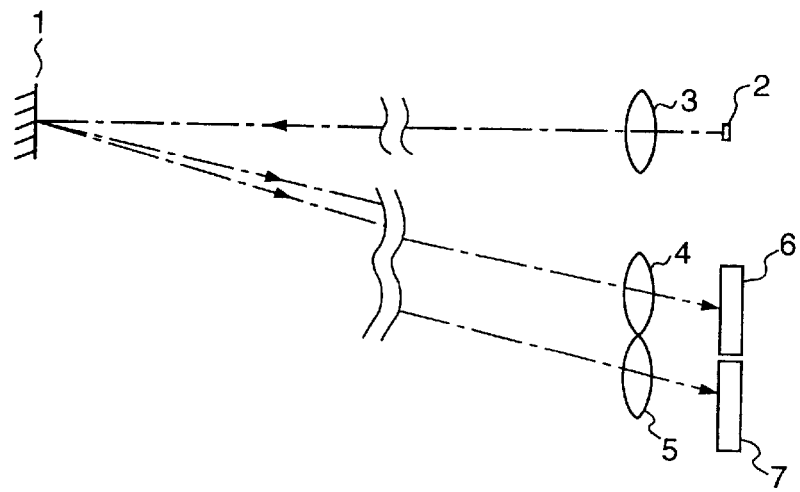
FIG. 30 is a view showing the arrangement of the conventional distance measuring apparatus.

In FIG. 13, components 1 to 7 correspond to those denoted by the same reference numerals in FIG. 30, and a detailed description thereof will be omitted. Reference numeral 8 denotes a CPU for controlling the overall apparatus and performing calculations for distance measurements. Reference numeral 9 denotes a received-light signal processing unit which includes the electric charge accumulation portions, charge transfer portions, charge reset portions, and the like described above with reference to FIG. 30, and constitutes skim CCD sensors together with the sensor arrays 6 and 7.

Reference numeral 10 denotes a signal amount discrimination unit for comparing the received-light signal mount with a predetermined amount; and 11, an IRED driving unit for ON/OFF-driving the IRED 2. Reference numeral 12 denotes a glass window, which is present at a position slightly separated (by, e.g., 0.4 m) from the distance measuring apparatus. Assume that the object to be measured is present at a very far-distance position from this distance measuring apparatus, and is not shown. At this time, most of light components projected by the IRED 2 are transmitted through the glass window 12, but some light components are reflected by the glass window and received by the sensor arrays 6 and 7.

Figure 14:
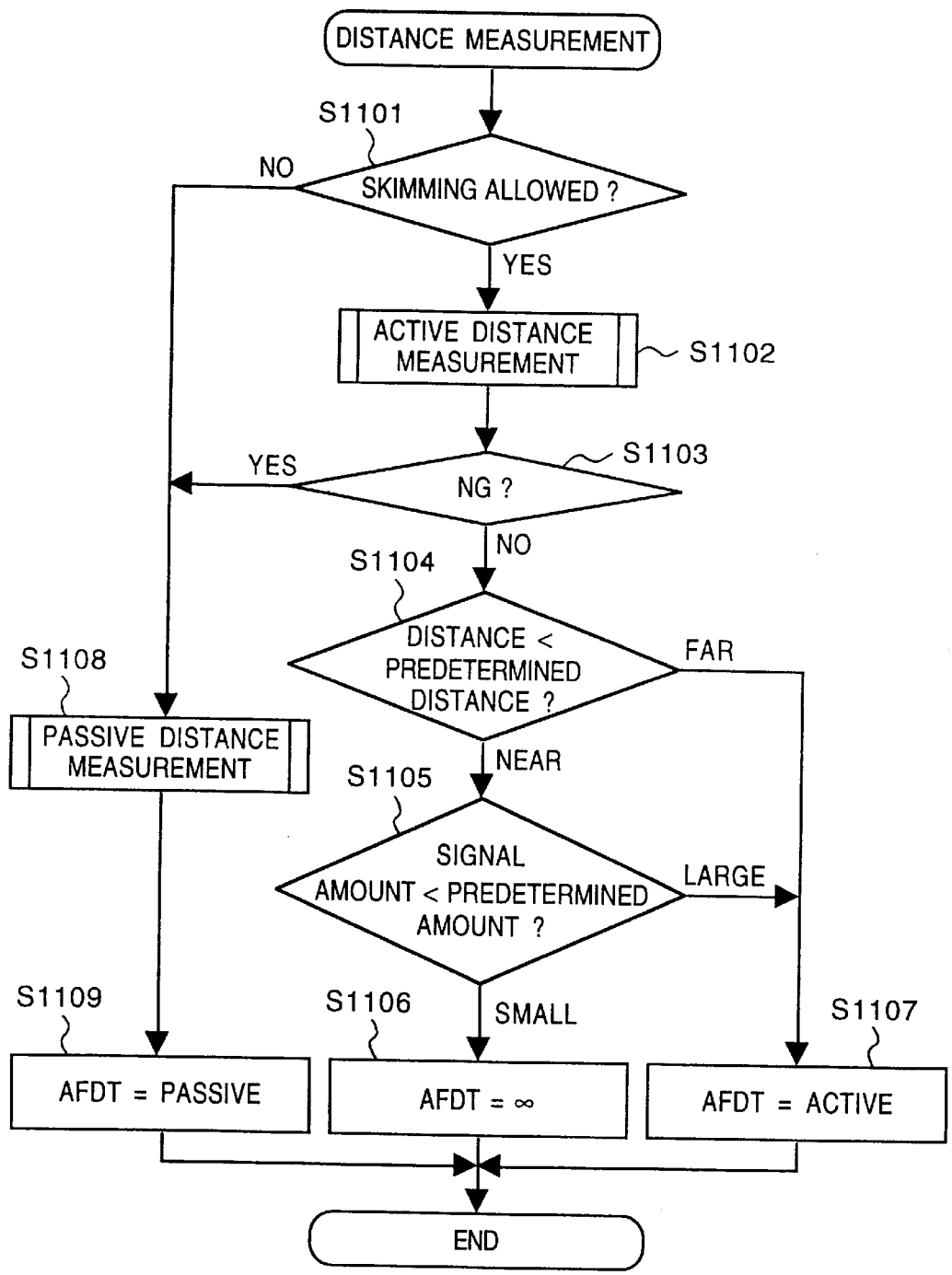
FIG. 14 is a flow chart showing the first distance measurement method according to the third embodiment of the present invention.

FIG. 14 is a flow chart showing the distance measurement method described in item (1) above of the distance measuring apparatus.

Upon starting distance measurements, it is checked in step S1101 if skimming is allowed. If YES in step S1101, the flow advances to step S1102; otherwise, the flow advances to step S1108.

Figure 31:
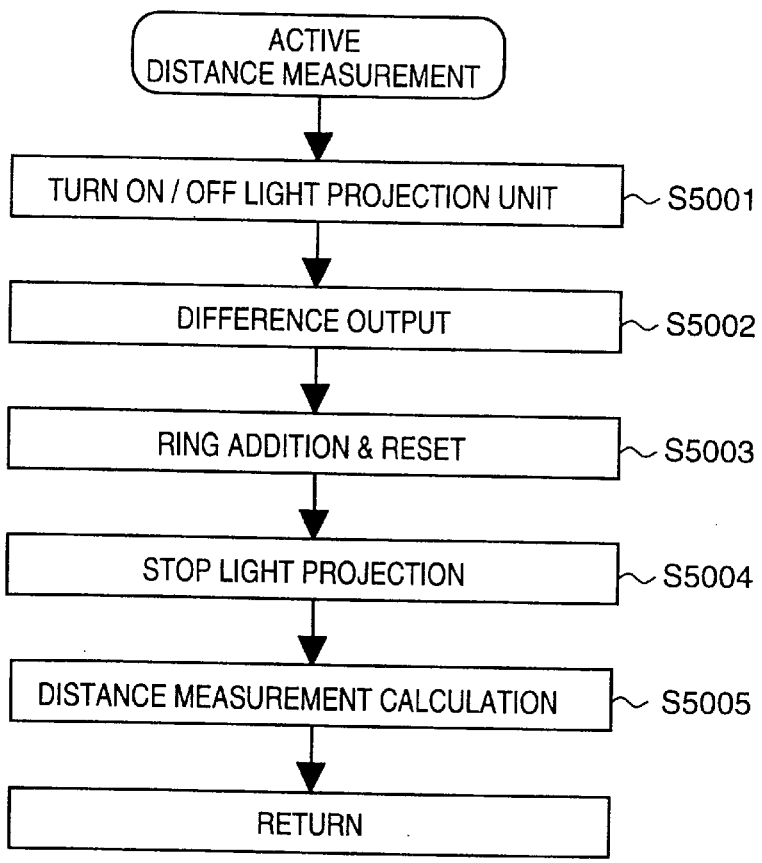
FIG. 31 is a flow chart showing the conventional active distance measurement operation.

In step S1102, an active distance measurement using the IRED 2 is performed. The active distance measurement operation is as described above with reference to FIG. 31. It is then checked in step S1103 if the distance measurement value is obtained in step S1102. If signals of beam spots cannot be obtained since, e.g., the object to be measured is located at a far-distance position or has a low reflectance, it is determined that distance measurements are impossible to perform, and the flow advances to step S1108. If distance measurements are possible to perform, it is checked in step S1104 whether the distance measurement result indicates a distance closer or farther than a predetermined distance (e.g., 0.6 m). If the distance measurement result indicates a distance closer than the predetermined distance, the flow advances to step S1105; otherwise, the flow advances to step S1107 to select the active distance measurement result obtained in step S1102 as the distance measurement result (AFDT), thus ending the distance measurement operation.

It is checked in step S1105 based on the output from the signal amount discrimination unit 10 whether the amount of received-light signals is larger or smaller than a predetermined amount. If the received-light signal mount is larger than the predetermined amount, the flow advances to step S1107 to select the active distance measurement result obtained in step S1102 as the distance measurement result (AFDT), thus ending the distance measurement operation. On the other hand, if the received-light signal mount is smaller than the predetermined amount, the flow advances to step S1106. In step S1106, it is determined that the distance measurement result is obtained based on light reflected by the glass window, and the distance measurement result (AFDT) is set to be a far distance (infinity), thus ending the distance measurement operation.

Figure 32:
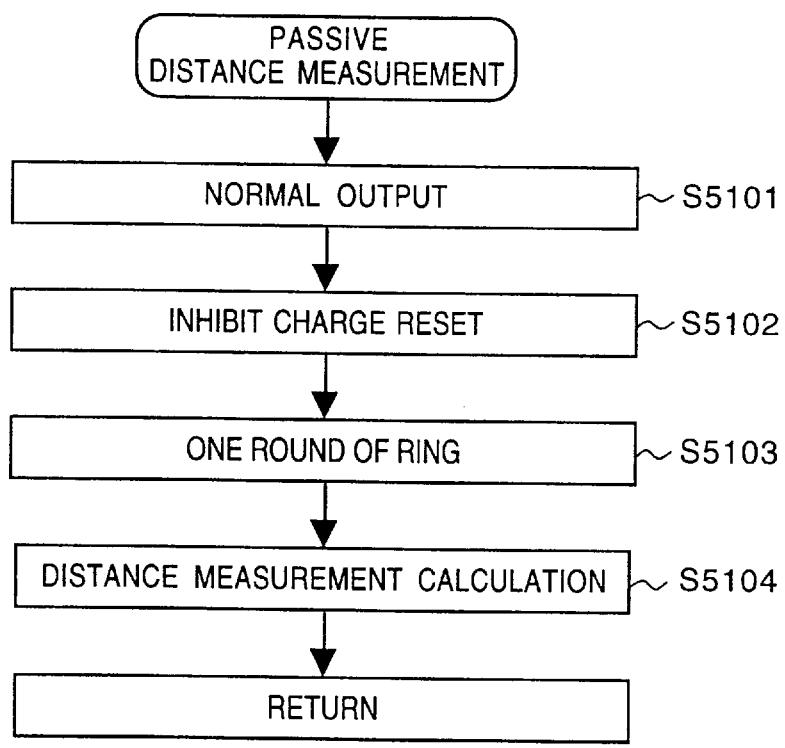
FIG. 32 is a flow chart showing the passive distance measurement operation.
Figure 33:
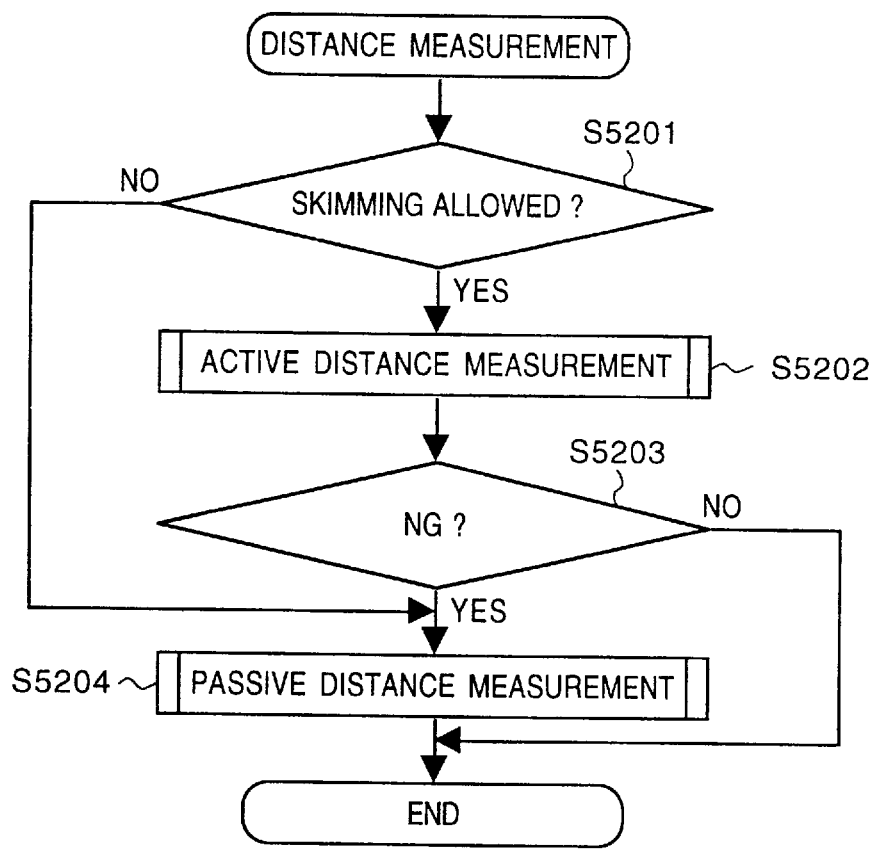
FIG. 33 is a flow chart showing the operation when both active and passive distance measurements are performed.
Figure 34:
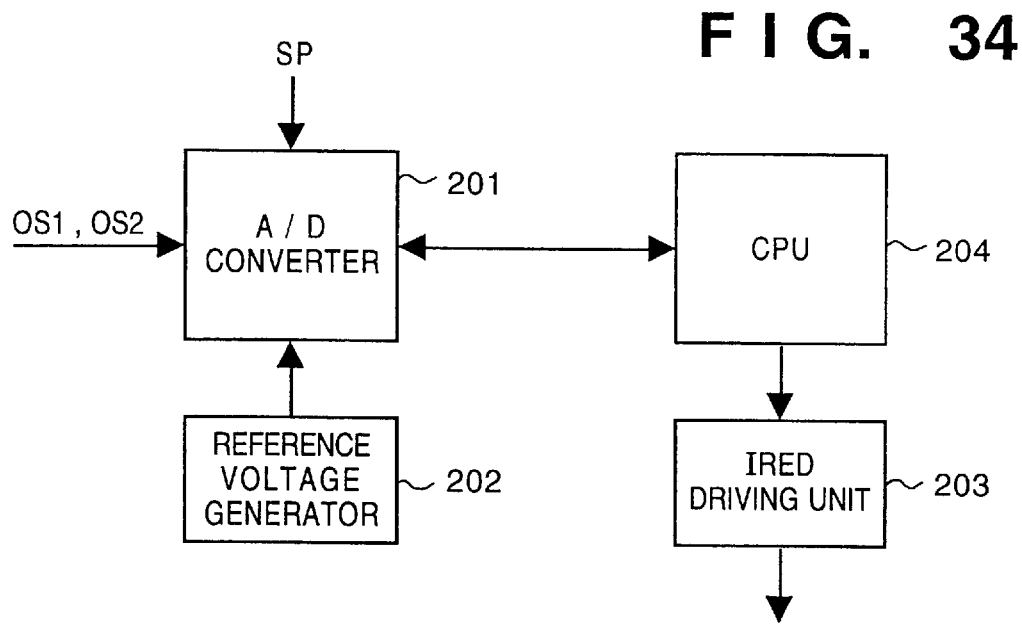
FIG. 34 is a block diagram showing the arrangement of a distance calculation unit in the present invention and prior art.
Figure 35:
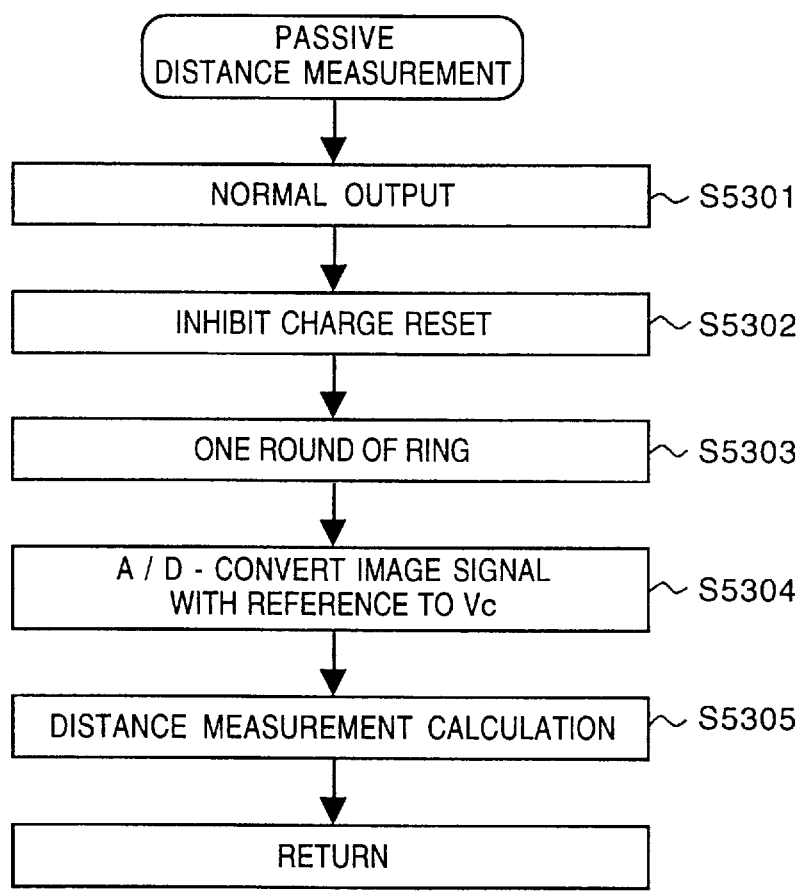
FIG. 35 is a flow chart for explaining the conventional passive distance measurement operation.
Figure 36:
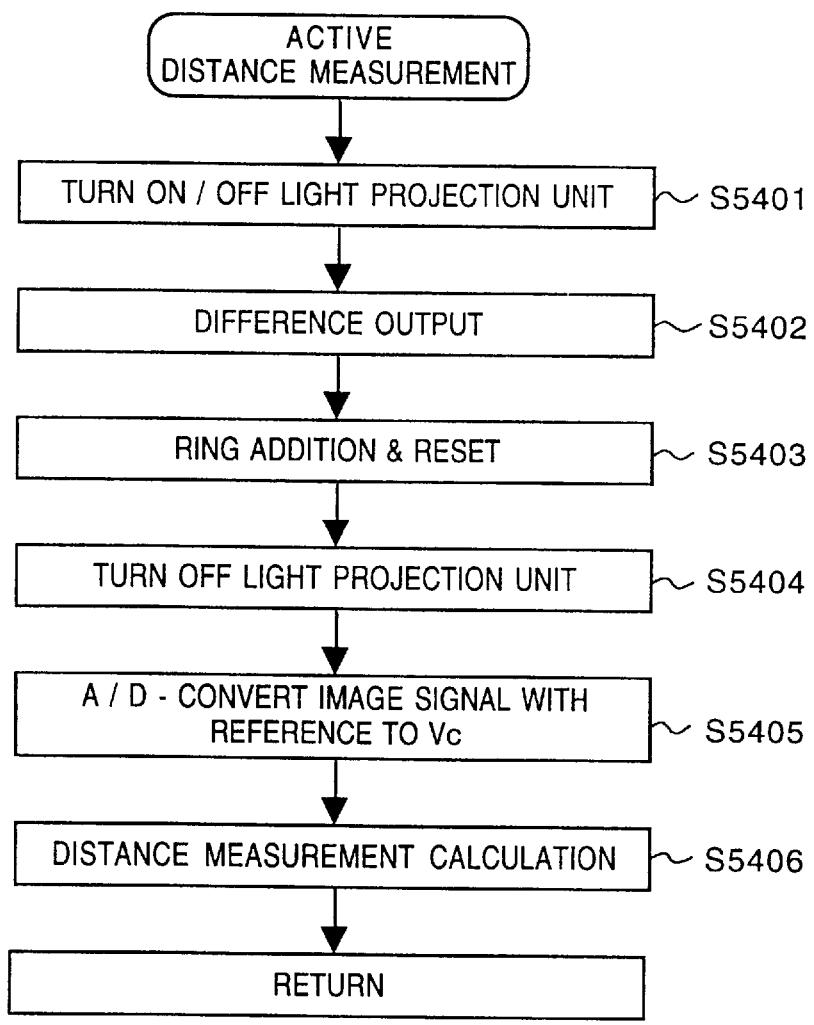
FIG. 36 is a flow chart for explaining the conventional active distance measurement operation.

In step S1108, since an active distance measurement is impossible to perform or is disabled, beam spot projection is inhibited and a passive distance measurement is performed. The passive distance measurement operation is as has already been described above with reference to FIG. 32. Thereafter, the passive distance measurement result obtained in step S1108 is selected as the distance measurement result (AFDT) in step S1109, thus ending the distance measurement operation.

Assuming that the distance measurements are made based on light reflected by the glass window in the situation shown in FIG. 13, the distance measurement result in step S1102 is 0.4 m. If it is determined in step S1103 that distance measurements are possible to perform, the flow advances to step S1104. In this case, since the distance measurement result indicates a distance closer than 0.6 m, the flow advances to step S1105. Furthermore, since the amount of signal light reflected by the glass window is small, the flow advances to step S1106, and the distance measurement result (AFDT) is set to be a far distance (infinity) as an appropriate distance in this situation.

On the other hand, if the distance to the object to be measured separated by 0.4 m is measured, since the amount of received signal light is very large (i.e., the received signal light has a very high intensity), the flow advances from step S1105 to S1107, and a correct distance measurement result can be obtained.

Figure 15:
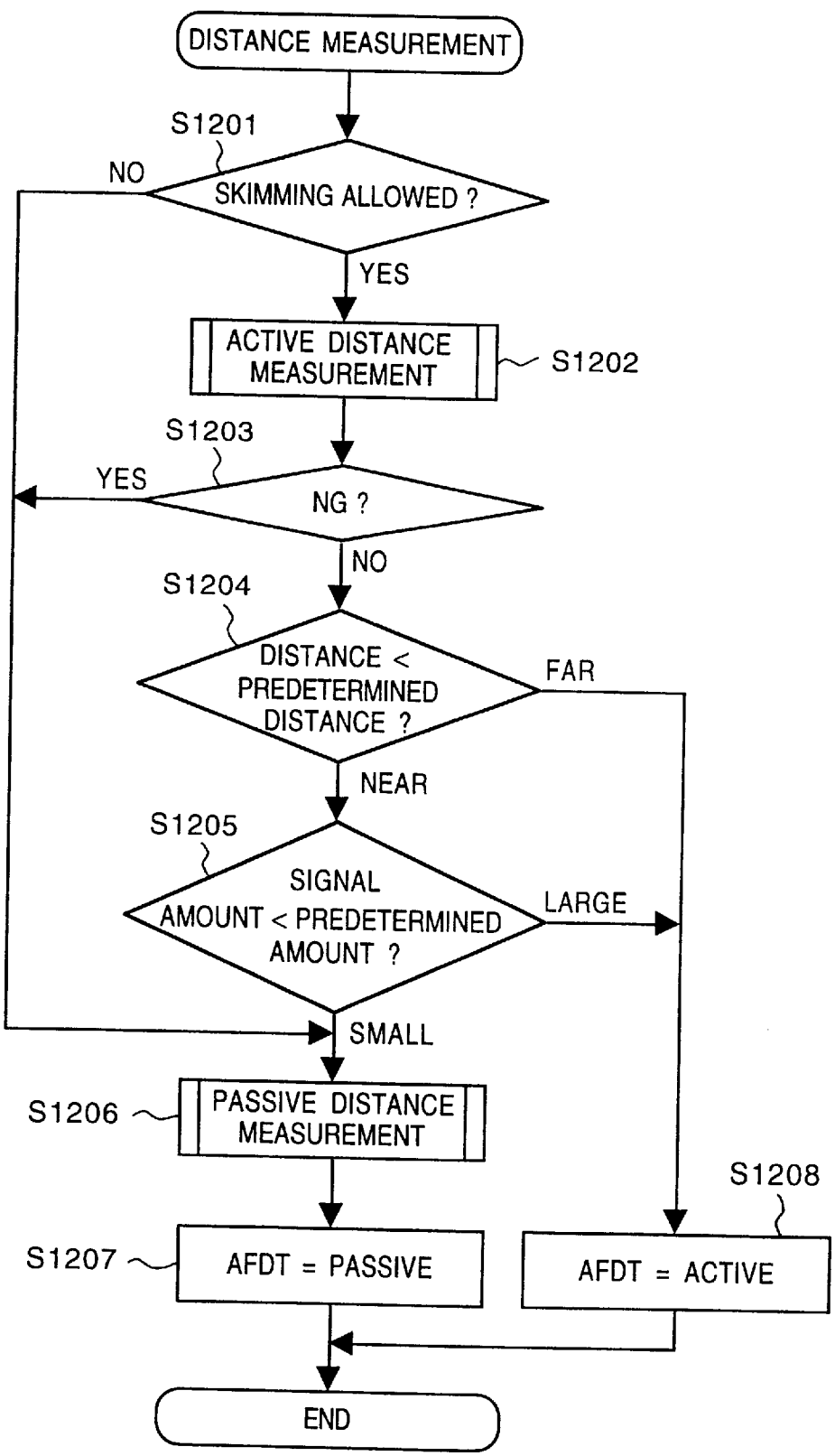
FIG. 15 is a flow chart showing the second distance measurement method according to the third embodiment of the present invention.

FIG. 15 is a flow chart for explaining the operation of the distance measurement method of item (2) above.

Upon starting distance measurements, it is checked in step S1201 if skimming is allowed. If YES in step S1201, the flow advances to step S1202; otherwise, the flow advances to step S1206 to perform a passive distance measurement. In step S1202, an active distance measurement using the IRED 2 is performed. The active distance measurement operation is as described above with reference to FIG. 31. It is then checked in step S1203 if the distance measurement value is obtained in step S1202. If signals of beam spots cannot be obtained since, e.g., the object to be measured is located at a far-distance position or has a low reflectance, it is determined that distance measurements are impossible to perform, and the flow advances to step S1206 to perform a passive distance measurement. If distance measurements are possible to perform, it is checked in step S1204 whether the distance measurement result indicates a distance closer or farther than a predetermined distance (e.g., 0.6 m). If the distance measurement result indicates a distance closer than the predetermined distance, the flow advances to step S1205; otherwise, the flow advances to step S1208 to select the active distance measurement result obtained in step S1202 as the distance measurement result (AFDT), thus ending the distance measurement operation.

It is checked in step S1205 based on the output from the signal amount discrimination unit 10 whether the amount of received-light signals is larger or smaller than a predetermined amount. If the received-light signal amount is larger than the predetermined amount, the flow advances to step S1208 to select the active distance measurement result obtained in step S1202 as the distance measurement result (AFDT), thus ending the distance measurement operation. On the other hand, if the received-light signal mount is smaller than the predetermined amount, the flow advances to step S1206. In step S1206, it is determined that the distance measurement result is obtained based on light reflected by the glass window, and a passive distance measurement is performed.

In step S1206, since an active distance measurement is impossible to perform or is disabled, or distance measurements are performed through the glass window, beam spot projection is inhibited and a passive distance measurement is performed. The passive distance measurement operation is as has already been described above with reference to FIG. 32. Thereafter, the passive distance measurement result obtained in step S1206 is selected as the distance measurement result (AFDT) in step S1207, thus ending the distance measurement operation.

Assuming that distance measurements are made based on light reflected by the glass window in the situation shown in FIG. 13, the distance measurement result in step S1202 is 0.4 m. If it is determined in step S1203 that distance measurements are possible to perform, the flow advances to step S1204. In this case, since the distance measurement result indicates a distance closer than 0.6 m, the flow advances to step S1205. Furthermore, since the amount of signal light reflected by the glass window is small, the flow advances to step S1206 to perform a passive distance measurement which provides good results in distance measurements through the glass window. For this reason, photographing through the glass can be attained with higher precision than the first method described above.

Note that this embodiment uses a hybrid type distance measuring apparatus using skim CCD sensors. However, the present invention is not limited to such specific distance measuring apparatus, and the same control may be made using a hybrid type distance measuring apparatus that has independent active and passive distance measuring units.

Figure 16:
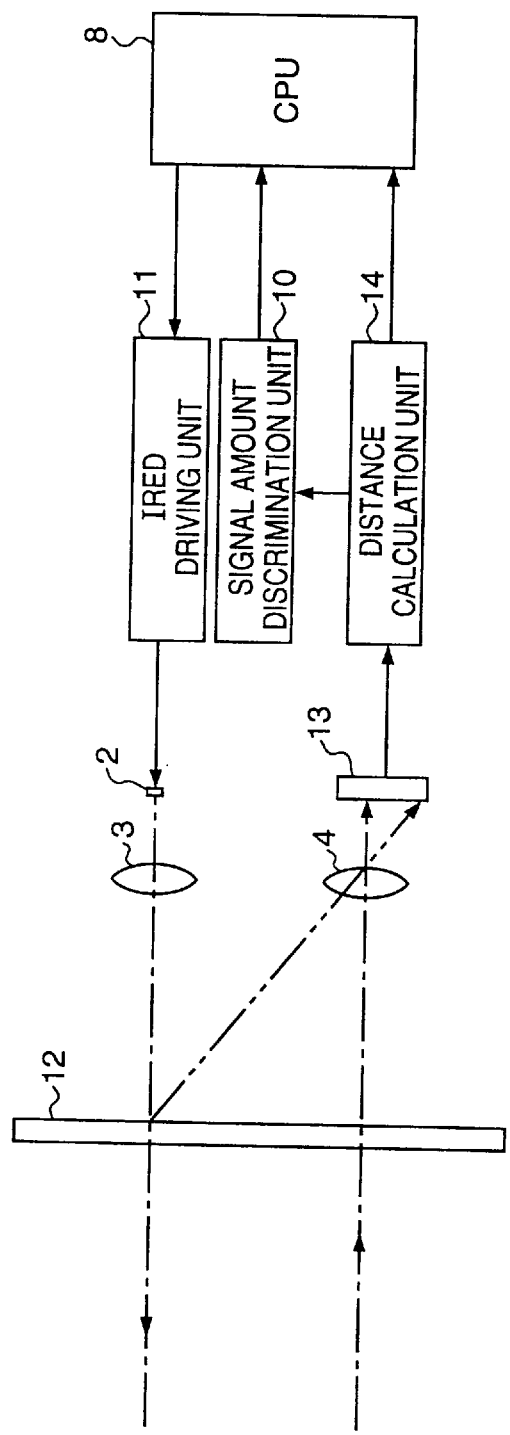
FIG. 16 is a diagram showing the arrangement according to the first modification of the third embodiment of the present invention.

FIG. 16 shows an active type distance measuring apparatus according to the first modification of the third embodiment.

Referring to FIG. 16, the CPU 8, IRED driving unit 11, IRED 2, porjection lens 3, glass window 12, projection lens 12, signal amount discrimination unit 10, and light-receiving lens 4 are arranged as in FIG. 13, and a PSD (semiconductor position sensing device) 13 serving as a light-receiving sensor is arranged. The output from the PSD 13 is input to a distance calculation unit 14.

The distance calculation unit 14 includes an I/V converter, amplifier, known double-integral circuit, and the like. The unit 14 calculates the distance to the object to be measured on the basis of a signal current photoelectrically converted by the PSD 13.

Assume that the object to be measured is present at a very far-distance position from this distance measuring apparatus, and is not shown. At this time, most of light components projected by the IRED 2 are transmitted through the glass window 12, but some light components are reflected by the glass window and received by the PSD 13.

Figure 17:
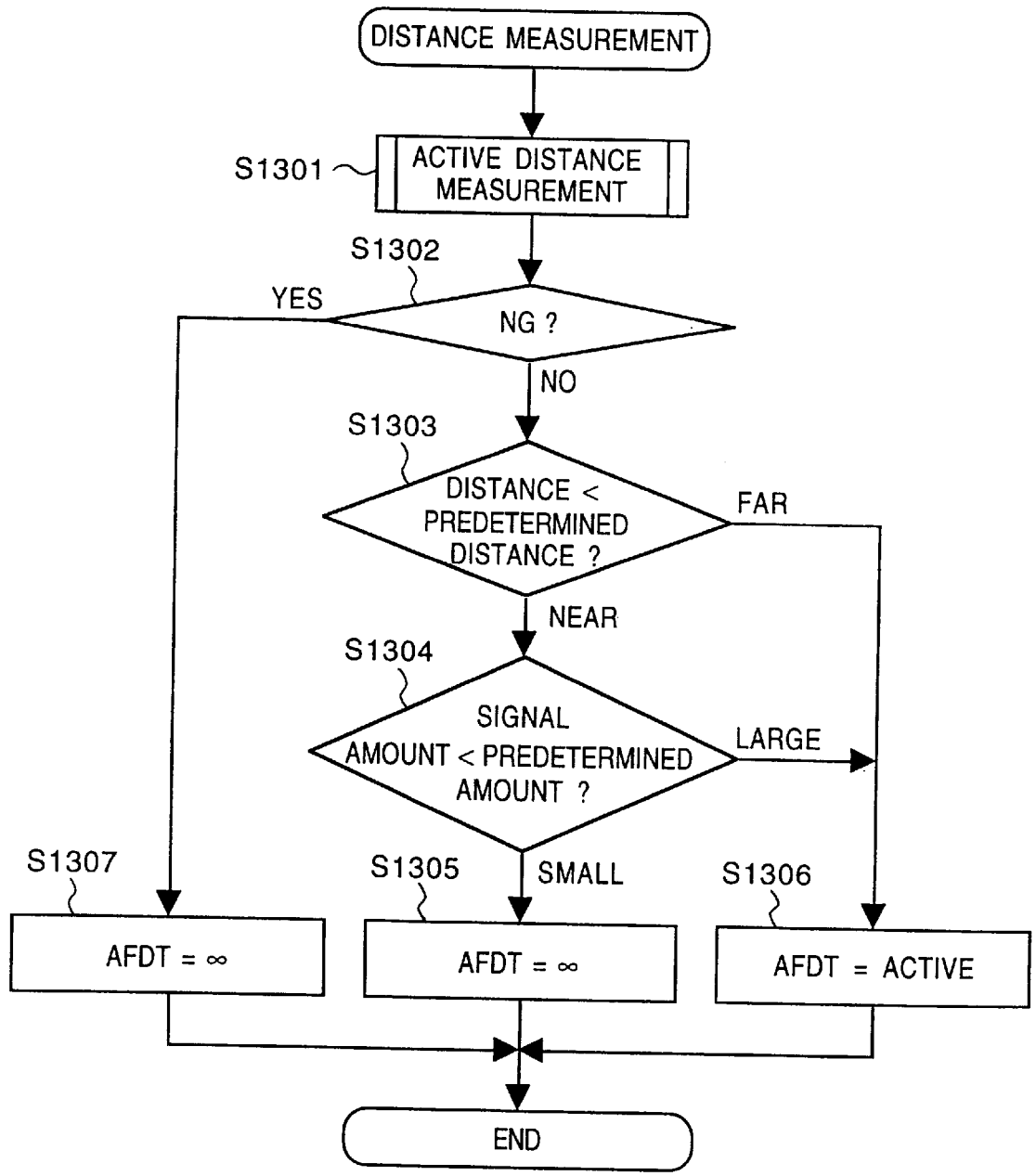
FIG. 17 is a flow chart showing the distance measurement method according to the first modification of the third embodiment of the present invention.

FIG. 17 is a flow chart for explaining the operation of this distance measuring apparatus according to the first modification of the third embodiment.

Upon starting distance measurements, in step S1301, the IRED 2 is driven to project a beam spot toward the object to be measured, and an active distance measurement is performed based on a known double-integral operation. It is checked in step S1302 if a distance measurement value is obtained in step S1301. If signals of beam spots cannot be obtained since, e.g., the object to be measured is located at a far-distance position or has a low reflectance, it is determined that distance measurements are impossible to perform, and the flow advances to step S1307 to set the distance measurement result (AFDT) to be a far distance (infinity). If distance measurements are possible to perform, it is checked in step S1303 whether the distance measurement result indicates a distance closer or farther than a predetermined distance (e.g., 0.6 m). If the distance measurement result indicates a distance closer than the predetermined distance, the flow advances to step S1304; otherwise, the flow advances to step S1306 to select the active distance measurement result obtained in step S1301 as the distance measurement result (AFDT), thus ending the distance measurement operation.

It is checked in step S1304 based on the output from the signal amount discrimination unit 10 whether the amount of received-light signals is larger or smaller than a predetermined amount. If the received-light signal mount is larger than the predetermined amount, the flow advances to step S1306 to select the active distance measurement result obtained in step S1301 as the distance measurement result (AFDT), thus ending the distance measurement operation. On the other hand, if the received-light signal mount is smaller than the predetermined amount, the flow advances to step S1305. In step S1305, it is determined that the distance measurement result is obtained based on light reflected by the glass window, and the distance measurement result (AFDT) is set to be a far distance (infinity), thus ending the distance measurement operation.

Note that the distance measurement result (AFDT) is set to be infinity in steps S1305 and S1307. However, this distance may be an identical distance value or different far-distance values.

Further, in the hybrid distance measuring apparatus also having the passive distance measuring apparatus, if YES is determined in step S1302 and if it is determined in step S1304 that the signal amount is smaller than the predetermined amount, a passive distance measurement may be performed to obtain AFDT with higher precision.

Further more, the embodiment described above may be applied to an aparatus having a plurality of PSD as a light-receiving sensor.

As described above, according to this embodiment, when the active distance measurement result indicates a distance closer than a predetermined distance (e.g., 0.6 m) and the received-light signal amount is smaller than a predetermined value, it is determined that the distance to a distant view is to be measured through the glass window, and the distance measurement result is set to be a far distance (infinity), thereby obtaining an appropriate distance measurement result even when the distance to a distant view is to-be measured through the glass window.

Also, in a hybrid distance measuring apparatus that can perform distance measurements in both the active and passive distance measurement methods, when the active distance measurement result indicates a distance closer than a predetermined distance and the received-light signal amount is smaller than a predetermined value, it is determined that the distance to a distant view is to be measured through the glass window, and the passive distance measurement result is adopted, thus measuring the distance to a distant view through the glass window with high precision.

Therefore, this embodiment does not require any dedicated sensor for receiving light reflected by the glass window.

The fourth and fifth embodiments aiming at shortening the time required for the distance measurement operation will be explained hereinafter.

<Fourth Embodiment>

The fourth embodiment of the present invention will be described in detail below with reference to FIGS. 18 to 24.

The arrangements and operations of a light-receiving unit, electric charge accumulation portion, and circulating shift register will be described with reference to FIG. 20. Reference numeral 1011 denotes a sensor array which serves as a light-receiving unit for converting received light into charges and supplying signal charges, and consists of a plurality of photoelectric conversion elements. Note that the sensor array is constituted by five pixels, i.e., sensors S1 to S5. Reference numeral 1012 denotes integral portions for integrating charges photoelectrically converted by the sensors S1 to S5 of the sensor array 1011. Reference numeral 1013 denotes clear portions which are arranged in correspondence with the integral portions 1012, and clear charges integrated by the integral portions (to a clear state) upon application of pulses ICG. Reference numeral 1014 denote first accumulation portions; and 1015, second accumulation portions. The first accumulation portions 1014 receive charges from the integral portions 1012 in response to pulses STI, and the second accumulation portions 1015 receive charges from the integral portions 1012 in response to pulses ST2. Reference numeral 1016 denotes shift portions which move all the charges in the first and second accumulation portions 1014 and 1015 to a linear CCD 1017 that serves as a signal charge injection unit upon application of pulses SH at the timing shown in the timing chart in FIG. 22.

Transfer clock pulses CK1 and CK2 are alternately applied to the linear CCD 1017, and charges that have moved from the first and second accumulation portions 1014 and 1015 are transferred in transfer direction 1 in response to these transfer clock pulses CK1 and CK2. A ring CCD 1018 serving as a circulating shift register that connects a plurality of charge transfer channels in a loop pattern is connected to the end, in the transfer direction 1 side, of the linear CCD 1017. The transfer clocks pulses CK1 and CK2 are also alternately applied to the ring CCD 1018, and charges present in the respective charge transfer channels circulate around the ring CCD 1018 while being transferred in transfer direction 2. Charges present in the respective charge transfer channels of the linear CCD 1017 are transferred in transfer direction 1 in response to the transfer clock pulses CK1 and CK2. A charge present in a charge transfer channel 1A is transferred to the neighboring charge transfer channel in response to the transfer clock pulse CK2. Furthermore, the charge is transferred to a charge transfer channel 12B of the ring CCD 1018 in response to the next transfer clock pulse CK1. In this case, since a charge originally present in a charge transfer channel 1B of the ring CCD 1018 is also transferred to the charge transfer channel 12B at that time, the charges are added to each other in the charge transfer channel 12B. In this embodiment, the number of charge transfer channels of the linear CCD 1017 is set to be equal to the number of charge transfer channels of the ring CCD 1018, so that charges in the channels 1A and 1B, 2A and 2B, 3A and 3B, . . . . 11A and 11B, and 12A and 12B are always added to each other. Note that the channels 1A and 2A serve as non-signal charge portions in which only charges of noise components such as a dark current are accumulated since they do not receive any signal charges from the sensor array 1011.

Reference numeral 1020 denotes a CCD clear portion. When a signal CCDCLR is applied to this CCD clear portion 1020, a charge in the charge transfer channel 1B is cleared. More specifically, when the signal CCDCLR is applied to the CCD clear portion 1020 in the initialization mode in FIG. 23 and at the timing shown in FIG. 24, and the transfer clock pulses CK1 and CK2 are applied until charges circulate the ring CCD 1018 once, since charges originally present in the ring CCD 1018 must pass the charge transfer channel 1B, each charge is cleared there, and all the charges in the ring CCD 1018 can be consequently cleared (reset state). Reference numeral 1021 denotes an output portion for converting the charge amount present in a charge transfer channel 6B into a voltage via a floating electrode portion 1202 formed on the charge transfer channel 6B via a gate oxide film, and outputting the voltage to an external apparatus. The output portion 1021 outputs a signal OS at the timing shown in FIG. 24. Reference symbol RD denotes a reset potential. When a reset pulse RS1 is applied, as shown in FIG. 24, the floating electrode portion 1202 is reset to the reset potential RD.

Figure 18:
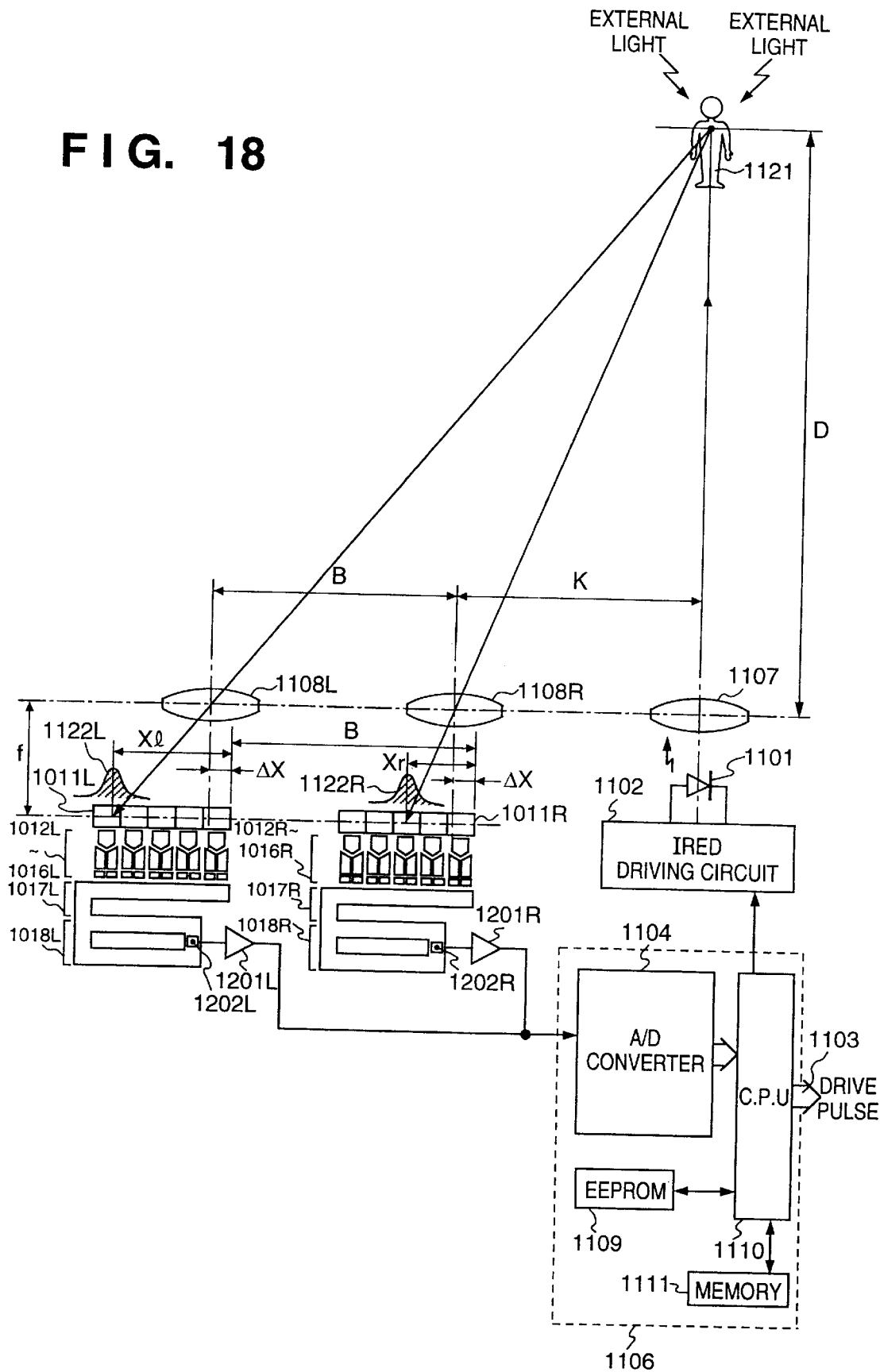
FIG. 18 is a diagram showing the arrangement of a distance measuring apparatus of an auto-focus camera having a distance measuring apparatus according to the fourth embodiment of the present invention.

FIG. 18 is a diagram showing the characteristic feature of this embodiment, and shows an embodiment when the present invention is applied to a distance measuring apparatus of an auto-focus unit of a camera using the circulating shift register. Referring to FIG. 18, an AF control circuit 1106 turns on and off an IRED 1101 serving as a light-emitting element via an IRED driving circuit 1102. Light emitted by the IRED 1101 is irradiated onto an object 1121 via a projection lens 1107, and is reflected thereby. The reflected light is received by a pair of right and left sensor arrays 1011R and 1011L via light-receiving lenses 1108R and 1108L. As a consequence, received-light images 1122R and 1122L formed on the sensor arrays 1011R and 1011L also change their shapes in accordance with emission status of the IRED 1101. More specifically, the received-light images 1122R and 1122L appear on the sensor arrays 1011R and 1011L during the ON period of the IRED 1101, and these signals and external light are converted into charges by photoelectric conversion elements.

During the OFF period of the IRED 1101, external light alone is irradiated onto the sensor arrays 1011R and 1011L, and is converted into charges by the photoelectric conversion elements. Note that the AF control circuit 1106 has a function of generating drive pulses 1103 for driving the sensor arrays 101IR and 1011L, signal integral portions 1012R to 1016R and 1012L to 1016L, and circulating shift registers 1018R and 1018L, and controlling their operations. An EEPROM 1109 is a rewritable external storage unit, in which the maximum total accumulation time in the electric charge accumulation portions in the active distance measurement mode and that in the passive distance measurement mode are independently set.

Figure 21:
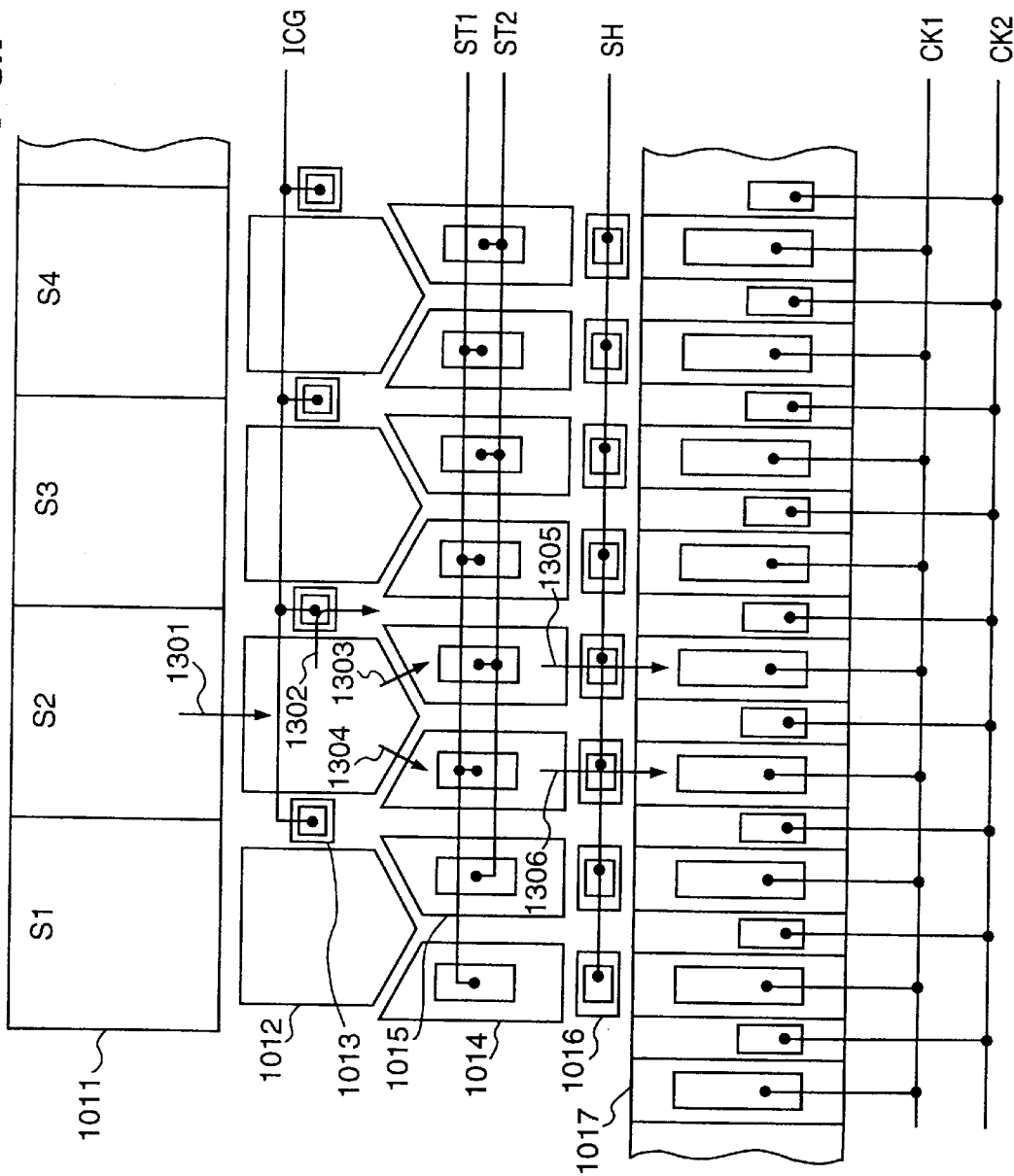
FIG. 21 is a diagram for explaining the flow of charges from a sensor array according to the fourth embodiment of the present invention.

Referring to FIG. 21, a signal charge photoelectrically converted by the sensor S2 as one pixel in the sensor array 1011 is integrated by the integral portion 1012 via a route indicated by an arrow 1301. By applying a pulse ICG to a line ICG connected to the clear portion 1013 at the timing shown in FIG. 22, the charge present in the integral portion 1012 is removed along a route indicated by an arrow 1302. In other words, the charge in the integral portion 1012 is cleared. Accordingly, by controlling the pulse ICG, a so-called electronic shutter function of arbitrarily varying the time required for accumulating the charge in the integral portion 1012 can be obtained. Note that time periods t1 and t2 between the pulses ICG, and ST1 and ST2 shown in FIG. 22 correspond to the integral time.

Figure 22:
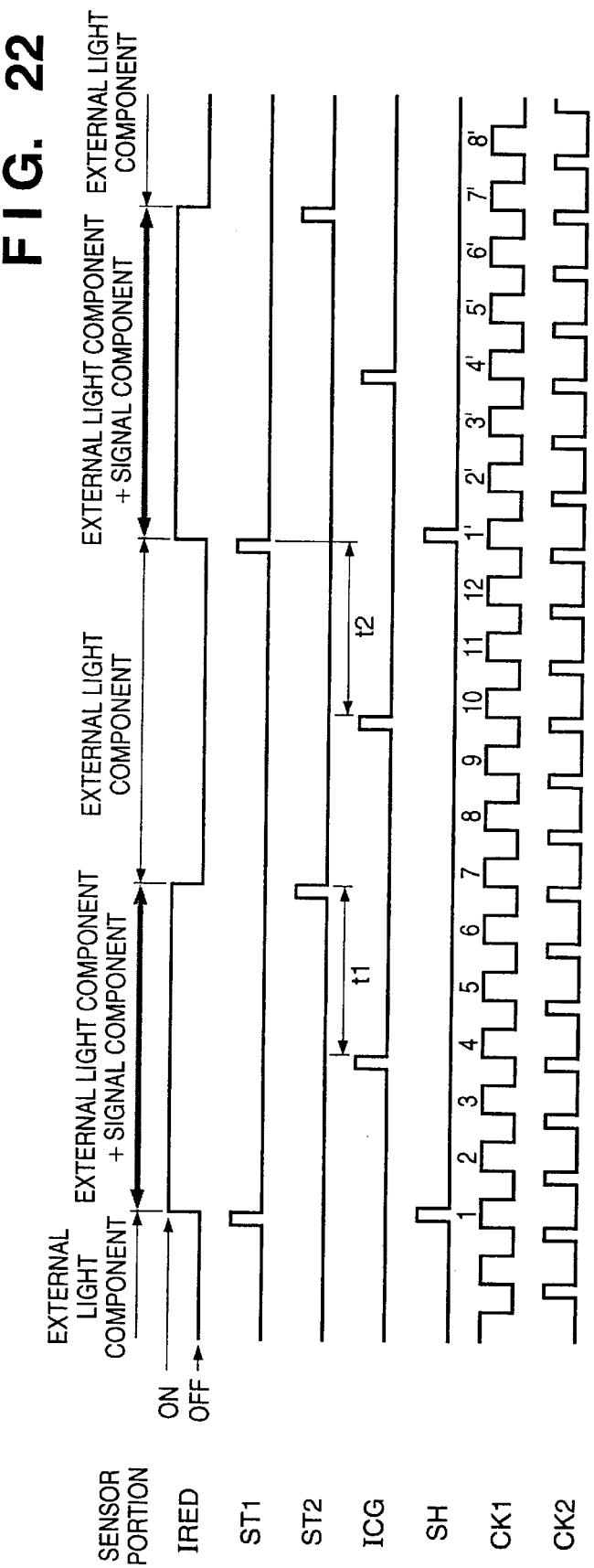
FIG. 22 is a timing chart showing the operation sequence of the circulating shift register according to the fourth embodiment of the present invention.

Each integral portion 1012 comprises the neighboring first and second accumulation portions 1014 and 1015, and a charge flows from the integral portion 1012 into the first accumulation portion 1014 via a route indicated by an arrow 1304 in response to the pulse ST1 at the timing shown in FIG. 22. On the other hand, a charge flows from the integral portion 1012 into the second accumulation portion 1015 via a route indicated by an arrow 1303 in response to the pulse ST2. As shown in FIG. 21, the first and second accumulation portions 1014 and 1015 are alternately juxtaposed, and shift portions 1016 are arranged therebelow. When a shift pulse is applied to each shift portion 1016, an electric charge accumulated in the corresponding first accumulation portion 1014 is transferred to the charge transfer channel of the linear CCD 1017 shown in FIG. 21 via a route indicated by an arrow 1306. Also, an electric charge accumulated in the second accumulation portion 1015 is transferred to the charge transfer channel of the linear CCD 1017 via a route indicated by an arrow 1305.

At this time, since the AF control circuit 1106 operates to output the pulses ST1 in synchronism with the OFF states of the IRED 1101, as shown in FIG. 22, each first accumulation portion 1014 accumulates a charge corresponding to only external light components irradiated onto the sensor. On the other hand, since the AF control circuit 1106 operates to output the pulses ST2 in synchronism with the ON states of the IRED 1101, each second accumulation portion 1015 accumulates a charge corresponding to the sum of signal components reflected by the object 1121 and external light components, which are irradiated onto the sensor.

Figure 20:
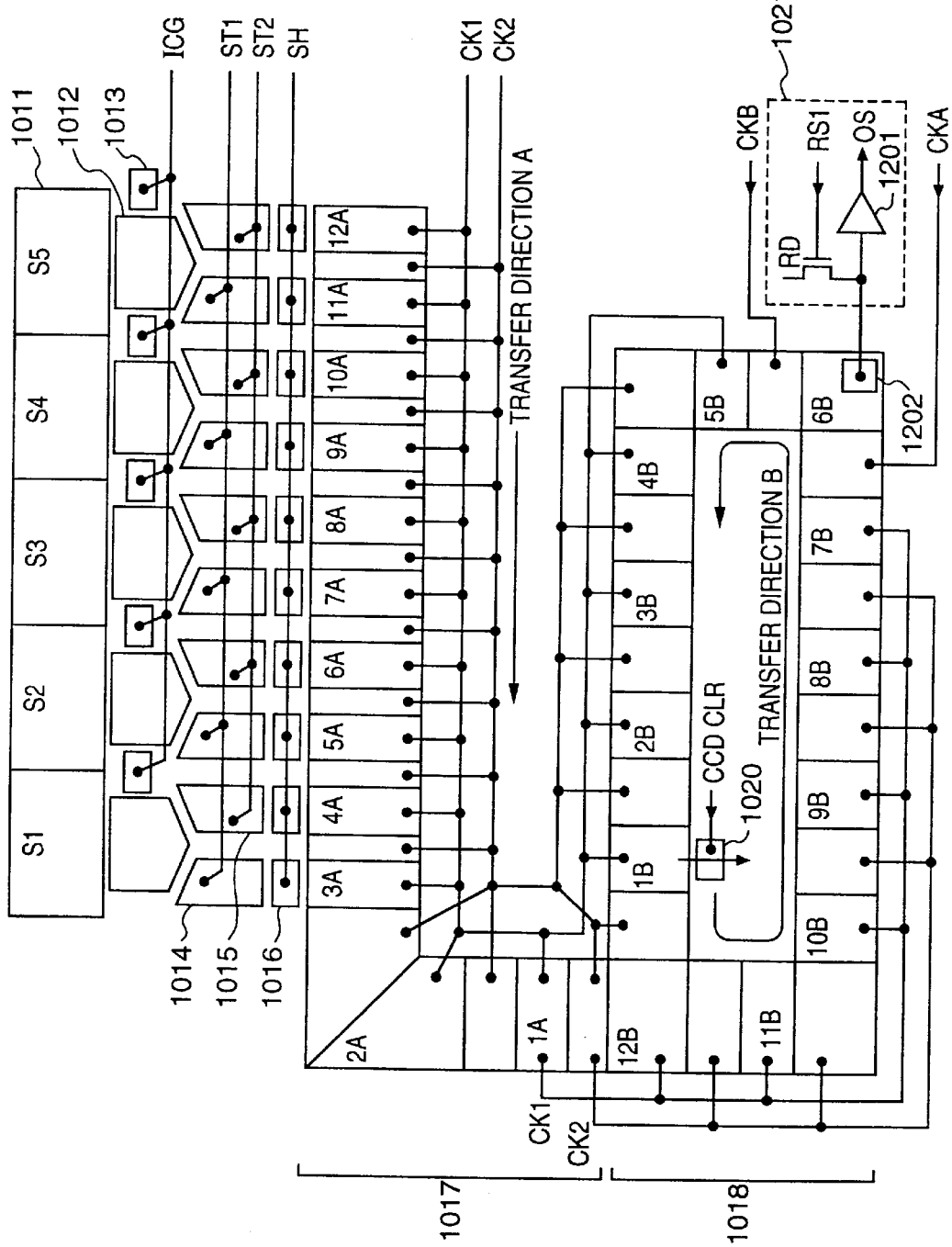
FIG. 20 is a diagram showing the arrangement of a circulating shift register according to the fourth embodiment of the present invention.

In response to the pulses SH, the electric charges accumulated in the first and second accumulation portions 1014 and 1015 are transferred to the charge transfer channels 3A to 12A shown in FIG. 20. In this way, the charges corresponding to only external light components are transferred to the charge transfer channels 3A, 5A, 7A, 9A, and 11A, and the charges corresponding to the sums of signal components reflected by the object 1121 and external light components are transferred to the charge transfer channels 4A, 6A, 8A, 10A, and 12A. The charge transfer channels 1A and 2A can be used for offset adjustment, dark level detection, and the like, although they are added in terms of the arrangement of the linear CCD 1017 and the ring CCD 1018.

The ring CCD 1018 transfers charges in transfer direction 2 shown in FIG. 20 in response to the clock pulses CK1 and CK2. Note that the pulses SH are synchronized with one round of the ring CCD 1018, as shown in FIG. 22 and, hence, the number of rounds on the ring CCD 1018 can be detected by counting the pulses SH. Furthermore, since the ON/OFF timings of the IRED 1101 and the pulses ST1 and ST2 are synchronized with the pulses SH, each charge transfer channel of the ring CCD 1018 always adds signal charges obtained by integrating charges from an identical sensor.

Figure 23:
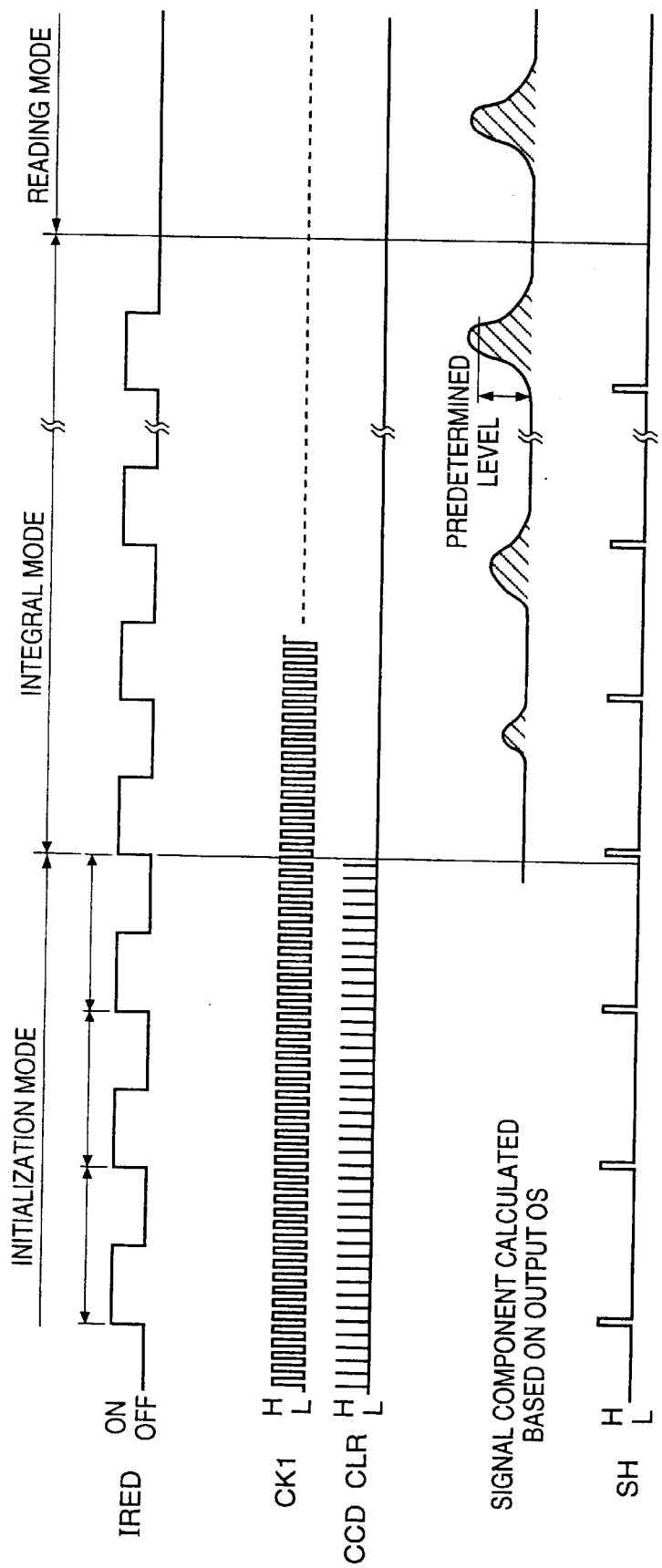
FIG. 23 is a timing chart showing the operation sequence of the circulating shift register according to the fourth embodiment of the present invention.
Figure 24:
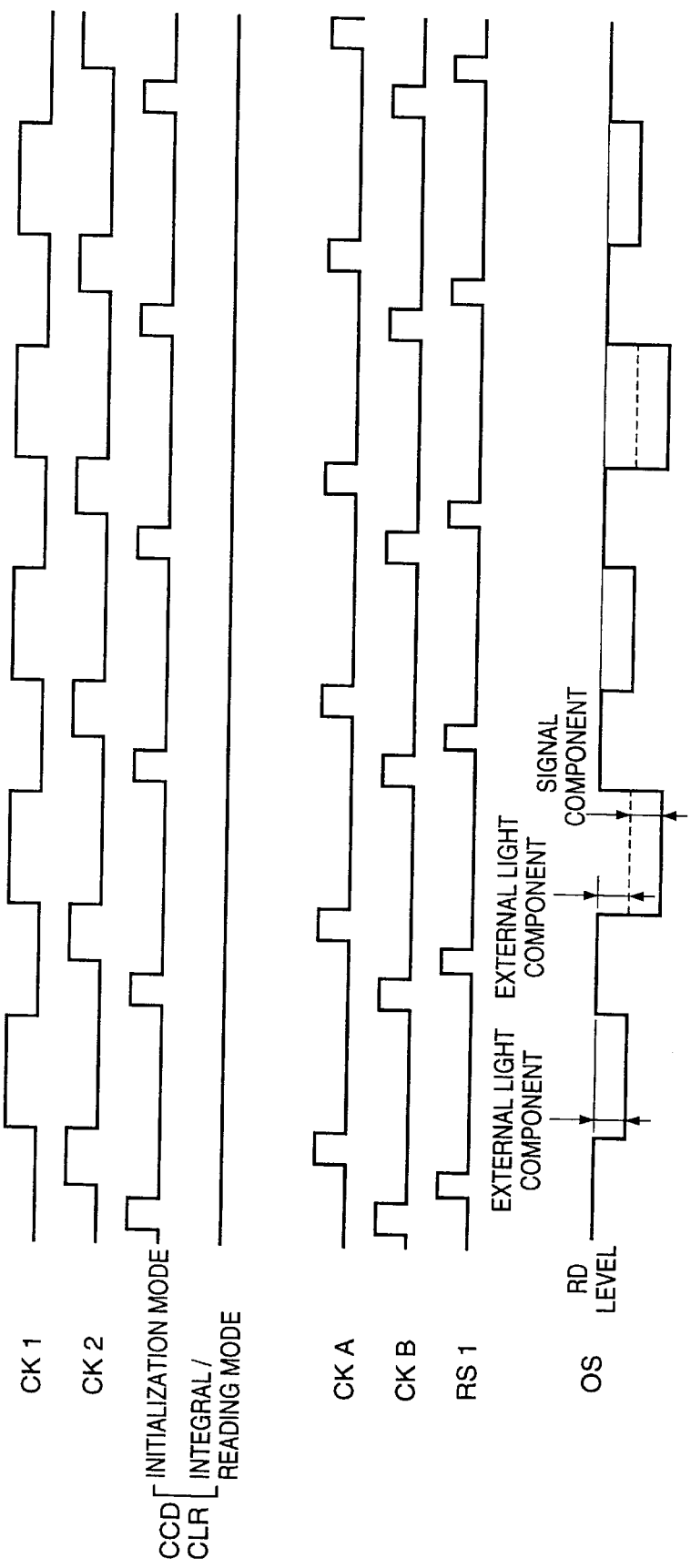
FIG. 24 is a timing chart showing the operation sequence of the circulating shift register according to the fourth embodiment of the present invention.

The distance measuring apparatus shown in FIG. 18 outputs the pulse ICG in the initialization mode shown in FIG. 23 at the timing given by:

t1=t2=0

By setting t1=t2=0, the charges in the integral portions 1012 are cleared. When the pulses CCDCLR are applied over a period in which charges circulate the ring CCD 18 three rounds or more, all the charges remaining in the first and second accumulation portions 1014 and 1015, the linear CCD 1017, and the ring CCD 1018 are reset via the CCD clear portion 1020 shown in FIG. 20.

After the charges in the respective portions are completely cleared, the pulses CCDCLR are stopped to start the integral mode, as shown in FIG. 23. In this case, generation of the pulses ICG, ST1, ST2, SH, CK1, and CK2 and the operation of the IRED are controlled at the predetermined timings shown in FIG. 22 under the condition:

t1=t2>0

The charges corresponding to external light components during the OFF period of the IRED are transferred to the charge transfer channels 3A, 5A, 7A, 9A, and 11A of the linear CCD 1017 via the first accumulation portions 1014, and are added and accumulated in turn in the ring CCD 1018. Similarly, the charges corresponding to the sums of signal components reflected by the object and external light components during the ON period of the IRED are transferred to the charge transfer channels 4A, 6A, 8A, 10A, and 12A of the linear CCD 1017 via the second accumulation portions 1015, and are added and accumulated in turn in the ring CCD 1018.

The signals OS as the output signals from the output portion 1021 are A/D-converted by an A/D converter 1104 via a corresponding one of amplifiers 1201R and 1201L, and digital data is supplied to the AF control circuit 1106. The signals OS are output as follows:

level of non-signal portion level of non-signal portion external light components irradiated onto S1 external light components+signal components irradiated onto S1 external light components irradiated onto S2 external light components+signal components irradiated onto S2

. . .

external light components irradiated onto S5 external light components+signal components irradiated onto S5

The AF control circuit 1106 calculates the difference between the charge amounts continuously output from the identical sensor. When the charge amount of signal components reflected by the object to be measured has reached a predetermined level high enough to perform distance measurement calculations, or when the number of rounds on the ring CCD 1018 has reached a maximum value stored in the EEPROM 1109, the AF control circuit 1106 starts the reading mode shown in FIG. 23 and stops the pulses SH to end additions of the signal charges.

Thereafter, the charges are further transferred inside the CCD, and the outputs OS are A/D-converted by the A/D converter 1104 of the AF control circuit 1106. Then, a CPU 1110 performs the following calculations and writes only the charge amounts of signal components in a memory 1111.

level of non-signal portion−level of non-signal portion=0

(external light components+signal components irradiated onto S1)−(external light components irradiated onto S1)=(signal components irradiated onto S1)

(external light components+signal components irradiated onto S2)−(external light components irradiated onto S2)=(signal components irradiated onto S2)

(external light components+signal components irradiated onto S5)−(external light components irradiated onto S5)=(signal components irradiated onto S5)

As a result of executing the above-mentioned processing for the two ring CCDs 1018R and 1018L shown in FIG. 18, the positions, Xr and Xl, of the received-light images 1122R and 1122L can be obtained. Based on these positions Xr and Xl, the distance, D, to the object 1121 can be calculated. Note that the projection lens 1107 and the light-receiving lenses 1108R and 1108L are present along an identical straight line, the two light-receiving lenses are separated by a distance B, the light-receiving lens 1108R and the projection lens 1107 are separated by a distance K, and the object 1121 is separated by the distance D in the vertical direction from the projection lens 1107. Also, the sensor arrays 1101R and 1011L are separated by the distance B, and are arranged to be separated by a distance f from the light-receiving lenses 1108R and 1108L. Let Xr be the distance from one end of the sensor array 1011R to the received-light image 1122R, $\Delta X$ be the distance from one end of the sensor array 1101R to a point on a perpendicular dropped from the principal point of the light-receiving lens 1108R, Xl be the distance from one end of the sensor array 1011L to the received-light image 1122R, and $\Delta X$ be the distance from one end of the sensor array 1011L to a point on a perpendicular dropped from the principal point of the light-receiving lens 1108L.

Then, the following equations hold:

$$D/K = f/(Xr - \Delta X) \quad (6)$$

$$D/(B+K) = f/(Xl - \Delta X) \quad (7)$$

By eliminating K from these equations (6) and (7) and solving them for D, we have:

$$D = B \times f/(Xl - Xr) \quad (8)$$

More specifically, since B and f are constant and are known values, the distance D to the object 1121 can be calculated by substituting the positions Xr and Xl of the received-light images 1122R and 1122L on the sensor arrays into equation (8).

In the above description, a so-called active distance measurement that uses the IRED 1101 in the ON state has been -exemplified. Also, a so-called passive distance measurement, in which the sensor arrays obtain signal charges from the luminance signals of images of the object to be measured formed on the sensor arrays each consisting of a plurality of photoelectric conversion elements by the distance measuring apparatus of this embodiment, and the distance to the object to be measured is calculated based on the charge signals, can be performed as follows.

Referring to FIG. 18, when signal charges are accumulated while inhibiting the ON operation of the IRED 1101 as the light projection unit, the outputs OS are produced as follows:

level of non-signal portion
level of non-signal portion
external light components irradiated onto S1
external light components irradiated onto S1
external light components irradiated onto S2
external light components irradiated onto S2
. . .
external light components irradiated onto S5
external light components irradiated onto S5

When the maximum values of these signals have reached appropriate levels for correlation calculations without saturating the charge transfer channels, or when the accumulation time (the number of rounds) has reached a maximum value set in the EEPROM 1109, accumulation of new charges is stopped, and every other signals OS are stored in the memory 1111, thus obtaining a charge amount based on the luminance of an image formed on the sensors. When the above-mentioned processing is performed for the charge outputs of the sensor arrays 1101R and 1011L shown in FIG. 18, image signals of the object to be measured formed on the sensor arrays can be obtained, and correlation calculation processing for calculating the-relative positional relationship between these image signals is executed to obtain the distance to the object to be measured.

In this embodiment, signal light are projected by turning on the light projection unit for a predetermined period, and distance measurement calculations are made on the basis of signal charges obtained by accumulating electric charges output from the plurality of photoelectric conversion elements that receive the signal light reflected by the object to be measured. The CPU 1110 checks reliability of the distance measurement result, and only when the CPU 1110 determines "no reliability", the distance measurement mode transits to the passive mode. At this time, the maximum total accumulation times of the active and passive distance measurement modes are independently set in the EEPROM 1109.

The above-mentioned mode transition is very effective since signal light reflected by the object 1121 are very weak and it is hard to obtain a reliable active distance measurement result when the distance to the object located at a far-distance position is to be measured in a bright situation, but it often becomes possible to perform distance measurements in the passive distance measurement mode. However, in passive distance measurements in a dark situation, the S/N ratio is impaired, as described above, and the distance measurement performance lowers considerably.

Figure 19:
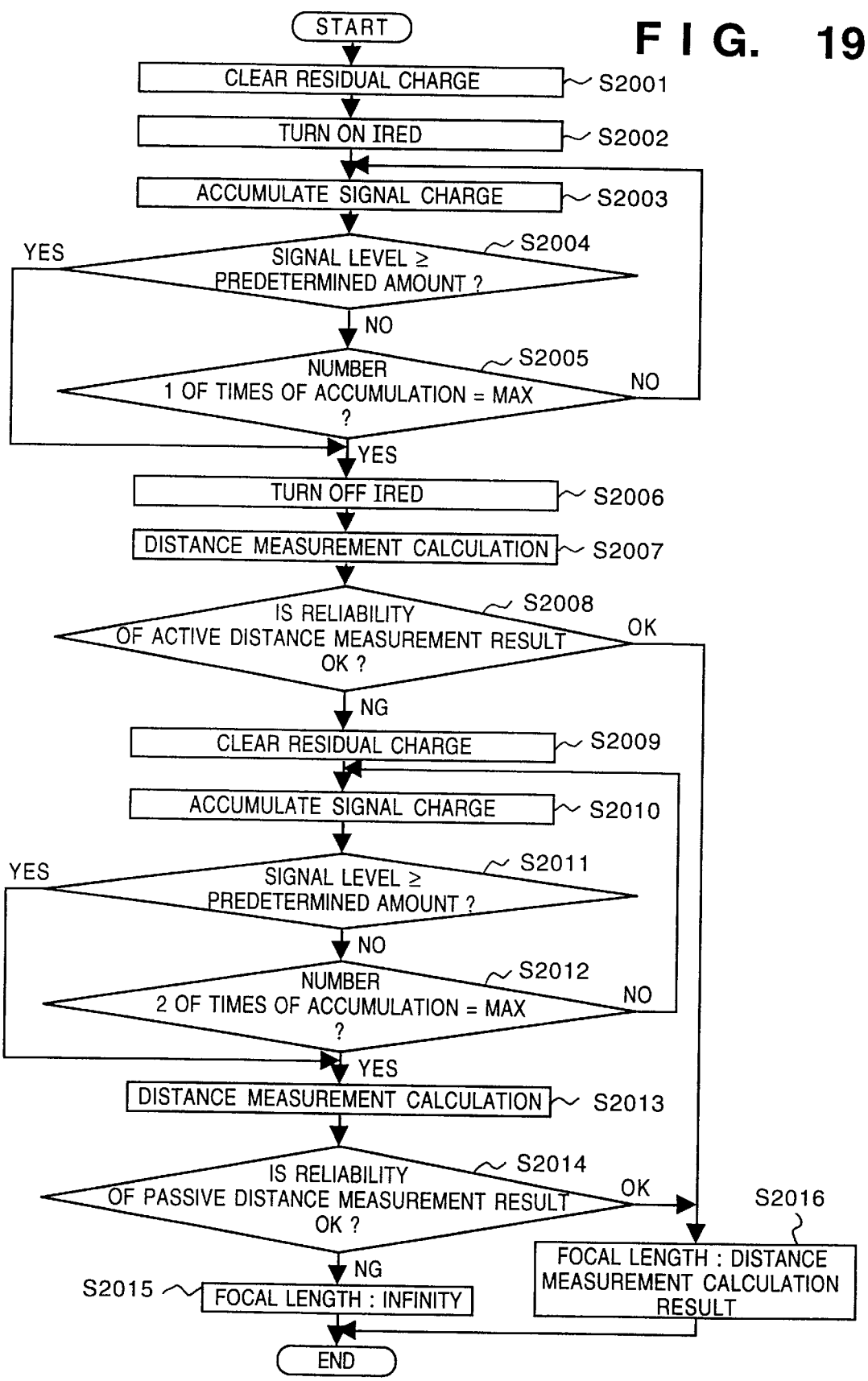
FIG. 19 is a flow chart for explaining the procedure of the distance measurement operation of the auto-focus camera having the distance measuring apparatus according to the fourth embodiment of the present invention.

FIG. 19 is a flow chart showing the procedure of distance measurements in the auto-focus camera comprising the distance measuring apparatus based on the above-mentioned arrangement and operation. The processing operations in the respective steps will be explained below.

[Step S2001]

The residual charges present in the charge integral portions constituted by the components 1012 to 1016 in FIGS. 20 and 21, the linear CCD 1017, and the ring CCD 1018 are cleared via the CCD clear portion 1020.

[Step S2002]

The IRED 1101 is turned on.

[Step S2003]

The signal integral portions 1012 accumulate signal charges. Assume that the accumulation time per accumulation is nearly constant. Accordingly, the maximum value of the total accumulation time can be replaced by the maximum number of times of accumulation.

[Step S2004]

It is checked if the charge amount accumulated in the ring CCD 1018 reaches a predetermined level. If NO in step S2004, the flow advances to step S2005; otherwise, the flow advances to step S2006.

[Step S2005]

It is checked if the number of times of accumulation on the ring CCD 1018 has reached a maximum number of times of electric charge accumulation in the active distance measurement mode, which is set in advance in the EEPROM 1109. If NO in step S2005, the flow returns to step S2003; otherwise, the flow advances to step S2006.

[Step S2006]
The IRED 1101 is turned off.
[Step S2007]
The CPU 1110 performs distance measurement calculations using data obtained by A/D-converting signal charges output from the ring CCD 1018.
[Step S2008]
The CPU 1110 checks if a reliable distance measurement result has been obtained by the distance measurement calculations in the active distance measurement mode in step S2007. More specifically, when the two received-light images 1122R and 1122L have poor correlation therebetween due to weak received-light signals, large noise, and the like, it is determined that a reliable distance measurement result cannot be obtained. When it is determined that a reliable distance measurement result is obtained, the flow advances to step S2016; otherwise, the flow advances to step S2009.
[Step S2009]
The residual charges in the charge integral portions 1012 to 1016, the linear CCD 1017, and the ring CCD 1018 accumulated in the active distance measurement mode are cleared via the CCD clear portion 1020.
[Step S2010]
The signal integral portions 1012 accumulate signal charges while the IRED 1101 is kept OFF.
[Step S2011]
It is checked if the charge amount accumulated in the ring CCD 1018 has reached a predetermined level. If NO in step S2011, the flow advances to step S2012; otherwise, the flow advances to step S2013.
[Step S2012]
It is checked if the number of times of accumulation on the ring CCD 1018 has reached a maximum number of times of electric charge accumulation in the passive distance measurement mode, which is set in advance in the EEPROM 1109. If NO in step S2012, the flow returns to step S2010; otherwise, the flow advances to step S2013. Note that the maximum number of times of accumulation in the passive distance measurement mode is smaller than that in the active distance measurement mode.
[Step S2013]
The CPU 1110 performs distance measurement calculations using datra obtained by A/D-converting signal charges output from the ring CCD 1018.
[Step S2014]
It is checked if a reliable distance measurement result is obtained by the distance measurement calculations in the passive distance measurement mode in step S2013. If it is determined that a reliable distance measurement result is obtained, the flow advances to step S2016; otherwise, the flow advances to step S2015.
[Step S2015]
As the setting value of the focal length of a lens, a predetermined fixed point on the far distance side, e.g., infinity point, is used. This is because the object from which no reliable distance measurement results are obtained in both the active and passive distance measurement modes can be assumed to be separated by a considerably large distance.
[Step S2016]
As the setting value of the focal length of the lens, the distance measurement result in the distance measurement calculation in step S2007 or S2013 is used.
<Reliability Discrimination Method>
The method of discriminating reliability of the distance measurement calculation result will be described below with reference to FIGS. 50A to 50F and FIGS. 51A to 51F.

Figure 50D:
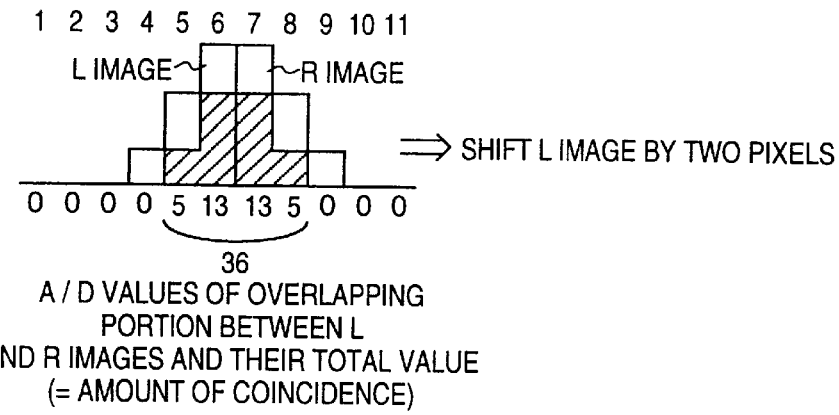
Figure 50E:
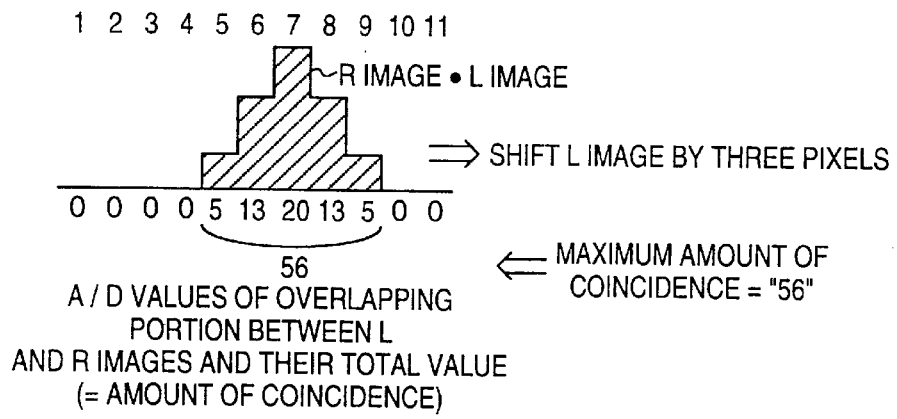
Figure 50F:
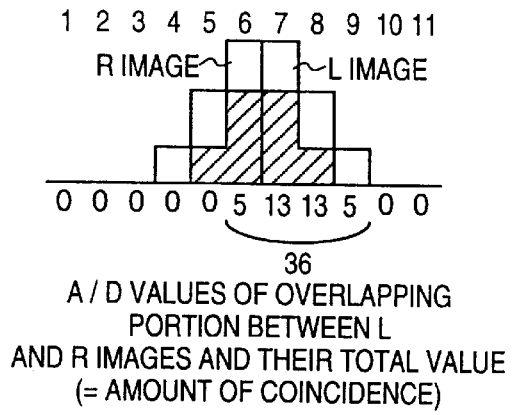
Figure 51A:
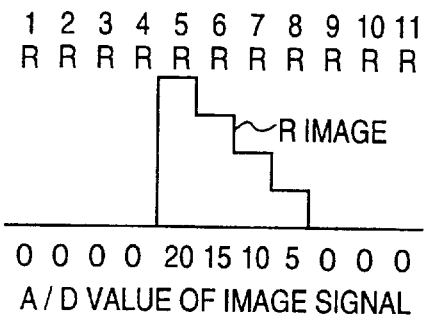
FIGS. 51A to 51F illustrate the method of reliability discrimination according to the fourth embodiment of the present invention.
Figure 51B:
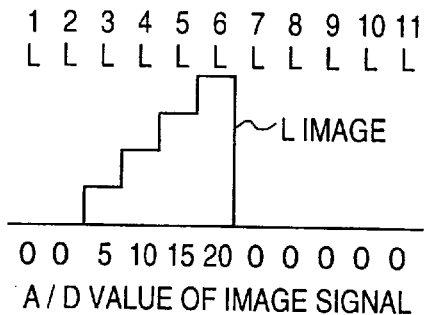
Figure 51C:
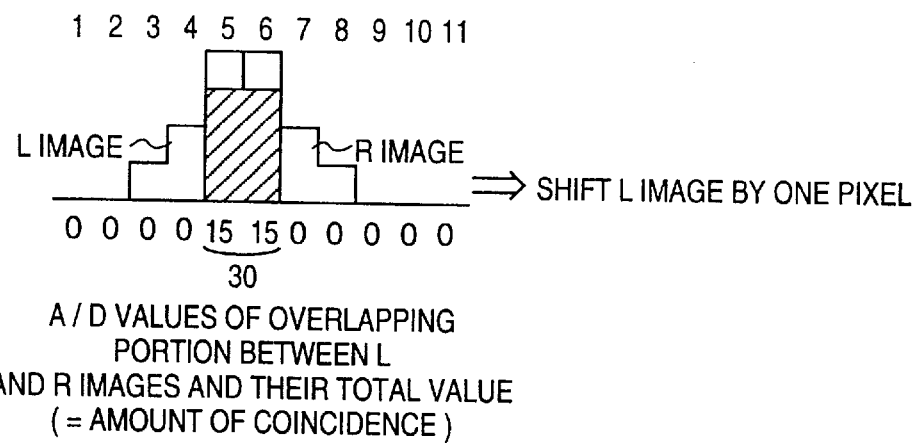
Figure 51D:
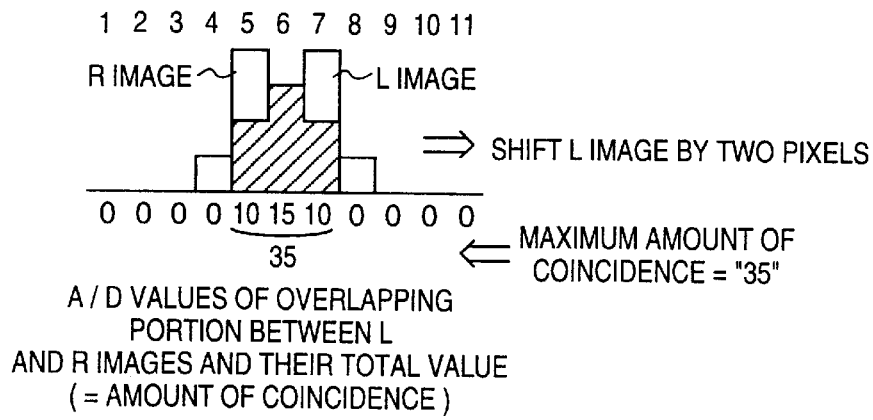
Figure 51E:
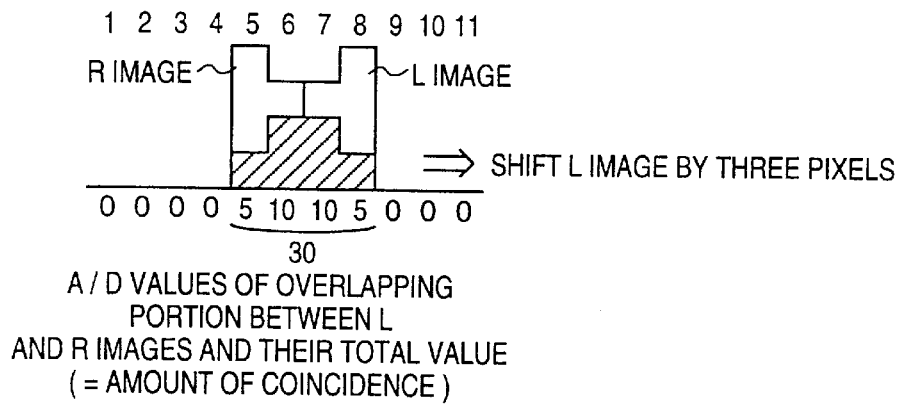
Figure 51F:
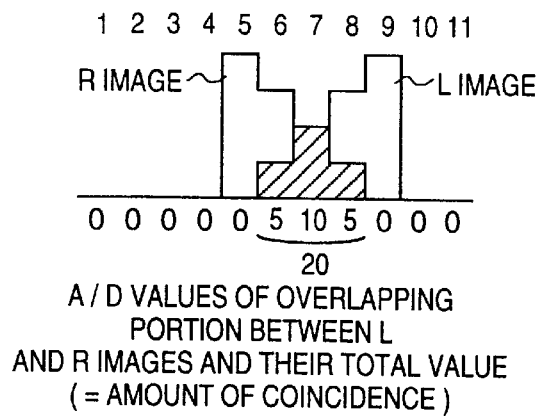

Assume that each of the sensor arrays 1011R and 1101L in the distance measuring apparatus shown in FIG. 18 is constituted by 11 pixels or more, and a signal waveform corresponding to the 11 pixels is extracted from a signal image formed on these pixels so as to execute the distance measurement calculations. FIG. 50A shows signal waveform data obtained in such a manner that charges obtained by photoelectrically converting a signal image formed on the sensor array 1011R based on signal light reflected by the object 1121 to be measured are gradually accumulated in the circulating shift register 1018R, amplified by the output amplifier 1201R, A/D-converted by the A/D converter 1104, and written in the memory circuit 1111. FIG. 50A shows the pixels of the sensor array in correspondence with the A/D-converted values of the signal amounts accumulated there. FIG. 50B shows signal waveform data obtained in such a manner that charges obtained by photoelectrically converting a signal image formed on the sensor array 1101L based on signal light reflected by the object 1121 to be measured are gradually accumulated in the circulating shift register 1018L, amplified by the output amplifier 1201L, A/D-converted by the A/D converter 1104, and written in the memory circuit 1111. FIG. 50B shows the sensor array in correspondence with the A/D-converted values (A/D values) of the signal amounts of the waveform formed there. FIG. 50C shows the data of the overlapping portion between the signal waveform data of the L and R images, which data is calculated by the CPU 1110 (more specifically, the smaller A/D values of the two image data are used as the values of the overlapping portion). A sum of the A/D values in the overlapping portion is defined as the amount of coincidence. FIG. 50D shows the data, calculated by the CPU 1110, of the overlapping portion between the two image data after the signal waveform data of the L image is shifted by one pixel in a direction indicated by an arrow. Similarly, FIGS. 50E and 50F show the calculation results after the signal waveform data is shifted by two and three pixels, respectively. If the signal waveform data is shifted by two pixels, the L and R images perfectly overlap each other when the amount of coincidence assumes a maximum value "56". In other words, at a point corresponding to the maximum amount of coincidence, the two images overlap each other. The relative distance (Xl–Xr) between the two images can be calculated based on the shift amount until the maximum amount of coincidence is obtained by shifting one signal waveform data (L image in this embodiment), and the size per pixel in the widthwise direction. Accordingly, the distance to the object to be measured can be calculated using equation (8). FIGS. 51A to 51F show a case wherein the L and R images have different shapes, and the amount of coincidence is calculated by shifting the L image by one pixel as in FIGS. 50A to 50F. In this case, the amount of coincidence has a maximum value "35" after the L image is shifted by one pixel, but the two image do not completely coincide with each other at this point, as a matter of course. More specifically, the amount of coincidence increases/decreases in accordance with the degree of coincidence between the two signal waveforms. From the foregoing, it is assumed that the magnitude of the maximum amount of coincidence has a correlation with the degree of coincidence between the two signal waveforms. In this embodiment, if it is defined that "the distance measurement result has no reliability if the amount of coincidence is not more than 40", the distance calculation result calculated based on the signal waveforms shown in FIGS. 51A to 51F is rejected as "one without reliability". Accordingly, the discrimination of the distance measurement result can be attained by comparing the maximum amount of coincidence between two signal waveform data with a predetermined reference value. Under such definition, when two signal images are very small, the amount of coincidence assumes a very small value even when the two images coincide with each other. However, when signal images are small, the influence of noise may be large and, hence, "no reliability" can be determined.

As described above, according to this embodiment, in the distance measuring apparatus having both the function of performing active distance measurements and the function of performing passive distance measurements, the maximum total accumulation time in the electric charge accumulation portion in the active distance measurement mode, and that in the passive distance measurement mode are independently set. More specifically, even if the number of the time of accumulation is increased, a sufficiently high S/N ratio is not acquired by a passive distance measurement, in case that the distance to the object to be measured which is not so bright is to be measured. Therefore, the maximum accumulation time in the passive distance measurment mode is set independently of that in the active distance measurement mode. With this setting, the distance measurement time can be prevented from being nonsensically prolonged, and increases in release time lag can be prevented in the case of a camera.

<Fifth Embodiment>

The fifth embodiment of the present invention will be described below with reference to FIGS. 25 to 28.

Figure 25:
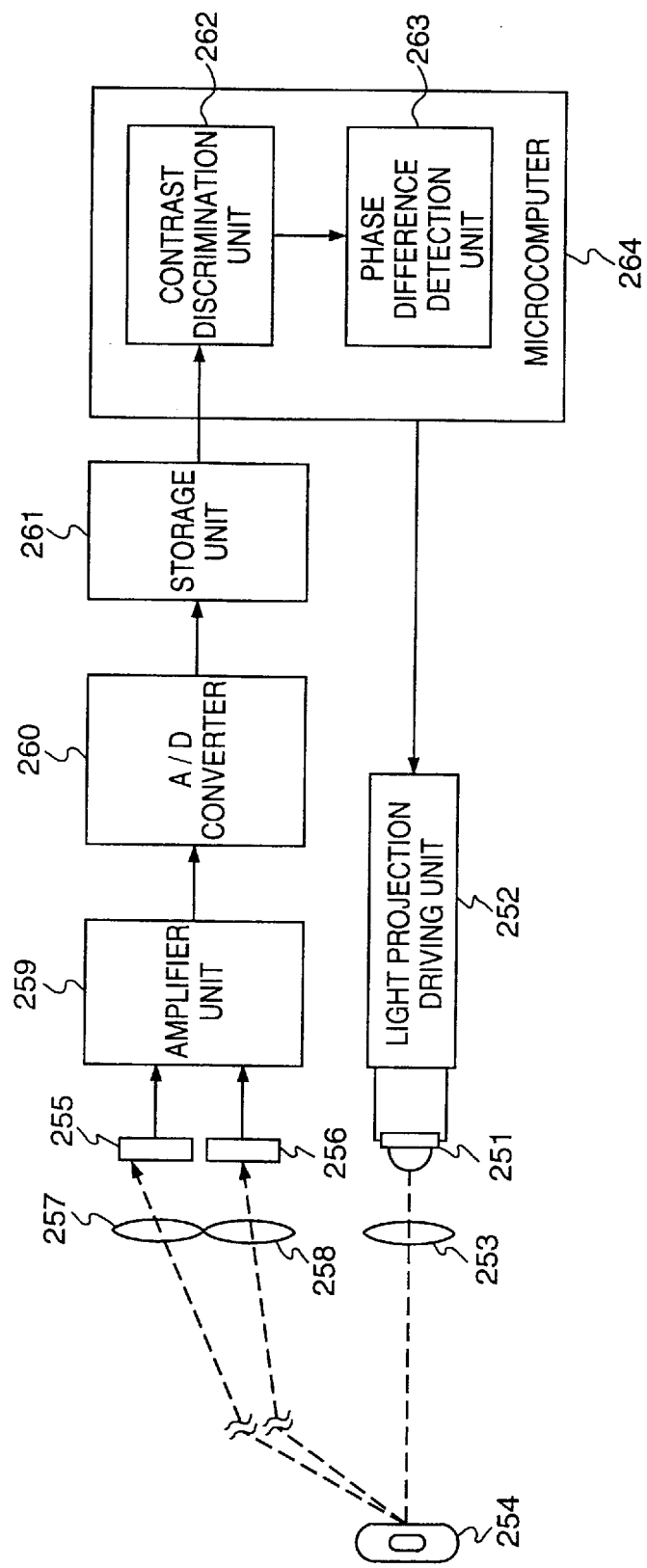
FIG. 25 is a block diagram showing the arrangement of a distance measuring apparatus according to the fifth embodiment of the present invention.
Figure 26:
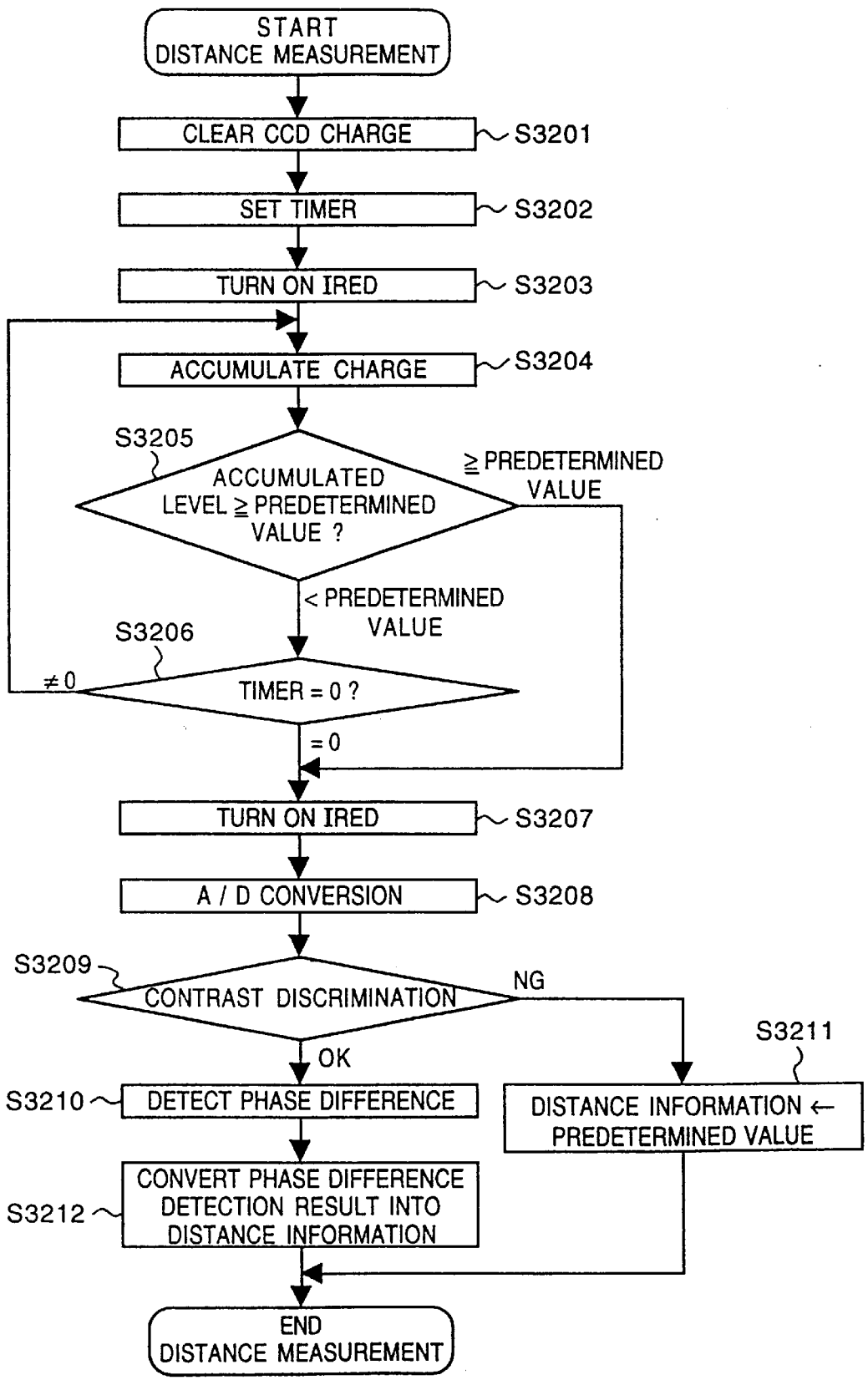
FIG. 26 is a flow chart showing the distance measurement operation of the distance measuring apparatus according to the fifth embodiment of the present invention.
Figure 46:
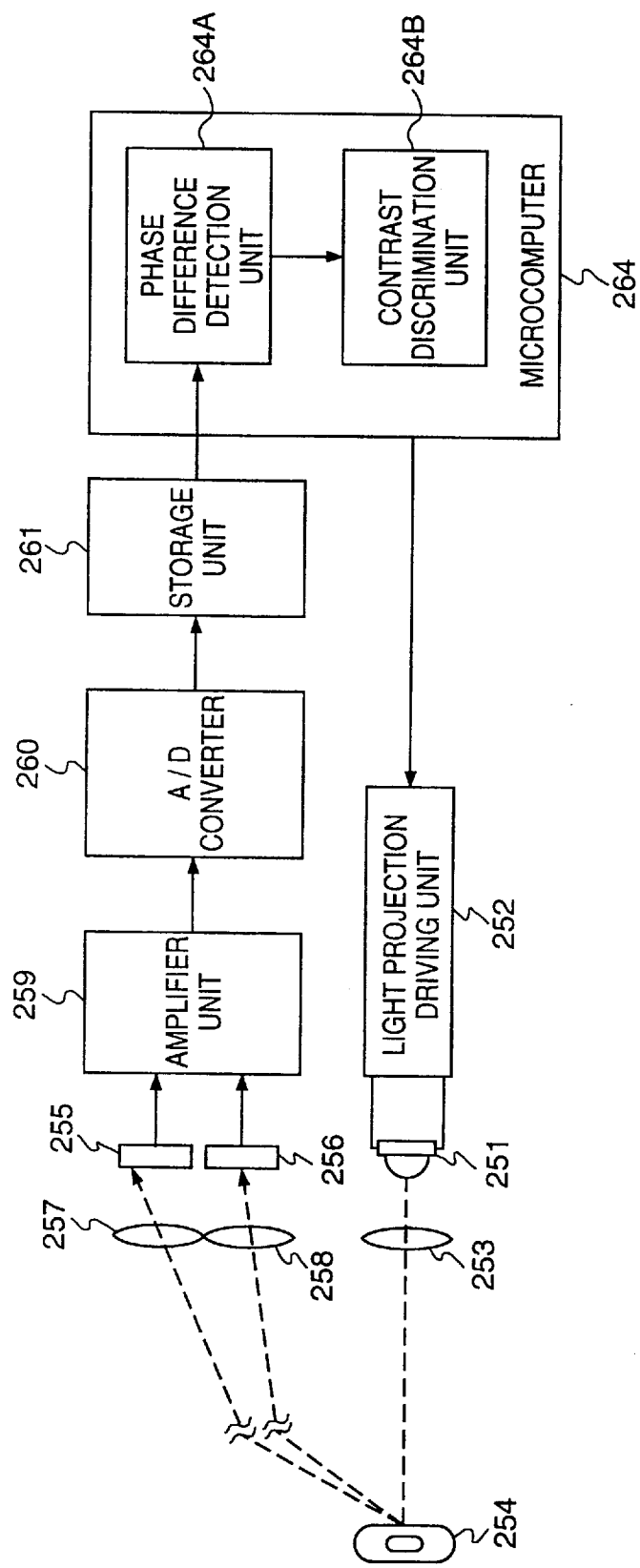
FIG. 46 is a block diagram showing the arrangement of a conventional distance measuring apparatus.
Figure 47:
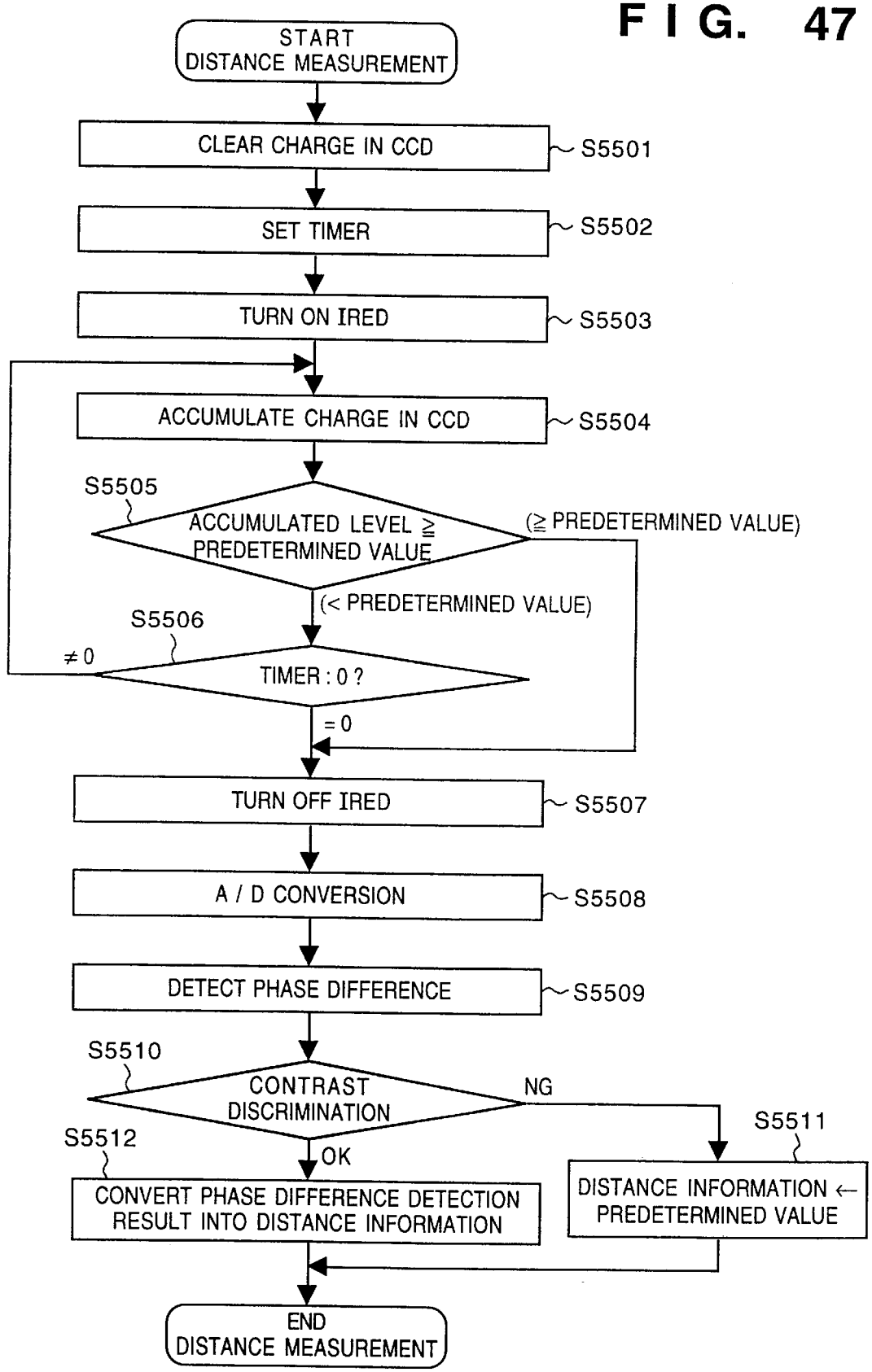
FIG. 47 is a flow chart showing the distance measurement operation of the conventional distance measuring apparatus.
Figure 48:
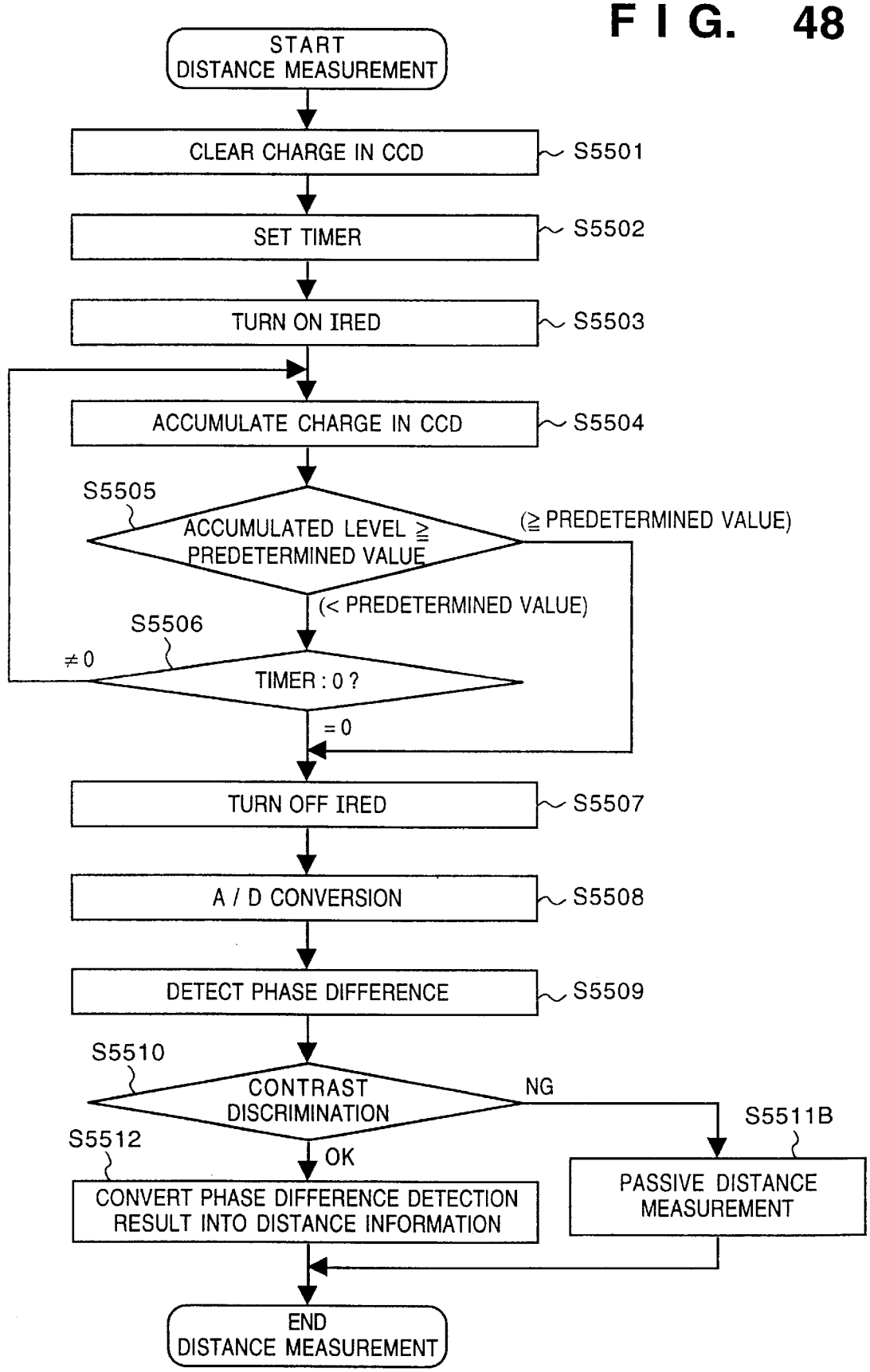
FIG. 48 is a flow chart showing another distance measurement operation of the conventional distance measuring apparatus.
Figure 49:
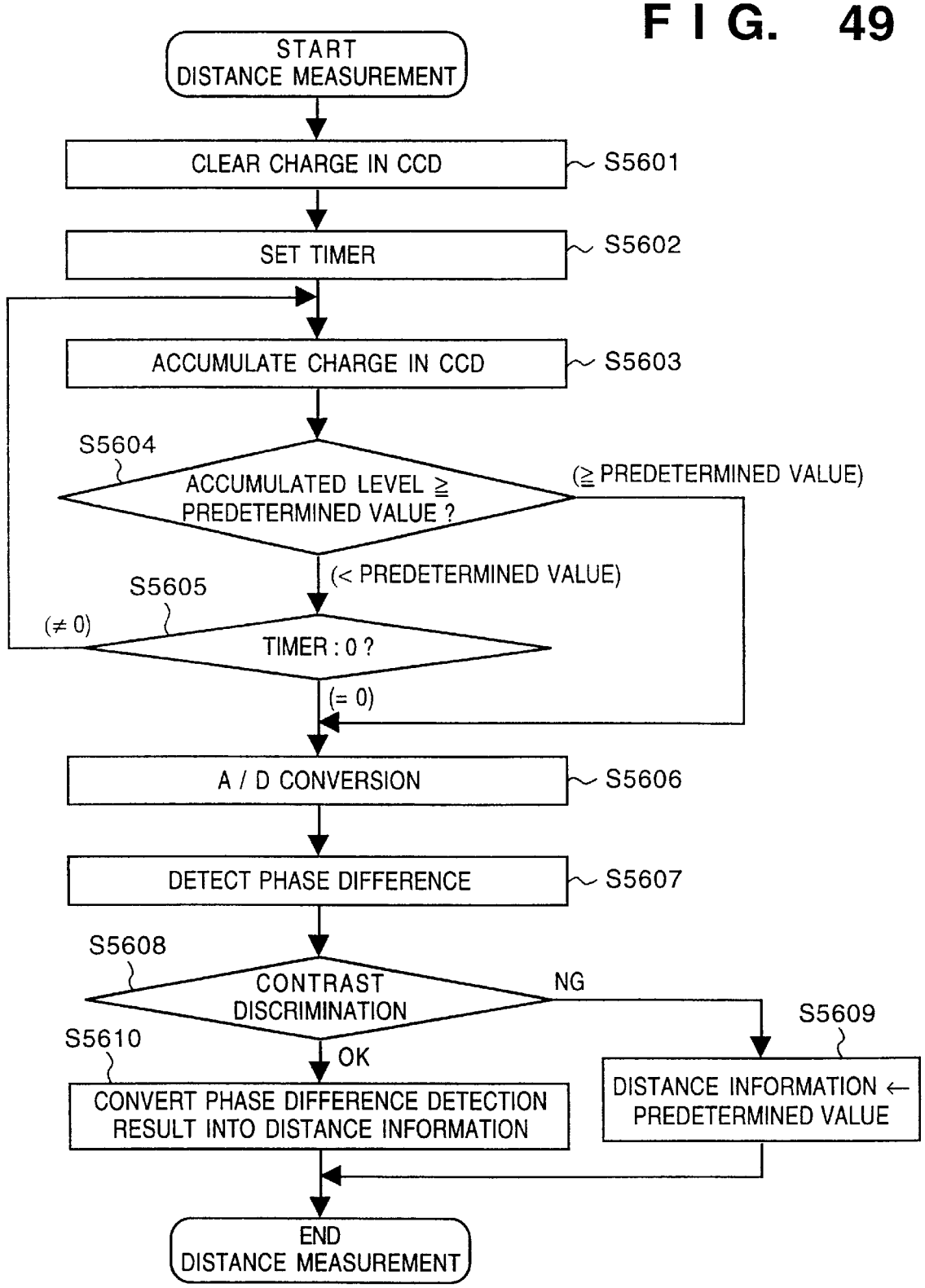
FIG. 49 is a flow chart showing the passive distance measurement operation of the conventional distance measuring apparatus.

FIG. 25 is a-block diagram of a distance measuring apparatus of this embodiment, and FIG. 26 is a flow chart showing the operation in distance measurements. Referring to FIG. 25, reference numerals 251 to 261 are substantially the same as those denoted by the same reference numerals in FIG. 46 above, and a detailed description thereof will be omitted.

Reference numeral 262 denotes a contrast discrimination unit, which discriminates the presence/absence of distance measurement reliability by performing a calculation given by equation (1) above for each of a pair of image signals stored in the RAM 261, and comparing these calculation values with a predetermined level. Reference numeral 263 denotes a phase difference detection unit which executes its processing only when the discrimination result of the contrast discrimination unit 262 indicates "OK". The unit 263 detects a shift position corresponding to the peak value of the correlation amount, and calculates the phase difference between a pair of image signals stored in the RAM 261 by interpolation on the basis of the detected value. This calculation result is converted into a distance to the object to be measured using the principle of trigonometric measurements. Reference numeral 264 denotes a microcomputer for controlling the distance measuring apparatus and performing distance measurement calculations.

The distance measurement operation of the distance measuring apparatus shown in FIG. 25 will be described below with reference to the flow chart in FIG. 26. Referring to FIG. 26, the residual charges in the CCDs 255 and 256 are reset in step S3201 before beginning electric charge accumulation. In step S3202, a timer (not shown) for measuring the electric charge accumulation time of each CCD by down-counting is started. The IRED 251 is turned on in step S3203, and electric charge accumulation of the CCDs 255 and 256 is started in step S3204. In step S3205, the levels of electric charges accumulated in the CCDs 255 and 256 are checked to prevent saturation. If the electric charge accumulation amount of one of the CCDs 255 and 256 exceeds a predetermined level, the accumulation operation ends, and the flow advances to step S3207 to turn off the IRED 251. On the other hand, if the electric charge accumulation levels of the CCDs 255 and 256 have not reached the predetermined level, the flow advances to step S3206. In step S3206, the value of the timer (not shown) is monitored. If the value of the timer is not 0, the flow returns to step S3204 to continue the accumulation operation. If the value of the timer is 0, the accumulation operation ends, and the IRED 251 is turned off in step S3207.

The accumulated electric charges are processed as image information, and are amplified by the amplifier unit 259. A plurality of pieces of image information are quantized by the A/D converter 260 in step S3208, and the quantized image signals of the CCDs 255 and 256 are stored in the RAM 261. In step S3209, the contrast discrimination unit 262 performs contrast discrimination. That is, the unit 262 calculates equation (1) above for each of the image signals obtained by the CCDs 255 and 256, and compares the calculation results with a contrast discrimination value, which is set in advance by experiments.

If the discrimination results indicates "OK", a shift position corresponding to the peak value of the correlation amount is detected, and the phase difference between the image signals obtained by the CCDs 255 and 256 and stored in the RAM 261 is calculated by interpolation on the basis of the detected value, in step S3210. In step S3212, the phase difference is converted into a distance to the object to be measured using the principle of trigonometric measurements, and thereafter, the distance measurement operation ends. On the other hand, if the discrimination results indicates "NG", distance information is set to be a predetermined fixed value in step S3211.

The contrast discrimination result "NG" is obtained under the conditions that the object to be measured is located, with very high possibility, at a far-distance or infinity position the light beam projected by the IRED 251 cannot reach. For this reason, the fixed value is set to be a predetermined value corresponding to a far distance or an intermediate value that does not increase the defocus amount independently of the distance to the object to be measured within the distance range that generates the contrast discrimination result "NG".

Figure 27:
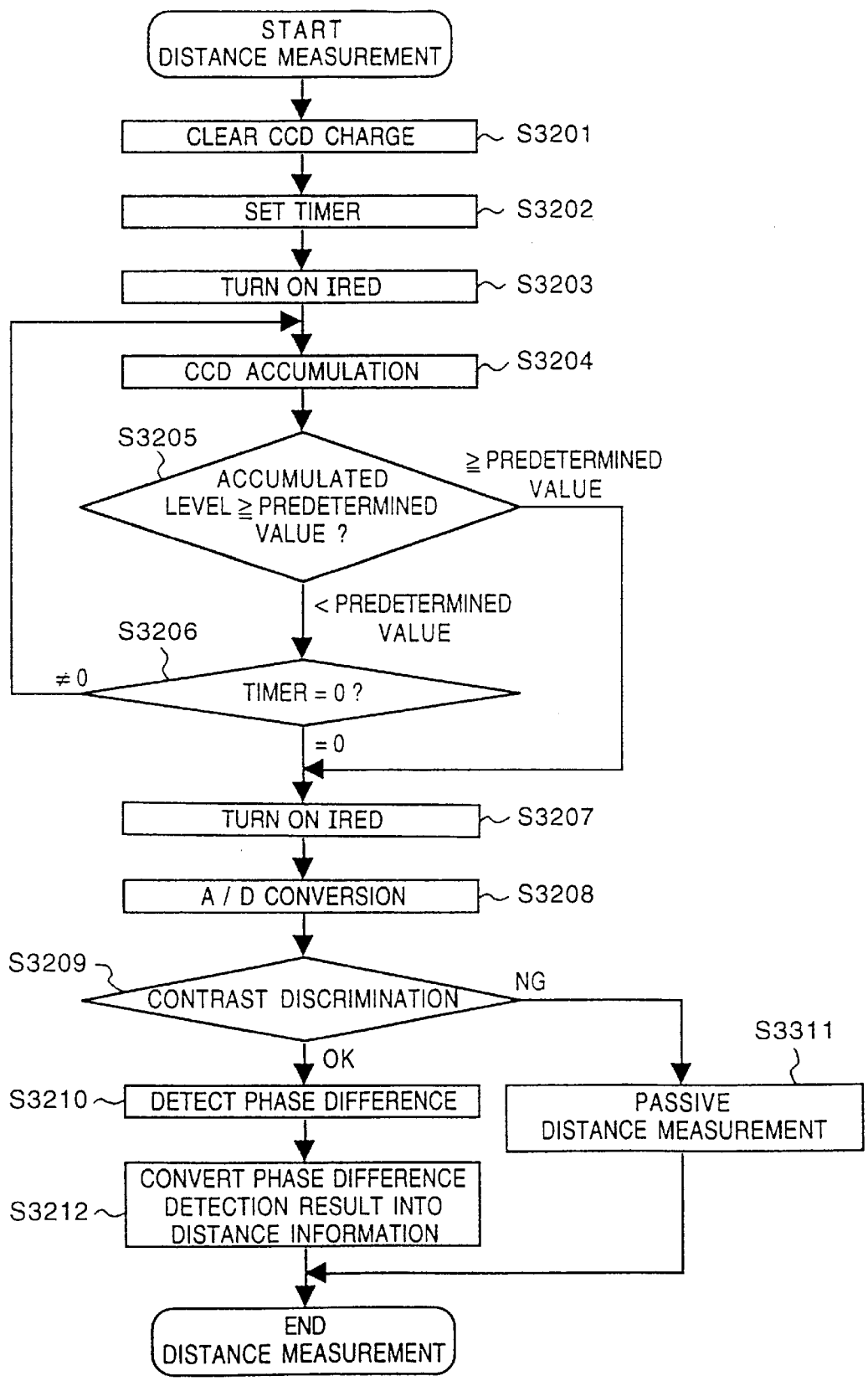
FIG. 27 is a flow chart showing the distance measurement operation of the distance measuring apparatus according to a modification of the fifth embodiment of the present invention.

As another distance measurement method of the distance measuring apparatus, a distance measuring apparatus which performs a passive distance measurement when the contrast discrimination result indicates "NG" in an active distance measurement will be described below. Since the block arrangement of this distance measuring apparatus is the same as that shown in FIG. 25, a detailed description thereof will be omitted. The distance measurement operation is performed in accordance with the flow chart in FIG. 27. In FIG. 27, electric charge accumulation of the CCDs 255 and 256, A/D conversion, phase difference detection, and contrast discrimination are performed in steps S3201 to S3209 as in FIG. 26, and if the contrast discrimination result indicates "OK", the phase difference detection and conversion of the phase difference into distance information are performed in steps S3210 and S3212. However, if the discrimination result indicates "NG", a passive distance measurement is performed in step S3311, and thereafter, the distance measurement operation ends.

Figure 28:
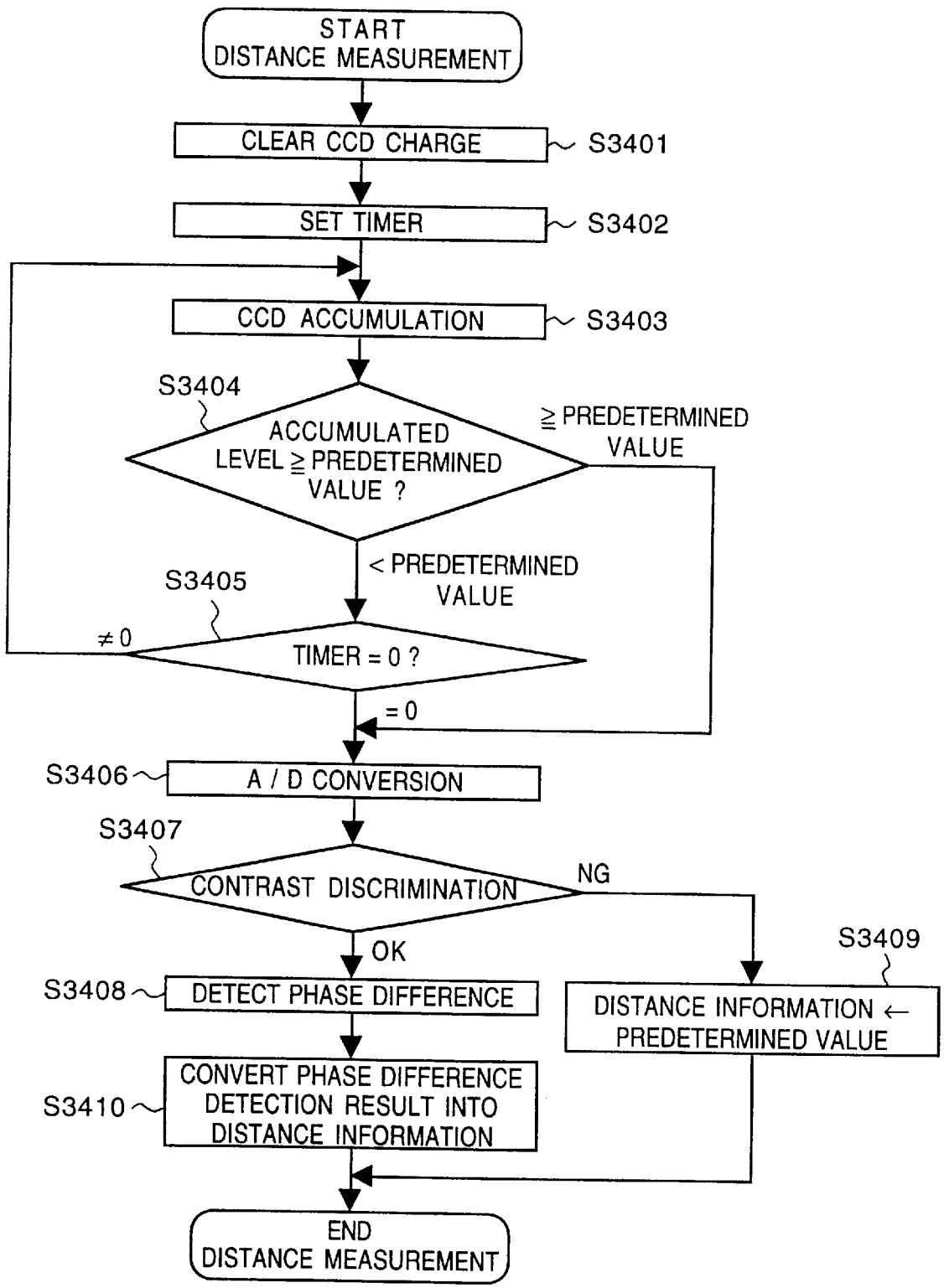
FIG. 28 is a flow chart showing the passive distance measurement operation of the distance measuring apparatus according to the fifth embodiment of the present invention.

The passive distance measurement operation when the contrast discrimination result indicates "NG" is performed in accordance with the flow chart in FIG. 28. Referring to FIG. 28, the residual charges in the CCDs 255 and 256 are reset in step S3401 before beginning electric charge accumulation. In step S3402, a timer (not shown) for measuring the electric charge accumulation time of each CCD by down-counting is started. In step S3403, accumulation of electric charges in the CCDs 255 and 256 is started. In step S3404, the levels of the electric charges accumulated in the CCDs 255 and 256 are checked to prevent saturation. If the amount of electric charges accumulated in one of the pair of CCDs 255 and 256 exceeds-a predetermined level, the accumulation operation ends, and the flow advances to step S3406. On the other hand, if the levels of electric charges accumulated in the pair of CCDs 255 and 256 have not reached the predetermined level, the flow advances to step S3405. In step S3405, the value of the timer (not shown) is monitored. If the value of the timer is not 0, the flow returns to step S3403 to continue the accumulation operation. If the value of the timer is 0, the accumulation operation ends, and the flow advances to step S3406.

The accumulated electric charges are processed as image information, and are amplified by the amplifier unit 259. A plurality of pieces of image information are quantized by the A/D converter 260 in step S3406, and the quantized image signals of the CCDs 255 and 256 are stored in the RAM 261. In step S3407, the contrast discrimination unit 262 performs contrast discrimination. That is, the unit 262 calculates equation (1) for each of the image signals of the CCDs 255 and 256 stored in the RAM 261, and compares these calculation results with a contrast discrimination value, which is set in advance by experiments. If the discrimination result indicates "OK", a shift position corresponding to the peak value of the correlation amount is detected, and the phase difference between the image signals obtained by the CCDs 255 and 256 and stored in the RAM 261 is calculated by interpolation on the basis of the detected value, in step S3408. In step S3410, the phase difference is converted into a distance to the object to be measured using the principle of trigonometric measurements, and thereafter, the passive distance measurement operation ends. If the contrast discrimination result indicates "NG", distance information is set to be a predetermined fixed value in step S3409, and thereafter, the passive distance measurement operation ends.

In the distance measuring apparatus that performs the operations shown in FIG. 27, a passive distance measurement is executed under the conditions that the contrast discrimination result in the active distance measurement mode indicates "NG", i.e., the object to be measured is located, with very high possibility, at a far-distance or infinity position the light beam projected by the IRED 251 cannot reach. For this reason, the fixed value is set to be a predetermined value corresponding to a far distance or an intermediate value that does not increase the defocus amount independently of the distance to the object to be measured within the distance range that generates the contrast discrimination result "NG".

As described above, according to the distance measuring apparatus of this embodiment, since contrast discrimination is executed prior to phase difference detection for detecting the phase difference between the signals from the first and second light-receiving units, the control can skip execution of the phase difference detection when the contrast discrimination result indicates "NG", thus shortening the distance measurement time.

Note that a distance measuring apparatus obtained by combining the above embodiments is included in the scope of the present invention although a description thereof is omitted for the sake of simplicity.

As many apparently widely different embodiments of the present invention can be made without departing from the spirit and scope thereof, it is to be understood that the invention is not limited to the specific embodiments thereof except as defined in the appended claims.

What is claimed is:

1. A distance measuring apparatus which comprises light projection means for projecting signal light onto an object, and measures a distance to the object on the basis of reflected light obtained by projecting the signal light toward the object, comprising:

first and second light-receiving means for respectively outputting signals in accordance with an amount of the reflected light received from the object;

first distance measuring means for calculating the distance to the object by performing a correlation calculation on the basis of two signals output from said first and second light-receiving means when said light projection means is used;

second distance measuring means for calculating the distance to the object by performing a correlation calculation on the basis of two signals output from said first and second light-receiving means when said light projection means is not used;

first reliability discrimination means for discriminating reliability of the distance calculated by said first distance measuring means on the basis of a first reliability discrimination value; and second reliability discrimination means for discriminating reliability of the distance calculated by said second distance measuring means on the basis of a second reliability discrimination value.

2. The apparatus according to claim 1, wherein each of the first and second reliability discrimination values is a value indicating a degree of coincidence between the two signals output from said first and second light-receiving means.

3. The apparatus according to claim 2, further comprising:

control means for, when said first reliability discrimination means determines that the distance calculated by said first distance measuring means has no reliability, calculating the distance to the object using said second distance measuring means.

4. The apparatus according to claim 3, further comprising:

calculation means for, when said first and second reliability discrimination means determine that the two distances calculated by said first and second distance measuring means have no reliability, checking if the two calculated distances fall within a predetermined range, and for, when the two calculated distances fall within the predetermined range, calculating an average value of the two calculated distances as the distance to the object.

5. The apparatus according to claim 3, further comprising:

selection means for, when said first and second reliability discrimination means determine that the two distances calculated by said first and second distance measuring means have no reliability, selecting one, having higher reliability, of the two calculated distances as the distance to the object.

6. The apparatus according to claim 3, further comprising:

output means for, when said first and second reliability discrimination means determine that the two distances calculated by said first and second distance measuring means have no reliability, outputting a predetermined value as the distance to the object.

7. The apparatus according to claim 6, wherein the predetermined value represents infinity.

8. The apparatus according to claim 2, wherein said first and second distance measuring means include first and second filter means for respectively performing filter processing for the signals obtained by said first and second light-receiving means.

9. The apparatus according to claim 8, wherein said first filter means performs processing for attenuating a spatial frequency in a high-frequency region of the signals obtained by said first and second light-receiving means, and said second filter means performs processing for attenuating a spatial frequency in a low-frequency region of the signals obtained by said first and second light-receiving means.

10. A distance measuring apparatus which comprises light projection means for projecting signal light onto an object, and measures a distance to the object on the basis of reflected light obtained by projecting the signal light toward the object, comprising:

first and second light-receiving means for respectively outputting signals in accordance with an amount of the reflected light received from the object;

first distance measuring means for calculating the distance to the object by performing a correlation calculation on the basis of two signals output from said first and second light-receiving means when said light projection means is used;

second distance measuring means for calculating the distance to the object by performing a correlation calculation on the basis of two signals output from said first and second light-receiving means when said light projection means is not used;

contrast calculation means for calculating contrast values of the signals obtained by said first and second light-receiving means;

first contrast discrimination means for discriminating the contrast values calculated by said contrast calculation means on the basis of a first contrast discrimination value; and second contrast discrimination means for discriminating the contrast values calculated by said contrast calculation means on the basis of a second contrast discrimination value.

11. The apparatus according to claim 10, further comprising:

first reliability discrimination means for discriminating reliability of the distance calculated by said first distance measuring means on the basis of a first reliability discrimination value; and second reliability discrimination means for discriminating reliability of the distance calculated by said second distance measuring means on the basis of a second reliability discrimination value.

12. The apparatus according to claim 11, wherein each of the first and second reliability discrimination values is a value indicating a degree of coincidence between the two signals output from said first and second light-receiving means.

13. The apparatus according to claim 12, wherein when one of said first and second reliability discrimination means determines that the calculated distance has reliability, the contrast value is discriminated by one of said first and second contrast discrimination means.

14. A distance measuring apparatus which comprises light projection means for projecting signal light onto an object, and measures a distance to the object on the basis of reflected light obtained by projecting the signal light toward the object, comprising:

first and second light-receiving means for respectively outputting signals in accordance with an amount of the reflected light received from the object;

distance measuring means for calculating the distance to the object by performing a correlation calculation on the basis of two signals output from said first and second light-receiving means;

reliability discrimination means for discriminating reliability of the distance calculated by said distance measuring means on the basis of a reliability discrimination value; and changing means for changing the reliability discrimination value used in said reliability discrimination means.

15. The apparatus according to claim 14, wherein the reliability discrimination value is a value indicating a degree of coincidence between the two signals output from said first and second light-receiving means.

16. The apparatus according to claim 15, wherein said changing means changes the reliability discrimination value in accordance with a luminance of the signal.

17. The apparatus according to claim 15, wherein said first and second light-receiving means include:

a plurality of sensor arrays each including an array of a plurality of sensors for receiving the reflected light;

accumulation means for accumulating electric charges obtained from the plurality of sensors during ON and OFF periods of said light projection means;

charge transfer means, at least a portion of which is connected in a ring shape, for transferring the electric charges accumulated by said accumulation means; and calculation means for calculating signal outputs from the plurality of sensors by adding signal electric charges from said accumulation means in synchronism with the charges which circulate the portion coupled in the ring shape and subtracting the charges obtained during the OFF period of said light projection means by said accumulation means from the charges obtained during the ON period.

18. The apparatus according to claim 17, wherein said changing means changes the reliability discrimination value in accordance with the number of rounds of charges which circulate.

19. A distance measuring apparatus which comprises light projection means for projecting signal light onto an object, and measures a distance to the object on the basis of reflected light obtained by projecting the signal light toward the object, comprising:

first and second light-receiving means for respectively outputting signals in accordance with an amount of the reflected light received from the object;

distance measuring means for calculating the distance to the object by performing a correlation calculation on the basis of two signals output from said first and second light-receiving means;

contrast calculation means for calculating contrast values of the signals obtained by said first and second light-receiving means;

contrast discrimination means for discriminating the contrast values calculated by said contrast calculation means on the basis of a contrast discrimination value; and changing means for changing the contrast value used in said contrast discrimination means.

20. The apparatus according to claim 19, wherein said changing means changes the contrast discrimination value in accordance with a luminance of the signal.

21. The apparatus according to claim 20, further comprising:

reliability discrimination means for discriminating reliability of the distance calculated by said distance measuring means on the basis of a reliability discrimination value, and wherein said changing means changes the contrast discrimination value used in said contrast discrimination means and the reliability discrimination value used in said reliability discrimination means in accordance with the luminance of the signal.

22. The apparatus according to claim 21, wherein the reliability discrimination value is a value indicating a degree of coincidence between the two signals output from said first and-second light-receiving means.

23. The apparatus according to claim 20, wherein said first and second light-receiving means include:

a plurality of sensor arrays each including an array of a plurality of sensors for receiving the reflected light;

accumulation means for accumulating charges obtained from the plurality of sensors during ON and OFF periods of said light projection means;

charge transfer means, at least a portion of which is connected in a ring shape, for transferring the electric charges accumulated by said accumulation means; and calculation means for calculating signal outputs from the plurality of sensors by adding signal electric charges from said accumulation means in synchronism with the charges which circulate the portion coupled in the ring shape and subtracting the charges obtained during the OFF period of said light projection means by said accumulation means from the charges obtained during the ON period.

24. The apparatus according to claim 23, wherein said changing means changes the reliability discrimination value in accordance with the number of rounds of charges which circulate.

25. The apparatus according to claim 22, wherein said first and second light-receiving means include:

a plurality of sensor arrays each including an array of a plurality of sensors for receiving the reflected light;

accumulation means for accumulating electric charges obtained from the plurality of sensors during ON and OFF periods of said light projection means;

charge transfer means, at least a portion of which is connected in a ring shape, for transferring the electric charges accumulated by said accumulation means; and calculation means for calculating signal outputs from the plurality of sensors by adding signal charges from said accumulation means in synchronism with the charges which circulate the portion coupled in the ring shape and subtracting the charges obtained during the OFF period of said light projection means by said accumulation means from the charges obtained during the ON period.

26. The apparatus according to claim 25, wherein said changing means changes the reliability discrimination value in accordance with the number of rounds of charges which circulate.

27. The apparatus according to claim 19, wherein said contrast calculation means includes attenuation means for attenuating high-frequency noise of the signals, and calculates the contrast values on the basis of the signals, noise of which is attenuated by said attenuation means.

28. A distance measuring apparatus which comprises light projection means for projecting signal light onto an object, and measures a distance to the object on the basis of reflected light obtained by projecting the signal light toward the object, comprising:

first and second light-receiving means for respectively outputting signals in accordance with an amount of the reflected light received from the object;

electric charge accumulation means for accumulating signal charges output from said first and second light-receiving means;

first distance measuring means for calculating the distance to the object by performing a correlation calculation on the basis of the signal electric charges accumulated in said electric charge accumulation means when said light projection means is used;

second distance measuring means for calculating the distance to the object by performing a correlation calculation on the basis of the signal electric charges accumulated in said electric charge accumulation means when said light projection means is not used;

setting means for independently setting a maximum accumulation time of the electric charges accumulated in said electric charge accumulation means in correspondence with said first and second distance measuring means; and control means for controlling said electric charge accumulation means in accordance with the maximum accumulation time set by said setting means.

29. The apparatus according to claim 28, wherein each of said first and second light-receiving means includes a plurality of photoelectric conversion elements for receiving the reflected light, and signal electric charge supply means for accumulating signal charges output from the photoelectric conversion elements and transferring the signal charges in accordance with a predetermined charge transfer pulse, and said electric charge accumulation means includes a group of transfer electrodes formed, via a gate oxide film, on a plurality of charge transfer channels which are connected in a loop shape and transfer charges in a predetermined direction, a floating gate electrode portion formed via a gate oxide film to detect a signal charge amount transferred by the charge transfer channels, and signal charge injection means for injecting signal charges from said signal charge supply means into the charge transfer channels, and constitutes a circulating shift register for accumulating the signal charges injected by said charge injection means by injecting the signal charges from said signal charge supply means into the charge transfer channels via said signal charge injection means and circulating the signal charges in accordance with a charge transfer pulse applied to the transfer electrodes.

30. The apparatus according to claim 29, wherein said setting means sets a maximum number of times of accumulation of the signal charges in said circulating shift register as the maximum accumulation time.

31. The apparatus according to claim 29, wherein said setting means sets the maximum accumulation time for said second distance measuring means to be shorter than the maximum accumulation time for said first distance measuring means.

32. The apparatus according to claim 29, wherein said control means controls to discriminate reliability of a calculation result of said first distance measuring means, and to perform a distance measurement using said second distance measuring means in accordance with a discrimination result.

33. A distance measuring apparatus for measuring a distance to an object on the basis of reflected light from the object, comprising:

light-receiving means including a plurality of photoelectric conversion elements for receiving the reflected light;

A/D conversion means for A/D-converting signals from said light-receiving means;

correction means for detecting a level variation in signal A/D-converted by said A/D conversion means, and correcting the A/D-converted signals on the basis of a detection result; and distance calculation means for calculating the distance to the object on the basis of the signals corrected by said correction means.

34. The apparatus according to claim 33, further comprising:

light projection means for projecting signal light onto the object.

35. The apparatus according to claim 34, wherein said distance calculation means includes:

first distance measuring means for calculating the distance to the object by performing a correlation calculation on the basis of the signals output from said light-receiving means when said light projection means is used; and second distance measuring means for calculating the distance to the object by performing a correlation calculation on the basis of the signals output from said light-receiving means when said light projection means is not used.

36. The apparatus according to claim 35, wherein when said distance calculation means executes one of said first and second distance measuring means, said correction means performs correction.

37. The apparatus according to claim 33, wherein said light-receiving means uses a skim CCD sensor.

38. The apparatus according to claim 33, wherein said correction means detects the level variation in signal using a plurality of empty transfer portions including no signals in said light-receiving means, and performs correction on the basis of a detection result.

39. A distance measuring apparatus which comprises light projection means for projecting light onto an object, and measures a distance to the object on the basis of light from the object, comprising:

first and second light-receiving means for respectively outputting signals in accordance with an amount of the light received from the object; and distance measuring means for calculating the distance to the object on the basis of two signals output from said first and second light-receiving means, wherein said distance measuring means includes:

discrimination means for discriminating, on the basis of the signals obtained by said first and second light-receiving means, whether or not a distance measurement performed by said distance measuring means is successful when said light projection means projects light; and phase difference detection means for detecting a phase difference between the signals obtained by said first and second light-receiving means without activating said light projection means in accordance with a discrimination result of said discrimination means.

40. The apparatus according to claim 39, wherein said discrimination means discriminates contrast by performing a predetermined calculation for each of the signals, and comparing a calculation result with a predetermined value.

41. The apparatus according to claim 39, wherein a distance measurement result is set to be a predetermined value when the discrimination result of said discrimination means indicates "NG".

42. The apparatus according to claim 39, wherein the distance measurement is performed by receiving the reflected light from the object without using said light projection means when the discrimination result of said discrimination means indicates "NG".

43. The apparatus according to claim 39, wherein said first and second light-receiving means include:

a plurality of sensor arrays each including an array of a plurality of sensors for receiving the reflected light;

accumulation means for accumulating electric charges obtained from the plurality of sensors during ON and OFF periods of said light projection means;

charge transfer means; at least a portion of which is connected in a ring shape, for transferring the electric charges accumulated by said accumulation means; and calculation means for calculating signal outputs from the plurality of sensors by adding signal electric charges from said accumulation means in synchronism with the charges which circulate the portion coupled in the ring shape and subtracting the charges obtained during the OFF period of said light projection means by said accumulation means from the charges obtained during the ON period.

44. The apparatus according to claim 43, wherein each of said sensor arrays comprises a charge coupled device (CCD).

45. The apparatus according to claim 39, wherein said light projection means comprises one of a light-emitting diode (LED) and an infrared light-emitting element (IRED).

46. A distance measuring apparatus which comprises light projection means for projecting signal light onto an object, and measures a distance to the object on the basis of reflected light obtained by projecting the signal light toward the object, comprising:

light-receiving means for outputting signals in accordance with an amount of the reflected light received from the object;

distance measuring means for calculating the distance to the object on the basis of the signals output from said light-receiving means;

first comparison means for comparing the distance calculated by said distance measuring means with a predetermined distance;

second comparison means for, when said first comparison means determines that the calculated distance is smaller than the predetermined distance, comparing the received-light amount of said light-receiving means with a predetermined light amount; and correction means for, when said second comparison means determines that the received-light amount is smaller than the predetermined light amount, correcting the calculated distance to be a predetermined value.

47. The apparatus according to claim 46, wherein said light-receiving means includes first and second light-receiving means.

48. The apparatus according to claim 47, wherein each of said first and second light-receiving means comprises a skim CCD sensor.

49. The apparatus according to claim 46, wherein said light-receiving element comprises a semiconductor position sensing element.

50. The apparatus according to claim 47, wherein said light-receiving element comprises a semiconductor position sensing element.

51. The apparatus according to claim 46, wherein the predetermined distance is a far distance.

52. The apparatus according to claim 46, wherein the predetermined distance is infinity.

53. A distance measuring apparatus which comprises light projection means for projecting signal light onto an object, and measures a distance to the object on the basis of reflected light obtained by projecting the signal light toward the object, comprising:

light-receiving means for outputting signals in accordance with an amount of the reflected light received from the object;

distance measuring means for calculating the distance to the object on the basis of the signals output from said light-receiving means;

first comparison means for comparing the distance calculated by said distance measuring means with a predetermined distance; and second comparison means for, when said first comparison means determines that the calculated distance is smaller than the predetermined distance, comparing the received-light amount of said light-receiving means with a predetermined light amount, wherein when said second comparison means determines that the received-light amount is smaller than the predetermined light amount, said distance measuring means performs a distance measurement by receiving the reflected light from the object without using said light projection means.

54. The apparatus according to claim 53, wherein said light-receiving means includes first and second light-receiving means.

55. The apparatus according to claim 54, wherein each of said first and second light-receiving means comprises a skim CCD sensor.

56. The apparatus according to claim 53, wherein said light-receiving element comprises a semiconductor position sensing element.

57. The apparatus according to claim 54, wherein said light-receiving element comprises a semiconductor position sensing element.

58. The apparatus according to claim 53, wherein the predetermined distance is a far distance.

59. The apparatus according to claim 53, wherein the predetermined distance is infinity.

60. A distance measuring apparatus which comprises light projection means for projecting light onto an object, and measures a distance to the object on the basis of light from the object, comprising:

first and second light-receiving means for respectively outputting signals in accordance with an amount of the light received from the object; and distance measuring means for calculating the distance to the object on the basis of two signals output from said first and second light-receiving means, wherein said distance measuring means includes:

discrimination means for discriminating, on the basis of the signals obtained by said first and second light-receiving means, whether or not a distance measurement performed by said distance measuring means is successful;

phase difference detection means for detecting a phase difference between the signals obtained by said first and second light-receiving means in accordance with a discrimination result of said discrimination means; and said first and second light-receiving means include:

a plurality of sensor arrays each including an array of a plurality of sensors for receiving the light;

accumulation means for accumulating electric charges obtained from the plurality of sensors during ON and OFF periods of said light projection means;

charge transfer means, at least a portion of which is connected in a ring shape, for transferring the electric charges accumulated by said accumulation means; and calculation means for calculating signal outputs from the plurality of sensors by adding signal electric charges from said accumulation means in synchronism with the charges which circulate the portion coupled in the ring shape and subtracting the charges obtained during the OFF period of said light projection means by said accumulation means from the charges obtained during the ON period.

61. The apparatus according to claim 60, wherein each of said sensor arrays comprises a charge coupled device (CCD).

* * * * *

UNITED STATES PATENT AND TRADEMARK OFFICE
CERTIFICATE OF CORRECTION

PATENT NO. : 5,870,178                                                          Page 1 of 3
DATED : February 9, 1999
INVENTOR(S) : A. Egawa et al.

It is certified that error appears in the above-identified patent and that said Letters Patent is hereby corrected as shown below:

In the Drawings

Sheet 24 of 48, Fig. 26, Step S3207, please delete "TURN ON IRED" and insert therefore -- TURN OFF IRED --.

Sheet 25 of 48, Fig. 27, Step S3207, please delete "TURN ON IRED" and insert therefore -- TURN OFF IRED --.

In the Specification

Column 6, line 19, please delete "is formed. across" and insert therefor -- is formed across --.

Column 7, line 1, please delete "voltage V, from" and insert therefor -- voltage $V_c$ from".

Column 7, line 6, please delete "the AID-converted" and insert therefor -- the A/D-converted --.

Column 7, line 14, please delete "CODs" and insert therefor -- CCDs --.

Column 7, line 42, please delete "waveformOS1∝" and insert therefor -- waveform $OS1'$ --.

Column 7, line 52, please delete "upon AID-converting" and insert therefor --- upon A/D-converting --.

Column 11, line 50, please delete "$IM_{i+i}$" and insert therefor -- $IM_{i+1}$ --.

Column 13, line 13, please delete "to be- measured" and insert therefor -- to be measured --.

Column 13, line 46, please delete "can .minimize" and insert therefor -- can minimize --.

Column 25, line 66, please delete "will-be" and insert therefor -- will be --.

Column 30, line 66, please delete "is to-be" and insert therefor -- is to be --.

Column 35, line 16, please delete "1101R" and insert therefor -- 1011R --.

UNITED STATES PATENT AND TRADEMARK OFFICE
CERTIFICATE OF CORRECTION

PATENT NO. : 5,870,178

DATED : February 9, 1999

INVENTOR(S) : A. Egawa et al.

It is certified that error appears in the above-identified patent and that said Letters Patent is hereby corrected as shown below:

In the Specification (continued)

Column 35, line 22, please delete "1101R" and insert therefor -- 1011R --.

Column 35, line 46, please delete "--exemplified." and insert therefor -- exemplified. --

Column 36, line 10, please delete "1101R" and insert therefor -- 1011R --.

Column 36, line 13, please delete "the- relative" and insert therefor -- the relative --.

Column 38, line 1, please delete "1101L" and insert therefor -- 1011L --.

Column 38, line 18, please delete "1101L" and insert therefor -- 1011L --.

Column 39, line 29, please delete "is a- block" and insert therefor -- is a block --.

Column 41, line 6, please delete "exceeds-a" and insert therefor -- exceeds a --.

UNITED STATES PATENT AND TRADEMARK OFFICE
CERTIFICATE OF CORRECTION

PATENT NO. : 5,870,178
DATED : February 9, 1999
INVENTOR(S) : A. Egawa et al.

It is certified that error appears in the above-identified patent and that said Letters Patent is hereby corrected as shown below:

In the Claims

Column 45, Claim 22, line 13" please delete "and-second" and insert therefor -- and second --.

Column 47, Claim 39, line 46, please delete "means includes:" and insert therefor -- means including: --.

Column 48, Claim 43, line 11, please delete "transfer means;" and insert therefor -- transfer means, --.

Column 50, Claim 60, line 9, please delete "means includes:" and insert therefor -- means including: --.

Signed and Sealed this

Fourteenth Day of December, 1999

Attest:

Q. TODD DICKINSON

*Attesting Officer*   *Acting Commissioner of Patents and Trademarks*